(12) United States Patent
Koga et al.

(10) Patent No.: US 12,200,372 B2
(45) Date of Patent: *Jan. 14, 2025

(54) IMAGE PROCESSOR, IMAGE PROCESSING METHOD, AND IMAGING DEVICE

(71) Applicant: SONY SEMICONDUCTOR SOLUTIONS CORPORATION, Kanagawa (JP)

(72) Inventors: Fumihiko Koga, Kanagawa (JP); Tetsuji Yamaguchi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,301

(22) Filed: Apr. 17, 2023

(65) Prior Publication Data

US 2023/0254596 A1    Aug. 10, 2023

Related U.S. Application Data

(63) Continuation of application No. 16/966,138, filed as application No. PCT/JP2019/002984 on Jan. 29, 2019, now Pat. No. 11,665,440.

(30) Foreign Application Priority Data

Feb. 9, 2018   (JP) ................. 2018-022143

(51) Int. Cl.
  *H04N 23/84*    (2023.01)
  *G06T 7/10*     (2017.01)
  *H04N 25/70*    (2023.01)

(52) U.S. Cl.
  CPC ............ *H04N 23/843* (2023.01); *G06T 7/10* (2017.01); *H04N 25/70* (2023.01)

(58) Field of Classification Search
  CPC .. G03B 7/093; H01L 27/146; H04N 5/23212; H04N 5/2353; H04N 5/35536; H04N 5/367; H04N 9/045
  (Continued)

(56) References Cited

U.S. PATENT DOCUMENTS

| | | | |
|---|---|---|---|
| 11,665,440 B2 * | 5/2023 | Koga | H04N 23/843 |
| | | | 348/294 |
| 2011/0134292 A1 | 6/2011 | Hirai | |

(Continued)

FOREIGN PATENT DOCUMENTS

| | | |
|---|---|---|
| CN | 101369308 A | 2/2009 |
| CN | 102663719 | 9/2012 |

(Continued)

OTHER PUBLICATIONS

International Search Report and Written Opinion for International (PCT) Patent Application No. PCT/JP2019/002984, dated Apr. 16, 2019, 9 pages.

(Continued)

*Primary Examiner* — Xi Wang
(74) *Attorney, Agent, or Firm* — SHERIDAN ROSS P.C.

(57) ABSTRACT

An image processor according to the present disclosure includes: an image segmentation processing section to generate a plurality of first map data on the basis of first image map data including a plurality of pixel values, the plurality of first map data having arrangement patterns of pixel values different from each other and including pixel values located at positions different from each other; an interpolation processing section to generate a plurality of second map data by determining a pixel value at a position where no pixel value is present in each of the plurality of first map data with use of interpolation processing; and a synthesis processing section to generate third map data by generating, on the basis (Continued)

of pixel values at positions corresponding to each other in the plurality of second map data, a pixel value at a position corresponding to the positions.

18 Claims, 43 Drawing Sheets

(58) Field of Classification Search
USPC .......................... 348/222.1, 229.1; 382/167
See application file for complete search history.

(56) References Cited

U.S. PATENT DOCUMENTS

| | | | |
|---|---|---|---|
| 2013/0242133 A1* | 9/2013 | Li | H04N 23/73 348/222.1 |
| 2014/0111675 A1 | 4/2014 | Tatsuzawa et al. | |
| 2015/0015754 A1 | 1/2015 | Fujita et al. | |
| 2016/0277693 A1 | 9/2016 | Fujita et al. | |
| 2021/0029331 A1 | 1/2021 | Koga et al. | |

FOREIGN PATENT DOCUMENTS

| | | |
|---|---|---|
| CN | 103793904 A | 5/2014 |
| CN | 104284105 | 1/2015 |
| CN | 104620572 A | 5/2015 |
| CN | 105744256 A | 7/2016 |
| JP | H07111586 A | 4/1995 |
| JP | 2007-221423 | 8/2007 |
| JP | 2009182733 A | 8/2009 |
| JP | 2011-138927 | 7/2011 |
| JP | 2015-019293 | 1/2015 |
| JP | 2017-200157 | 11/2017 |
| WO | WO 2011/067850 | 6/2011 |
| WO | WO 2014/020970 | 2/2014 |

OTHER PUBLICATIONS

Official Action for U.S. Appl. No. 16/966,138, dated Aug. 30, 2022, 20 pages.
Notice of Allowance for U.S. Patent Application No. Jan. 19, 2023, 20 pages.
Corrected Notice of Allowance for U.S. Patent Application No. Jan. 30, 2023, 2 pages.

* cited by examiner

(grid of G and G' cells with X marker on left)

(grid of G' and G cells with X marker on left)

IMAGE PROCESSOR, IMAGE PROCESSING METHOD, AND IMAGING DEVICE

CROSS REFERENCE TO RELATED APPLICATIONS

This application is a continuation application of U.S. patent application Ser. No. 16/966,138, filed Jul. 30, 2020, which is a national stage application under 35 U.S.C. 371 and claims the benefit of PCT Application No. PCT/JP2019/002984 having an international filing date of Jan. 29, 2019, which designated the United States, which PCT application claimed the benefit of Japanese Patent Application No. 2018-022143 filed Feb. 9, 2018, the entire disclosures of each of which are incorporated herein by reference.

TECHNICAL FIELD

The present disclosure relates to an image processor that performs image processing, an image processing method, and an imaging device including such an image processor.

BACKGROUND ART

In imaging devices, captured images are generated on the basis of electric signals converted by red, green, and blue photoelectric converters. For example, PTL 1 discloses that red, green, and blue photoelectric converters are stacked in one pixel region.

CITATION LIST

Patent Literature

PTL 1: Japanese Unexamined Patent Application Publication No. 2011-138927

SUMMARY OF THE INVENTION

Incidentally, in imaging devices, high image quality of captured images is desired, and further improvement in the image quality is expected.

It is desirable to provide an image processor, an image processing method, and an imaging device that make it possible to enhance image quality of a captured image.

An image processor according to an embodiment of the present disclosure includes an imaging segmentation processing section, an interpolation processing section, and a synthesis processing section. The image segmentation processing section is configured to generate a plurality of first map data on the basis of first image map data including a plurality of pixel values. The plurality of first map data has arrangement patterns of pixel values different from each other and includes pixel values located at positions different from each other. The interpolation processing section is configured to generate a plurality of second map data corresponding to the plurality of first map data by determining a pixel value at a position where no pixel value is present in each of the plurality of first map data with use of interpolation processing. The synthesis processing section is configured to generate third map data by generating, on the basis of pixel values at positions corresponding to each other in the plurality of second map data, a pixel value at a position corresponding to the positions.

An image processing method according to an embodiment of the present disclosure includes: image segmentation processing of generating a plurality of first map data on the basis of first image map data including a plurality of pixel values, the plurality of first map data having arrangement patterns of pixel values different from each other and including pixel values located at positions different from each other; interpolation processing of generating a plurality of second map data corresponding to the plurality of first map data by determining a pixel value at a position where no pixel value is present in each of the plurality of first map data with use of interpolation processing; and synthesis processing of generating third map data by generating, on the basis of pixel values at positions corresponding to each other in the plurality of second map data, a pixel value at a position corresponding to the positions.

An imaging device according to an embodiment of the present disclosure includes an imaging section, an imaging segmentation processing section, an interpolation processing section, and a synthesis processing section. The imaging section generates first image map data including a plurality of pixel values. The image segmentation processing section is configured to generate a plurality of first map data on the basis of the first image map data. The plurality of first map data has arrangement patterns of pixel values different from each other and includes pixel values located at positions different from each other. The interpolation processing section is configured to generate a plurality of second map data corresponding to the plurality of first map data by determining a pixel value at a position where no pixel value is present in each of the plurality of first map data with use of interpolation processing. The synthesis processing section is configured to generate third map data by generating, on the basis of pixel values at positions corresponding to each other in the plurality of second map data, a pixel value at a position corresponding to the positions.

The "imaging device" here is not limited to a so-called image sensor alone, and includes electronic devices having an imaging function such as a digital camera and a smartphone.

In the image processor, the imaging processing method, and the imaging device according to the embodiments of the present disclosure, the plurality of first map data is generated on the basis of the first image map data by image segmentation processing. The plurality of first map data has arrangement patterns of pixel values different from each other, and includes pixel values located at positions different from each other. Then, the plurality of second map data is generated on the basis of each of the plurality of first map data by interpolation processing. The plurality of second map data is generated by determining a pixel value at a position where no pixel value is present in the plurality of first map data with use of interpolation processing. Then, the third map data is generated on the basis of the plurality of second map data by synthesis processing. The third map data is generated by generating, on the basis of pixel values at positions corresponding to each other in the plurality of second map data, a pixel value at a position corresponding to the positions.

According to the image processor, the imaging processing method, and the imaging device according to the embodiments of the present disclosure, the plurality of first map data having arrangement patterns of pixel values different from each other and including pixel values located at positions different from each other is generated on the basis of the first image map data, the plurality of second map data is generated by determining a pixel value at a position where no pixel value is present in each of the plurality of first map data with use of interpolation processing, and the third map data is generated by generating, on the basis of pixel values at positions corresponding to each other in the plurality of second map data, a pixel value at a position corresponding to the positions, which makes it possible to enhance image quality of a captured image. It is to be noted that the effects described here are not necessarily limited, but any of effects described in the present disclosure may be included.

BRIEF DESCRIPTION OF DRAWING

FIG. 17A is another explanatory diagram illustrating an example of map data according to another modification example.

FIG. 17B is another explanatory diagram illustrating an example of map data according to another modification example.

MODES FOR CARRYING OUT THE INVENTION

The following describes embodiments of the present disclosure in detail with reference to the drawings. It is to be noted that description is given in the following order.

Figure 1:
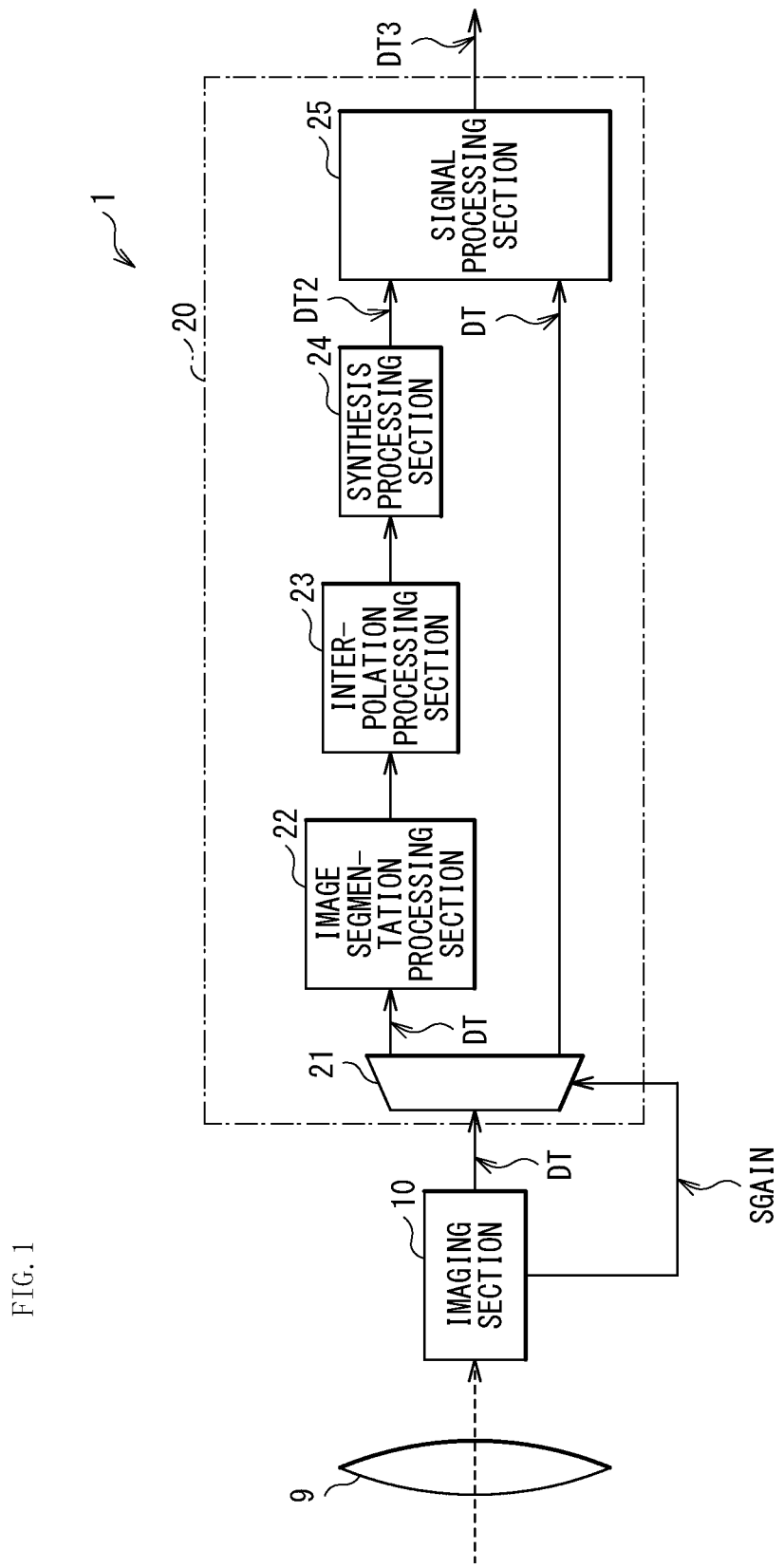
FIG. 1 is a block diagram illustrating a configuration example of an imaging device according to a first embodiment of the present disclosure.

1. First Embodiment
2. Second Embodiment
3. Third Embodiment
4. Fourth Embodiment
3. Usage Examples of Imaging Device
6. Application Examples 1. First Embodiment Configuration Example FIG. 1 illustrates a configuration example of an imaging device 1 including an image processor according to a first embodiment. It is to be noted that an image processing method according to an embodiment of the present embodiment is embodied by the present embodiment, and is described together. The imaging device 1 includes an optical system 9, an imaging section 10, and an image processing section 20.

The optical system 9 includes, for example, a lens that forms an image on an imaging surface S of the imaging section 10.

The imaging section 10 captures an image of a subject to generate an image signal DT and a gain signal SGAIN. The imaging section 10 is configured using, for example, a CMOS (complementary metal oxide semiconductor) image sensor.

Figure 2:
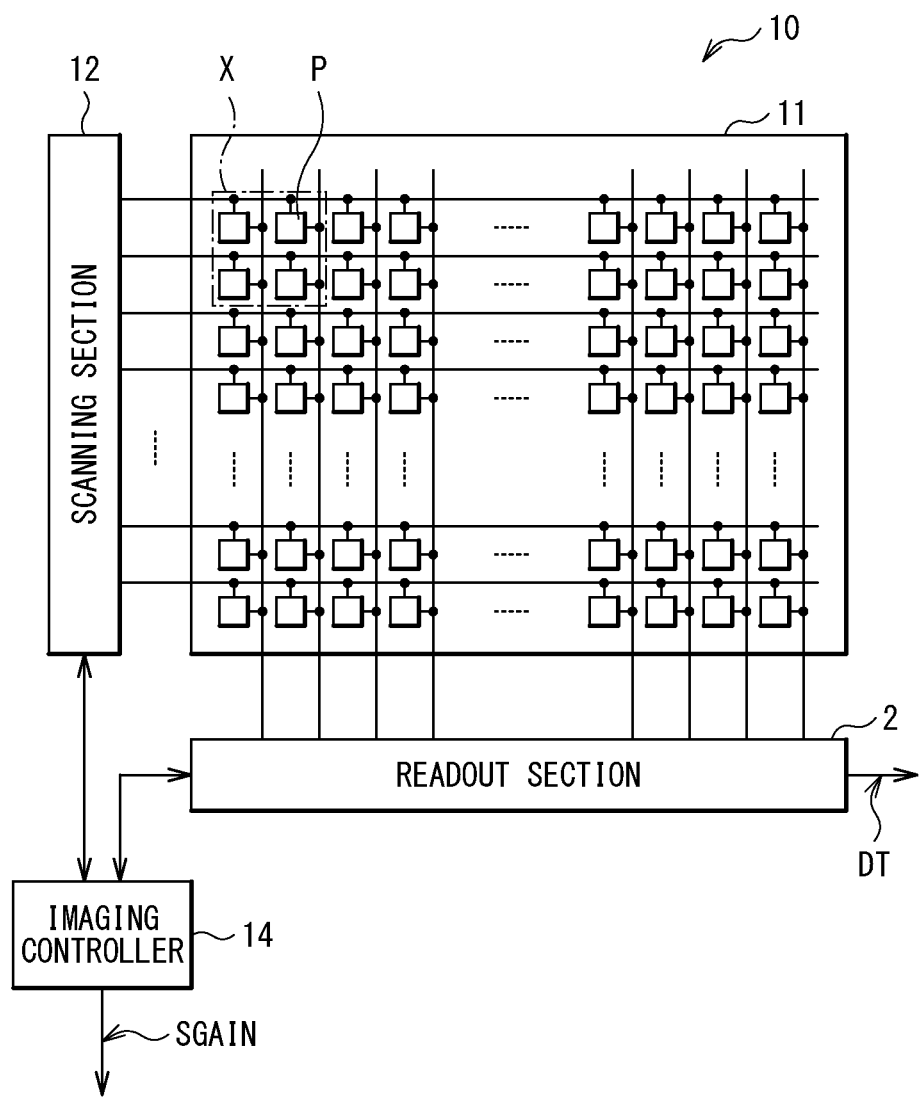
FIG. 2 is a block diagram illustrating a configuration example of an imaging section illustrated in FIG. 1.

FIG. 2 illustrates a configuration example of the imaging section 10. The imaging section 10 includes a pixel array 11, a scanning section 12, a readout section 13, and an imaging controller 14.

The pixel array 11 includes a plurality of imaging pixels P arranged in a matrix. The imaging pixels P each include a photoelectric converter that is configured to receive red (R) light, a photoelectric converter that is configured to receive green (G) light, and a photoelectric converter that is configured to receive blue (B) light.

Figure 3:
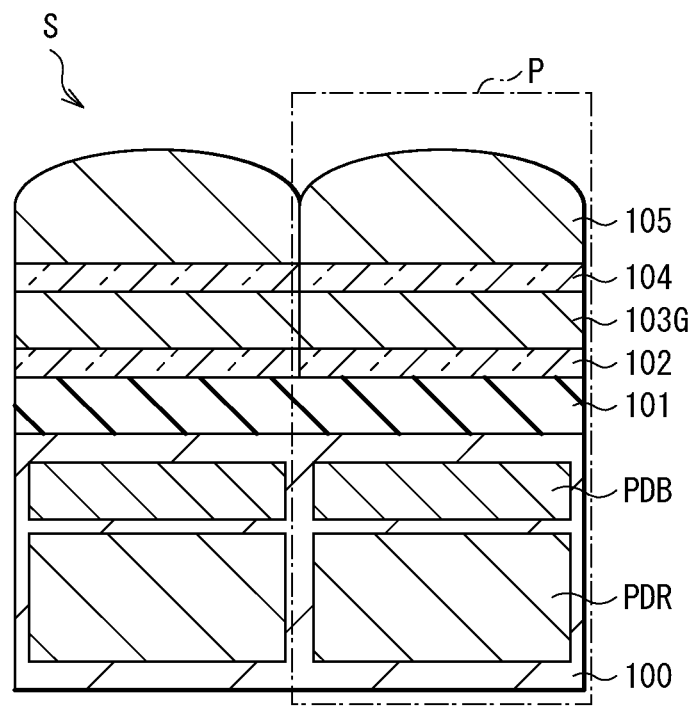
FIG. 3 is an explanatory diagram illustrating a configuration example of imaging pixels illustrated in FIG. 2.

FIG. 3 schematically illustrates cross-sectional configurations of the imaging pixels P. FIG. 3 schematically illustrates cross-sectional configurations of two imaging pixels P of four imaging pixels P arranged in a region X illustrated in FIG. 2.

A semiconductor substrate 100 includes two photodiodes PDR and PDB formed in a pixel region corresponding to one imaging pixel P. The photodiode PDR is a photoelectric converter that is configured to receive red (R) light, and the photodiode PDB is a photoelectric converter that is configured to receive blue (B) light. The photodiode PDR and the photodiode PDB are formed and stacked in the semiconductor substrate 100 in such a manner that the photodiode PDB is located on side of the imaging surface S. The photodiode PDR and the photodiode PDB respectively perform photoelectric conversion on the basis of red light and blue light with use of a fact that an absorption coefficient of light in the semiconductor substrate 100 differs depending on a wavelength of the light.

An insulating film 101 is formed on a surface, on the side of the imaging surface S, of the semiconductor substrate 100. The insulating film 101 is configured using, for example, silicon dioxide ($SiO_2$). Then, a transparent electrode 102, a photoelectric conversion film 103G, and a transparent electrode 104 are formed in this order on the insulating film 101. The transparent electrodes 102 and 104 are electrodes that allow red light, green light, and blue light to pass therethrough. The photoelectric conversion film 103G is a photoelectric conversion film that is configured to receive green (G) light, and allows red light and blue light to pass therethrough. The photoelectric conversion film 103G and the transparent electrodes 102 and 104 are included in a photoelectric converter that is configured to receive green (G) light. An on-chip lens 105 is formed on the transparent electrode 104.

Figure 4:
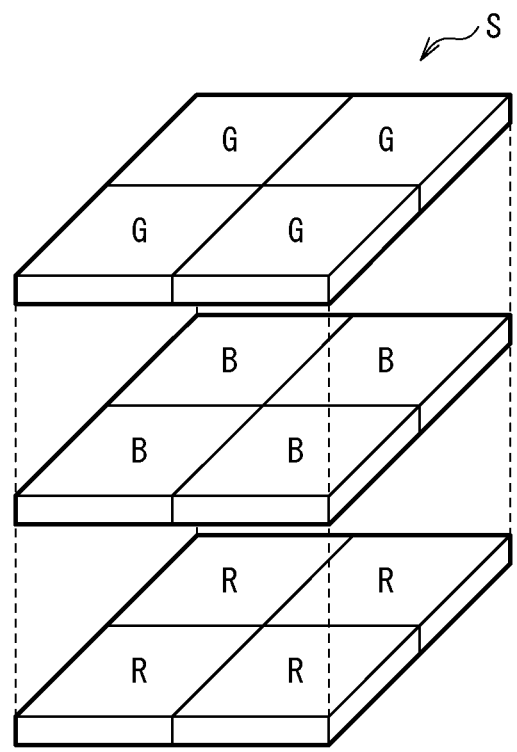
FIG. 4 is a schematic diagram illustrating a configuration example of the imaging pixels illustrated in FIG. 2.

FIG. 4 schematically illustrates positions of photoelectric converters in the four imaging pixels P arranged in the region X illustrated in FIG. 2. In the imaging section 10, a photoelectric converter related to green (G), a photoelectric converter related to blue (B), and a photoelectric converter related to red (R) are formed and stacked in such a manner in the pixel region corresponding to one imaging pixel P. This makes it possible for each of the imaging pixels P to generate a pixel signal related to red, a pixel signal related to green, and a pixel signal related to blue in the imaging section 10.

The scanning section 12 sequentially drives the plurality of imaging pixels P in the pixel array 11, for example, in units of pixel lines on the basis of an instruction from the imaging controller 14, and includes, for example, an address decoder.

The readout section 13 performs AD conversion on the basis of the pixel signals supplied from the respective imaging pixels P on the basis of an instruction from the imaging controller 14 to generate an image signal DT. The image signal DT includes three image map data MPG, MPB, and MPR. The image map data MPG includes pixel values for one frame image related to green (G). The image map data MPB includes pixel values for one frame image related to blue (B). The image map data MPR includes pixel values for one frame image related to red (R). Each of the pixel values is represented by a digital code having a plurality of bits.

The imaging controller 14 supplies a control signal to the scanning section 12 and the readout section 13 to control operations of these circuits, thereby controlling an operation of the imaging section 10. In addition, the imaging controller 14 also has a function of setting a conversion gain GC for AD conversion to be performed by the readout section 13. Specifically, in a case where the imaging section 10 captures an image of a dark subject, the imaging controller 14 increases the conversion gain GC for AD conversion to be performed, and in a case where the imaging section 10 captures an image of a bright subject, the imaging controller 14 decreases the conversion gain GC for AD conversion to be performed. This makes it possible for the imaging device 1 to capture images of subjects having various levels of brightness. In addition, the imaging controller 14 also has a function of outputting information about this conversion gain GC as the gain signal SGAIN.

The image processing section 20 (FIG. 1) performs image processing on the basis of the image signal DT and the gain signal SGAIN. The image processing section 20 includes a switching section 21, an image segmentation processing section 22, an interpolation processing section 23, a synthesis processing section 24, and a signal processing section 25.

The switching section 21 selectively supplies the image signal DT to the image segmentation processing section 22 or the signal processing section 25 on the basis of the conversion gain GC indicated by the gain signal SGAIN. Specifically, for example, the switching section 21 supplies the image signal DT to the image segmentation processing section 22 in a case where the conversion gain GC is higher than a predetermined threshold value Gth, and supplies the image signal DT to the signal processing section 25 in a case where the conversion gain GC is lower than the predetermined threshold value Gth. This makes it possible to cause the image segmentation processing section 22, the interpolation processing section 23, and the synthesis processing section 24 in the image processing section 20 to perform processing in the case where the conversion gain GC is higher than the predetermined threshold value Gth, and makes it possible to cause the image segmentation processing section 22, the interpolation processing section 23, and the synthesis processing section 24 in the image processing section 20 not to perform processing in the case where the conversion gain GC is lower than the predetermined threshold value Gth.

The image segmentation processing section 22 performs image segmentation processing A1 on the basis of the three image map data MPG, MPB, and MPR included in the image signal DT supplied from the imaging section 10 via the switching section 21 to generate six map data MG11, MG12, MB11, MB12, MR11, and MR12. Specifically, the image segmentation processing section 22 generates, on the basis of the image map data MPG related to green (G) included in the image signal DT, two map data MG11 and MG12 that have arrangement patterns PAT of pixel values different from each other and include pixel values located at positions different from each other, as described later. Similarly, the image segmentation processing section 22 generates two map data MB11 and MB12 on the basis of the image map data MPB related to blue (B) included in the image signal DT, and generates two map data MR11 and MR12 on the basis of the image map data MPR related to red (R) included in the image signal DT. Thus, the image segmentation processing section 22 generates the six map data MG11, MG12, MB11, MB12, MR11, and MR12 on the basis of the image signal DT.

The interpolation processing section 23 respectively performs interpolation processing A2 on the six map data MG11, MG12, MB11, MB12, MR11, and MR12 supplied from the image segmentation processing section 22 to generate six map data MG21, MG22, MB21, MB22, MR21, and MR22. Specifically, as described later, the interpolation processing section 23 determines a pixel value at a position where no pixel value is present in the map data MG11 related to green (G) with use of the interpolation processing A2 to generate the map data MG21, and determines a pixel value at a position where no pixel value is present in the map data MG12 related to the green (G) with use of the interpolation processing A2 to generate map data MG22. Similarly, the interpolation processing section 23 performs the interpolation processing A2 on the map data MB11 related to blue (B) to generate the map data MB21, and performs the interpolation processing A2 on the map data MB12 related to blue (B) to generate the map data MB22. In addition, the interpolation processing section 23 performs the interpolation processing A2 on the map data MR11 related to the red (R) to generate the map data MR21, and performs the interpolation processing A2 on the map data MR12 related to the red (R) to generate the map data MR22.

The synthesis processing section 24 performs synthesis processing A3 on the basis of the six map data MG21, MG22, MB21, MB22, MR21, and MR22 supplied from the interpolation processing section 23 to generate three map data MG3, MB3, and MR3. Specifically, the synthesis processing section 24 generates the map data MG3 on the basis of the two map data MG21 and MG22 related to green (G), as described later. Similarly, the synthesis processing section 24 generates the map data MB3 on the basis of the two map data MB21 and MB22 related to blue (B), and generates, on the basis of pixel values at positions corresponding to each other in the two map data MR21 and MR22 related to red (R), a pixel value at a position corresponding to the positions to generate the map data MR3. Then, the synthesis processing section 24 supplies the three map data MG3, MB3, and MR3 as an image signal DT2 to the signal processing section 25.

The signal processing section 25 performs predetermined signal processing on the basis of the image signal DT2 supplied from the synthesis processing section 24 or the image signal DT supplied from the imaging section 10 via the switching section 21. The predetermined signal processing includes, for example, white balance adjustment, non-linear conversion, contour enhancement processing, image size conversion, and the like. Then, the signal processing section 25 outputs a processing result of the predetermined signal processing as an image signal DT3.

With this configuration, in a case where an image of a dark subject is captured, the conversion gain GC is increased in the imaging device 1; therefore, the image segmentation processing A1, the interpolation processing A2, and the synthesis processing A3 are performed. This makes it possible to increase a signal-to-noise ratio (S/N ratio) in the captured image in the imaging device 1. In addition, in a case where the imaging device 1 captures an image of a bright subject, the conversion gain GC is decreased in the imaging device 1; therefore, the image segmentation processing A1, the interpolation processing A2, and the synthesis processing A3 are not performed. This makes it possible to increase resolution in the captured image in the imaging device 1.

Here, the image processing section 20 corresponds to a specific example of an "image processor" in the present disclosure. The image segmentation processing section 22 corresponds to a specific example of an "image segmentation processing section" in the present disclosure. The interpolation processing section 23 corresponds to a specific example of an "interpolation processing section" in the present disclosure. The synthesis processing section 24 corresponds to a specific example of a "synthesis processing section" in the present disclosure. The signal processing section 25 corresponds to a specific example of a "processing section" in the present disclosure. The switching section 21 corresponds to a specific example of a "processing controller" in the present disclosure.

[Operation and Workings]

Next, description is given of an operation and workings of the imaging device 1 according to the present embodiment.

(Overview of Overall Operation)

First, description is given of an overview of an overall operation of the imaging device 1 with reference to FIG. 1. The imaging section 10 captures an image of a subject to generate the image signal DT and the gain signal SGAIN. The switching section 21 of the image processing section 20 selectively supplies the image signal DT to the image segmentation processing section 22 or the signal processing section 25 on the basis of the conversion gain GC indicated by the gain signal SGAIN. The image segmentation processing section 22 performs the image segmentation processing A1 on the basis of three image map data MPG, MPB, and MPR included in the image signal DT supplied from the imaging section 10 via the switching section 21 to generate six map data MG11, MG12, MB11, MB12, MR11, and MR12. The interpolation processing section 23 respectively performs the interpolation processing A2 on the six map data MG11, MG12, MB11, MB12, MR11, and MR12 supplied from the image segmentation processing section 22 to generate six map data MG21, MG22, MB21, MB22, MR21, and MR22. The synthesis processing section 24 performs the synthesis processing A3 on the basis of the six map data MG21, MG22, MB21, MB22, MR21, and MR22 supplied from the interpolation processing section 23 to generate three map data MG3, MB3, and MR3. Then, the synthesis processing section 24 supplies these three map data MG3, MB3, and MR3 as the image signal DT2 to the signal processing section 25. The signal processing section 25 performs the predetermined signal processing on the basis of the image signal DT2 supplied from the synthesis processing section 24 or the image signal DT supplied from the imaging section 10 via the switching section 21 to generate the image signal DT3.

(Detailed Operation)

Figure 5:
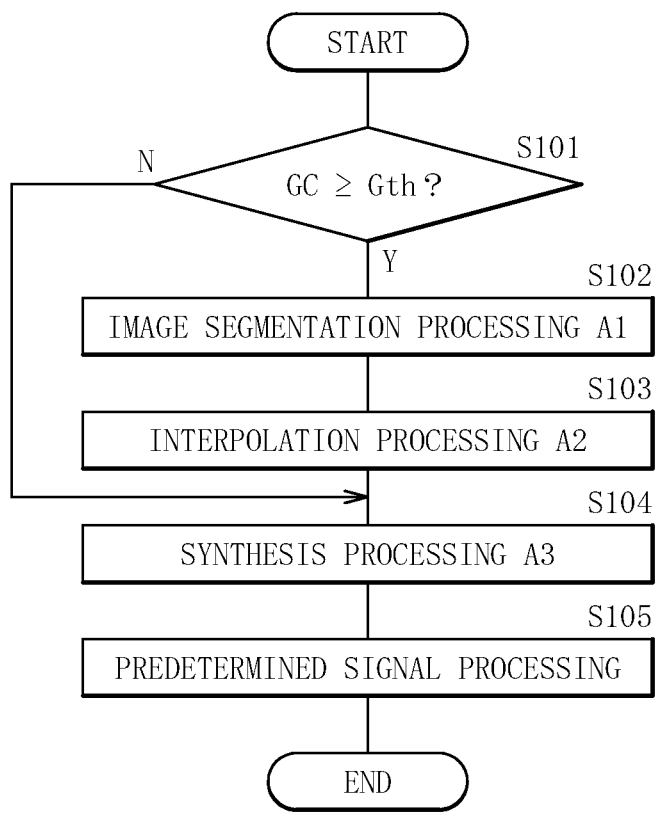
FIG. 5 is a flow chart illustrating an operation example of an image processing section illustrated in FIG. 1.

FIG. 5 illustrates an operation example of the image processing section 20. The image processing section 20 determines whether or not to perform the image segmentation processing A1, the interpolation processing A2, and the synthesis processing A3 on the basis of the conversion gain GC indicated by the gain signal SGAIN. This operation is described in detail below.

First, the switching section 21 compares the conversion gain GC indicated by the gain signal SGAIN with the predetermined threshold value Gth (step S101). In a case where the conversion gain GC is lower than the predetermined threshold value Gth ("N" in the step S101), the processing proceeds to step S105.

In a case where the conversion gain GC is equal to or higher than the predetermined threshold value Gth (G Gth) ("Y" in the step S101), the image segmentation processing section 22 performs the image segmentation processing A1 (step S102), the interpolation processing section 23 performs the interpolation processing A2 (step S103), and the synthesis processing section 24 performs the synthesis processing A3 (step S104).

Then, the signal processing section 25 performs the predetermined signal processing (step S105). That is, the signal processing section 25 performs the predetermined signal processing on the basis of the image signal DT2 generated by the synthesis processing A3 in the case where the conversion gain GC is equal to or higher than the predetermined threshold value Gth ("Y" in the step S101), and performs the predetermined signal processing on the basis of the image signal DT generated by the imaging section 10 in the case where the conversion gain GC is lower than the predetermined threshold value Gth ("N" in the step S101).

Thus, this flow ends.

As described above, the image processing section 20 performs the image segmentation processing A1, the interpolation processing A2, and the synthesis processing A3 in a case where the conversion gain GC is high. In addition, in a case where the conversion gain GC is low, the image segmentation processing A1, the interpolation processing A2, and the synthesis processing A3 are not performed in the imaging device 1. This makes it possible to enhance image quality of a captured image in the imaging device 1, as described below.

Next, the image segmentation processing A1, the interpolation processing A2, and the synthesis processing A3 are described in detail with specific operation examples.

Figure 6:
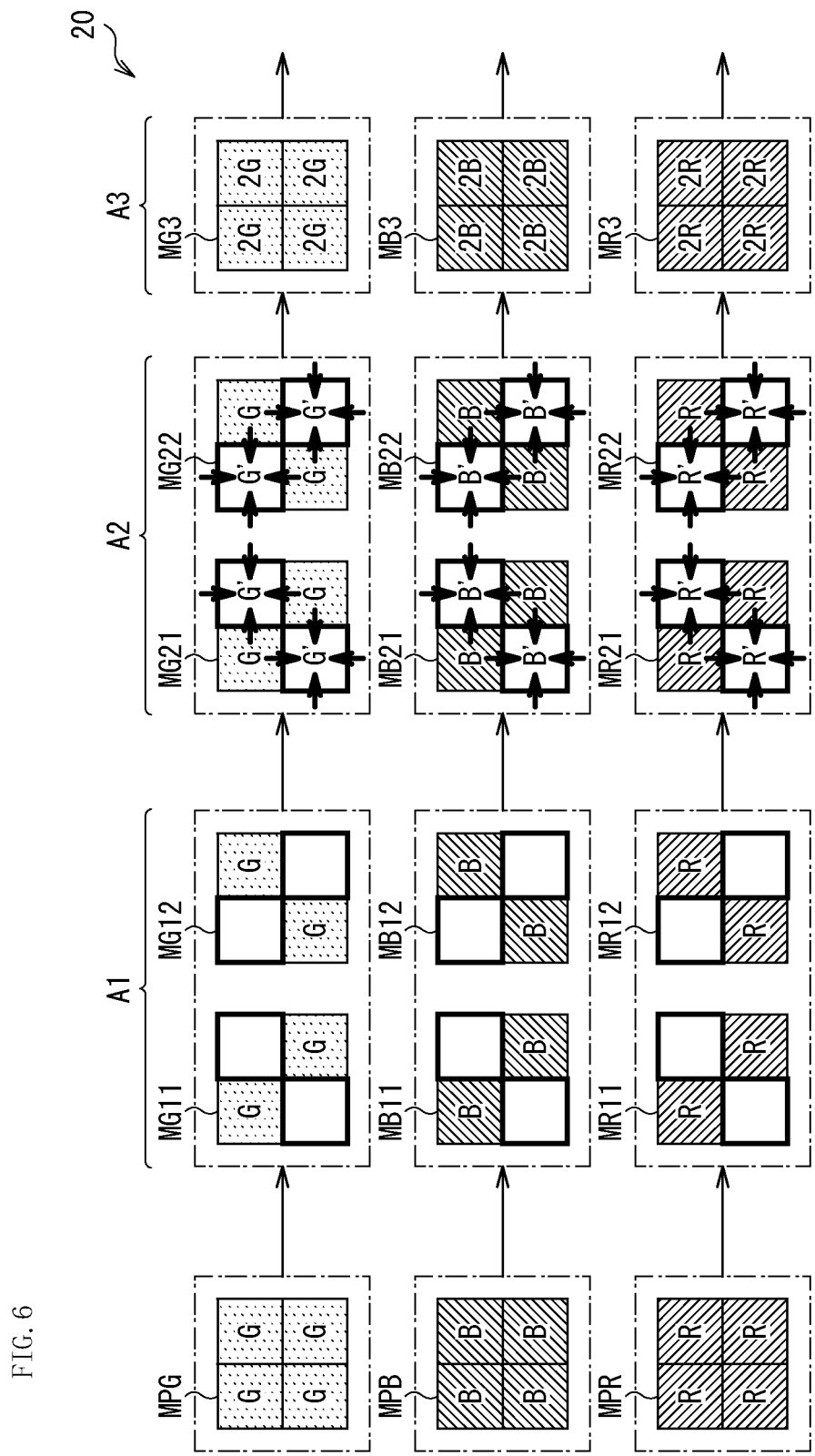
FIG. 6 is an explanatory diagram illustrating an operation example of the image processing section illustrated in FIG. 1.

FIG. 6 schematically illustrates examples of the image segmentation processing A1, the interpolation processing A2, and the synthesis processing A3 in the image processing section 20.

(Image Segmentation Processing A1)

The image segmentation processing section 22 performs the image segmentation processing A1 on the basis of three image map data MPG, MPB, and MPR included in the image signal DT supplied from the imaging section 10 to generate six map data MG11, MG12, MB11, MB12, MR11, and MR12. The image segmentation processing A1 on the image map data MPG related to green (G) is described in detail as an example below.

Figure 7:
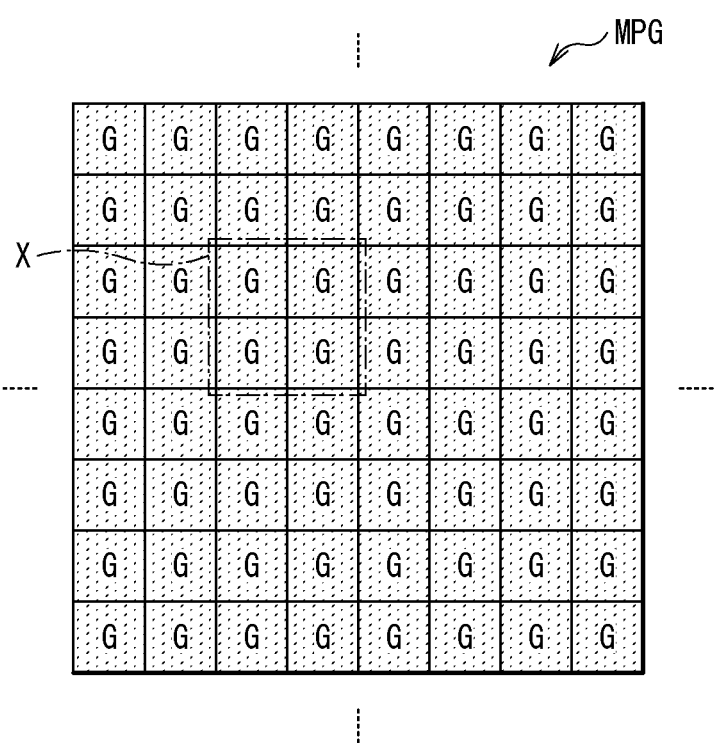
FIG. 7 is an explanatory diagram illustrating an example of image map data illustrated in FIG. 6.
Figure 8A:
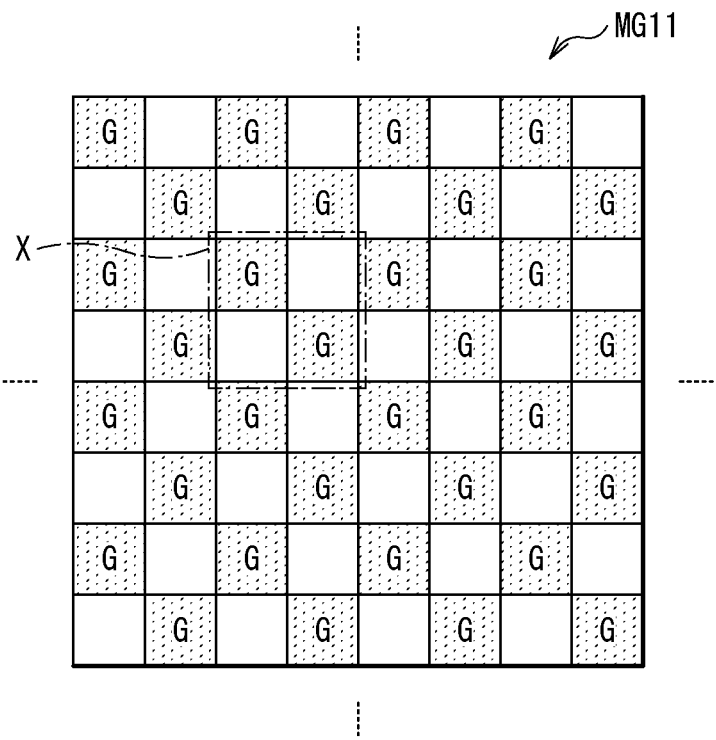
FIG. 8A is an explanatory diagram illustrating an example of map data illustrated in FIG. 6
Figure 8B:
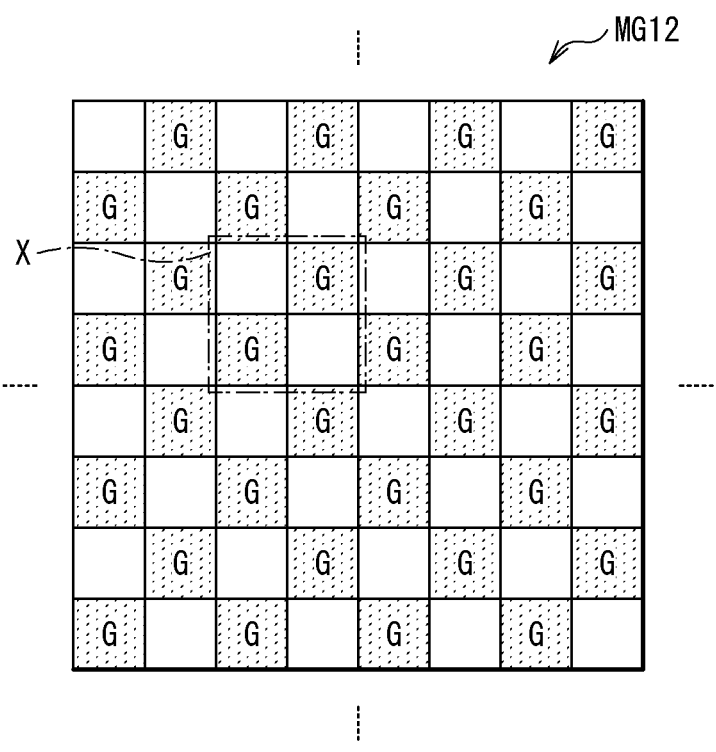
FIG. 8B is another explanatory diagram illustrating an example of the map data illustrated in FIG. 6.

FIG. 7 schematically illustrates the image map data MPG related to green (G). FIGS. 8A and 8B schematically illustrate the map data MG11 and MG12 related to green (G), respectively. In FIGS. 8A and 8B, a shaded portion indicates a position where a pixel value is present, and an unshaded portion indicates a position where a pixel value is not present (no pixel value is present).

The image map data MPG (FIG. 7) included in the image signal DT includes pixel values in one frame image related to green (G). An example of the image map data MPG illustrated in FIG. 6 schematically illustrates four pixel values arranged in two rows and two columns in the region X illustrated in FIG. 7.

The image segmentation processing section 22 generates, on the basis of such image map data MPG, two map data MG11 and MG12 (FIGS. 8A and 8B) that have arrangement patterns PAT of pixel values different from each other and include pixel values located at positions different from each other. The arrangement patterns PAT of the pixel values in the map data MG11 and MG12 are checkered patterns (Checkered Patterns) in which pixel values are shifted by one pixel in a horizontal direction (a lateral direction) and a vertical direction (a longitudinal direction) to each other. In other words, in the checkered patterns in the map data MG11 and MG12, positions where pixel values are present and positions where no pixel value is present are reversed from each other, and the pixel values are arranged at positions different from each other. Specifically, for example, in the map data MG11, as illustrated in FIG. 8A, the pixel values are present on the upper left and the lower right in the region X, and no pixel value is present on the lower left and the upper right in the region X. In contrast, in the map data MG12, as illustrated in FIG. 8B, the pixel values are present on the lower left and the upper right in the region X, and no pixel value is present on the upper left and the lower right in the region X. An example of each of the map data MG11 and MG12 illustrated in FIG. 6 schematically illustrates four pixel values in this region X. The pixel value at each position in the map data MG11 is the same as the pixel value at a corresponding position in the image map data MPG. Similarly, the pixel value at each position in the map data MG12 is the same as the pixel value at a corresponding position in the image map data MPG.

The image segmentation processing section 22 performs the image segmentation processing A1 on the basis of the image map data MPG to generate such map data MG11 and MG12. Similarly, the image segmentation processing section 22 performs the image segmentation processing A1 on the basis of the image map data MPB to generate the map data MB11 and MB12, and performs the image segmentation processing A1 on the basis of the image map data MPR to generate the map data MR11 and MR12. As illustrated in FIG. 6, the map data MG11, MB11, and MR11 have the same arrangement pattern PAT, and the map data MG12, MB12, and MR12 have the same arrangement pattern PAT.

(Interpolation Processing A2)

Next, the interpolation processing section 23 respectively performs the interpolation processing A2 on the six map data MG11, MR12, MB11, MB12, MR11, and MR12 generated by the image segmentation processing A1 to generate six map data MG21, MG22, MB21, MB22, MR21, and MR22. The interpolation processing A2 on the map data MG11 and MG12 (FIGS. 8A and 8B) related to green (G) is described in detail as an example below.

Figure 9A:
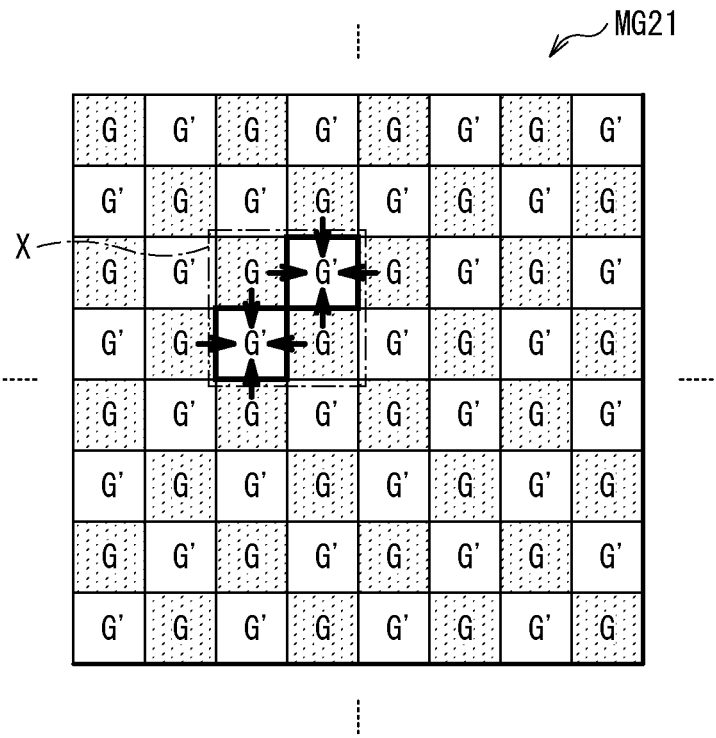
FIG. 9A is another explanatory diagram illustrating an example of the map data illustrated in FIG. 6.
Figure 9B:
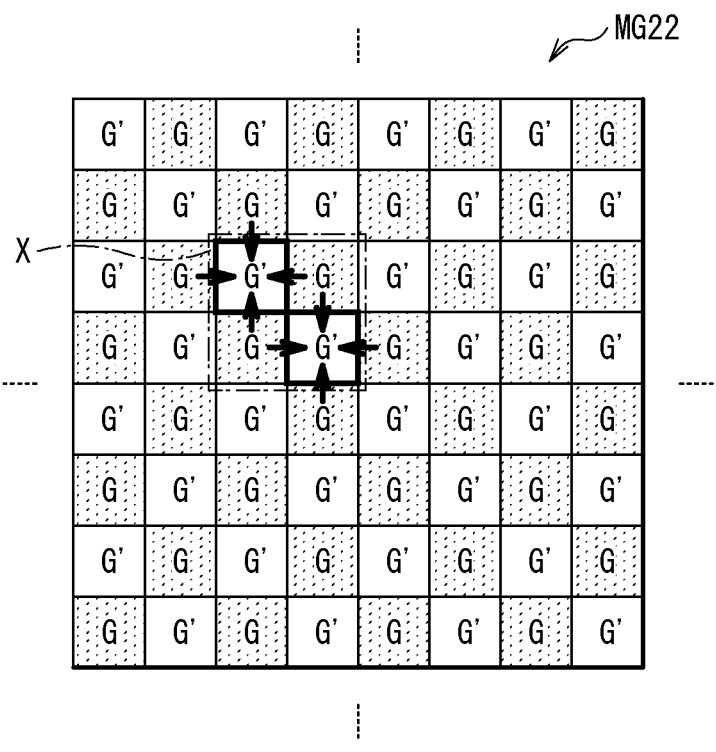
FIG. 9B is another explanatory diagram illustrating an example of the map data illustrated in FIG. 6.

FIGS. 9A and 9B schematically illustrate the map data MG21 and MG22 related to green (G), respectively. In FIGS. 9A and 9B, a shaded portion indicates a position where a pixel value is present in the map data MG11 and MG12 before the interpolation processing A2, and an unshaded portion indicates a position where a pixel value is not present in the map data MG11 and MG12 before the interpolation processing A2 and a position where a pixel value is generated by this interpolation processing A2.

The interpolation processing section 23 determines a pixel value at a position where no pixel value is present in the map data MG11 illustrated in FIG. 8A with use of the interpolation processing A2 to generate the map data MG21 illustrated in FIG. 9A, and determines a pixel value at a position where no pixel value is present in the map data MG12 illustrated in FIG. 8B with use of the interpolation processing A2 to generate the map data MG22 illustrated in FIG. 9B. Specifically, the interpolation processing section 23 determines a pixel value at a position where no pixel value is present by performing the interpolation processing A2 on the basis of pixel values located one row above, one column to the left of, one row below, and one column to the right of the position where no pixel value is present. That is, an interpolation method in the interpolation processing A2 in this example uses the pixel value above, below, to the left of, and to the right of the position where no pixel value is present. In the interpolation processing section 23, for example, performing bilinear interpolation with use of these four pixel values makes it possible to perform the interpolation processing A2. It is to be noted that, without limiting to this interpolation method, it is possible to use various known interpolation methods such as bicubic interpolation and spline interpolation. For example, in the map data MG21, as illustrated in FIG. 9A, the interpolation processing section 23 generates a pixel value at a lower left position in the region X by the interpolation processing A2, and generates a pixel value at an upper right position in the region X by the interpolation processing A2. Similarly, in the map data MG22, as illustrated in FIG. 9B, the interpolation processing section 23 generates a pixel value at an upper left position in the region X by the interpolation processing A2, and generates a pixel value at a lower right position in the region X by the interpolation processing A2. In FIGS. 9A and 9B, "G" indicates that a pixel value has been generated by the interpolation processing A2. An example of each of the map data MG21 and MG22 illustrated in FIG. 6 schematically illustrates four pixel values in this region X.

The interpolation processing section 23 performs the interpolation processing A2 on the map data MG11 to generate such map data MG21, and performs the interpolation processing A2 on the map data MG12 to generate such map data MG22. Similarly, the interpolation processing section 23 performs the interpolation processing A2 on the map data MB11 to generate the map data MB21, and performs the interpolation processing A2 on the map data MB12 to generate the map data MB22. In addition, the interpolation processing section 23 performs the interpolation processing A2 on the map data MR11 to generate the map data MR21, and performs the interpolation processing A2 on the map data MR12 to generate the map data MR22. The six map data MG21, MG22, MB21, MB22, MR21, and MR22 are generated by the same interpolation method.

(Synthesis Processing A3)

Next, the synthesis processing section 24 performs the synthesis processing A3 on the basis of the six map data MG21, MG22, MB21, MB22, MR21, and MR22 generated by the interpolation processing A2 to generate three map data MG3, MB3, and MR3. The synthesis processing A3 on the map data MG21 and MG22 (FIGS. 9A and 9B) related to green (G) is described in detail as an example below.

Figure 10:
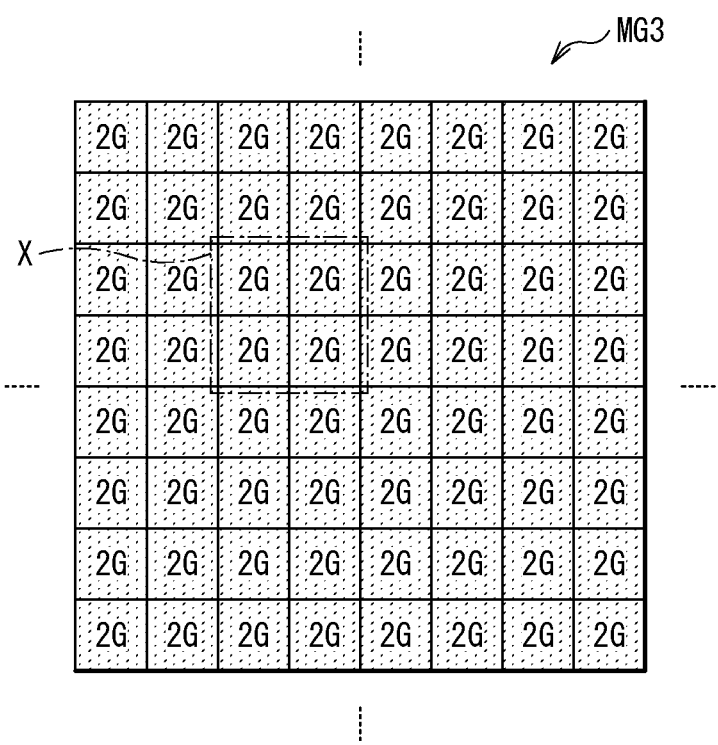
FIG. 10 is another explanatory diagram illustrating an example of the map data illustrated in FIG. 6.

FIG. 10 schematically illustrates the map data MG3 related to green (G). The synthesis processing section 24 generates, on the basis of the pixel values at the positions corresponding to each other in two map data MG21 and MG22, a pixel value at a position corresponding to the positions to generate the map data MG3. Specifically, it is possible for the synthesis processing section 24 to generate a pixel value at the position in map data MG3 by summing the pixel values at the positions corresponding to each other in the two map data MG21 and MG22. For example, the synthesis processing section 24 generates a pixel value on the upper left in the region X of the map data MG3 illustrated in FIG. 10 by summing a pixel value on the upper left in the region X of the map data MG21 illustrated in FIG. 9A and a pixel value on the upper left in the region X of the map data MG22 illustrated in FIG. 9B. Similarly, the synthesis processing section 24 generates a pixel value on the lower left in the region X of the pixel value by summing pixel values on the lower left in the regions X of the map data MG1 and MG2, generates a pixel value on the upper right in the region X of the map data MG3 by summing pixel values on the upper right in the regions X of the map data MG21 and MG22, and generates a pixel value on the lower right in the region of the map data MG3 by summing pixel values on the lower right in the regions X of the map data MG21 and MG22. In FIG. 10, "2G" indicates that a pixel value becomes about twice the pixel value in the image map data MPG by the synthesis processing A3. An example of the map data MG3 illustrated in FIG. 6 schematically illustrates pixel values in this region X.

The synthesis processing section 24 performs the synthesis processing A3 on the basis of the map data MG21 and MG22 to generates such map data MG3. Similarly, the synthesis processing section 24 performs the synthesis processing A3 on the basis of the map data MB21 and MB22 to generate the map data MB3, and performs the synthesis processing A3 on the basis of the map data MR21 and MR22 to generate the map data MR3. The pixel values in the map data MB3 are about twice the pixel values in the image map data MPB, and the pixel values in the map data MR3 are about twice the pixel values in the image map data MPR.

As described above, the synthesis processing section 24 generates three map data MG3, MB3, and MR3. Then, the synthesis processing section 24 supplies the three map data MG3, MB3, and MR3 as the image signal DT2 to the signal processing section 25.

Here, the image map data MPG, MPB, and MPR respectively correspond to specific examples of "first image map data", "second image map data", and "third image map data" in the present disclosure. The map data MG11 and MG12 correspond to a specific example of a "plurality of first map data" in the present disclosure. The map data MG21 and MG22 correspond to a specific example of a "plurality of second map data" in the present disclosure. The map data MG3 corresponds to a specific example of "third map data" in the present disclosure. The map data MB11 and MB12 correspond to a specific example of a "plurality of fourth map data" in the present disclosure. The map data MB21 and MB22 correspond to specific examples of "fifth map data" in the present disclosure. The map data MB3 corresponds to a specific example of "sixth map data" in the present disclosure. The map data MR11 and MR12 correspond to specific examples of "seventh map data" in the present disclosure. The map data MR21 and MR22 correspond to a specific example of a "plurality of eighth map data" in the present disclosure. The map data MR3 corresponds to a specific example of "ninth map data" in the present disclosure.

As described above, in the imaging device 1, for example, the image segmentation processing A1 is performed on the basis of the image map data MPG to generate the map data MG11 and MG12, the interpolation processing A2 is respectively performed on these map data MG11 and MG12 to generate the map data MG21 and MG22, and the synthesis processing A3 is performed on the basis of these map data MG21 and MG22 to generate the map data MG3. The same applies to the image map data MPB and MPR. This makes it possible to increase a signal-to-noise ratio (S/N ratio) in the map data MG3, MB3, and MR3 in the imaging device 1.

That is, the synthesis processing section 24 determines the pixel value on the upper left in the region X of the map data MG3, for example, by summing the pixel value on the upper left in the region X of the map data MG21 and the pixel value on the upper left in the region X of the map data MG22. Each of the pixel values has a signal component and a noise component that is random noise. Accordingly, the synthesis processing section 24 sums the pixel value on the upper left in the region X of the map data MG21 and the pixel value on the upper left in the region X of the map data MG22 to increase the signal component by a factor of about two and increase the noise component by a factor of about 1.4. That is, the noise component is random noise as described above, and the noise component included in the pixel value on the upper left in the region X of the map data MG21 and the noise component included in the pixel value on the upper left in the region X of the map data MG22 are mutually independent noise components; therefore, the noise component is not increased by a factor of about two but by a factor of about 1.4 (the square root of 2). Thus, in the imaging device 1, the signal component is increased by a factor of about two and the noise component is increased by a factor of about 1.4, which makes it possible to increase the signal-to-noise ratio (S/N ratio) in the map data MG3. The same applies to the map data MB3 and MR3. This consequently makes it possible to enhance image quality of a captured image in the imaging device 1.

In addition, in the imaging device 1, in the image segmentation processing A1, the arrangement patterns PAT of the pixel values are checkered patterns. Accordingly, as illustrated in FIGS. 8A and 8B, pixel values are present above, below, to the left of, and to the right of a position where no pixel value is present; therefore, performing the interpolation processing A2 makes it possible to determine the pixel value at the position where no pixel value is present on the basis of these four pixel values. As described above, in the imaging device 1, it is possible to perform the interpolation processing A2 on the basis of the pixel values above, below, to the left, and to the right, which makes it possible to make a reduction in resolution in the horizontal direction and a reduction in resolution in the vertical direction substantially equal to each other, and to suppress a reduction in resolution. This consequently makes it possible to enhance image quality of a captured image in the imaging device 1.

Further, in the imaging device 1, in the image segmentation processing A1, the arrangement patterns PAT of the pixel values in the map data MG11, MB11, and MR11 are the same as each other, and the arrangement patterns PAT of the pixel values in the map data MG12, MB12, and MR12 are the same as each other. This makes it possible for the image segmentation processing section 22 to perform the image segmentation processing A1 by the same method on the basis of three image map data MPG, MPB, and MPR, which makes it possible to simplify a circuit configuration of the image segmentation processing section 22, as compared with a case where the image segmentation processing A1 is performed by different methods on the basis of the three image map data MPG, MPB, and MPR.

Further, in the imaging device 1, in the interpolation processing A2, interpolation methods for generating the map data MG21, MG22, MB21, MB22, MR21, and MR22 are the same as each other. This makes it possible for the interpolation processing section 23 to generate six map data MG21, MG22, MB21, MB22, MR21, and MR22 with use of the same interpolation method, which makes it possible to simplify a circuit configuration of the interpolation processing section 23, as compared with a case where six map data MG21, MG22, MB21, MB22, MR21, and MR22 are generated with use of different interpolation methods.

Further, in the imaging device 1, in the image segmentation processing A1, the arrangement patterns PAT of the pixel values in the map data MG11, MB11, and MR11 are the same as each other, and the arrangement patterns PAT of the pixel values in the map data MG12, MB12, and MR12 are the same as each other. Then, in the interpolation processing A2, the interpolating methods for generating six map data MG21, MG22, MB21, MB22, MR21, and MR22 are the same as each other. This makes it possible to suppress false colors in a captured image in the imaging device 1. That is, for example, in a case where the interpolation processing A2 is performed on the basis of the pixel values located one row above and one row below the position where no pixel value is present to generate the map data MG21 and MG22 related to green (G) and the interpolation processing A2 is performed on the basis of the pixel values located one column to the left of and one column to the right of the position where no pixel value is present to generate the map data MB21 and MB22 related to blue (B), the interpolating method in the interpolation processing A2 differs depending on colors, which may cause false colors locally. In contrast, in the imaging device 1 according to the present embodiment, in the image segmentation processing A1, the arrangement patterns PAT of the pixel values in the map data MG11, MB11, and MR11 are the same as each other, and the arrangement patterns PAT of the pixel values in the map data MG12, MB12, and MR12 are the same as each other. Then, in the interpolation processing A2, the interpolating methods for generating six map data MG21, MG22, MB21, MB22, MR21, and MR22 are the same as each other. This makes it possible to reduce a possibility that such false colors occur in the imaging device 1. This consequently makes it possible to enhance image quality of a captured image in the imaging device 1.

Further, in the imaging device 1, it is possible to control whether or not to perform image segmentation processing, interpolation processing, and synthesis processing, which makes it possible to enhance image quality of a captured image. In particular, the imaging device 1 controls whether or not to perform the image segmentation processing, the interpolation processing, and the synthesis processing on the basis of the conversion gain GC in the imaging section 10. Specifically, the image segmentation processing, the interpolation processing, and the synthesis processing are performed in a case where the conversion gain GC indicated by the gain signal SGAIN is higher than the predetermined threshold value Gth, and the image segmentation processing, the interpolation processing, and the synthesis processing are not performed in a case where the conversion gain GC is lower than the predetermined threshold value Gth. Thus, for example, in a case where the imaging device 1 captures an image of a dark subject, the conversion gain GC is increased; therefore, the image segmentation processing A1, the interpolation processing A2, and the synthesis processing A3 are performed. This makes it possible to increase a signal-to-noise ratio (S/N ratio) in the captured image in the imaging device 1. That is, in the case where an image of a dark subject is captured, there is a possibility that noises are increased; therefore, performing the image segmentation processing A1, the interpolation processing A2, and the synthesis processing A3 makes it possible to increase the signal-to-noise ratio (S/N ratio) in the captured image. Further, in a case where the imaging device 1 captures an image of a bright subject, the conversion gain GC is decreased; therefore, the image segmentation processing A1, the interpolation processing A2, and the synthesis processing A3 are not performed. This makes it possible to increase resolution in the captured image in the imaging device 1. That is, in a case where an image of a bright subject is captured, less noises are generated, not performing the image segmentation processing A1, the interpolation processing A2, and the synthesis processing A3 makes it possible to increase resolution. This consequently makes it possible to enhance image quality of the captured image in the imaging device 1.

[Effects]

A described above, in the present embodiment, the image segmentation processing, the interpolation processing, and the synthesis processing are performed, which makes it possible to increase the signal-to-noise ratio in the captured image. This makes it possible to enhance image quality of the captured image.

In the present embodiment, in the image segmentation processing, the arrangement patterns of the pixel values are checkered patterns, which makes it possible to make a reduction in resolution in the horizontal direction and a reduction in resolution in the vertical direction substantially equal to each other, and suppress a reduction in resolution. This makes it possible to enhance image quality of the captured image.

In the present embodiment, in the image segmentation processing, the arrangement patterns of the pixel values in the map data MG11, MB11, and MR11 are the same as each other, and the arrangement patterns of the pixel values in the map data MG12, MB12, and MR12 are the same as each other, which makes it possible to simplify a circuit configuration of the image segmentation processing section.

In the present embodiment, the interpolating methods for generating six map data in the interpolation processing are the same as each other, which makes it possible to simplify a circuit configuration of the interpolation processing section.

In the present embodiment, in the image segmentation processing, the arrangement patterns of the pixel values in the map data MG11, MB11, and MR11 are the same as each other, and the arrangement patterns of the pixel values in the map data MG12, MB12, and MR12 are the same as each other. Further, in the interpolation processing, the interpolating methods for generating six map data are the same as each other. This makes it possible to reduce a possibility that false colors occur, which makes it possible to enhance image quality of the captured image.

In the present embodiment, it is possible to control whether or not to perform the image segmentation processing, the interpolation processing, and the synthesis processing, which makes it possible to enhance image quality of the captured image.

Modification Example 1-1

Figure 11:
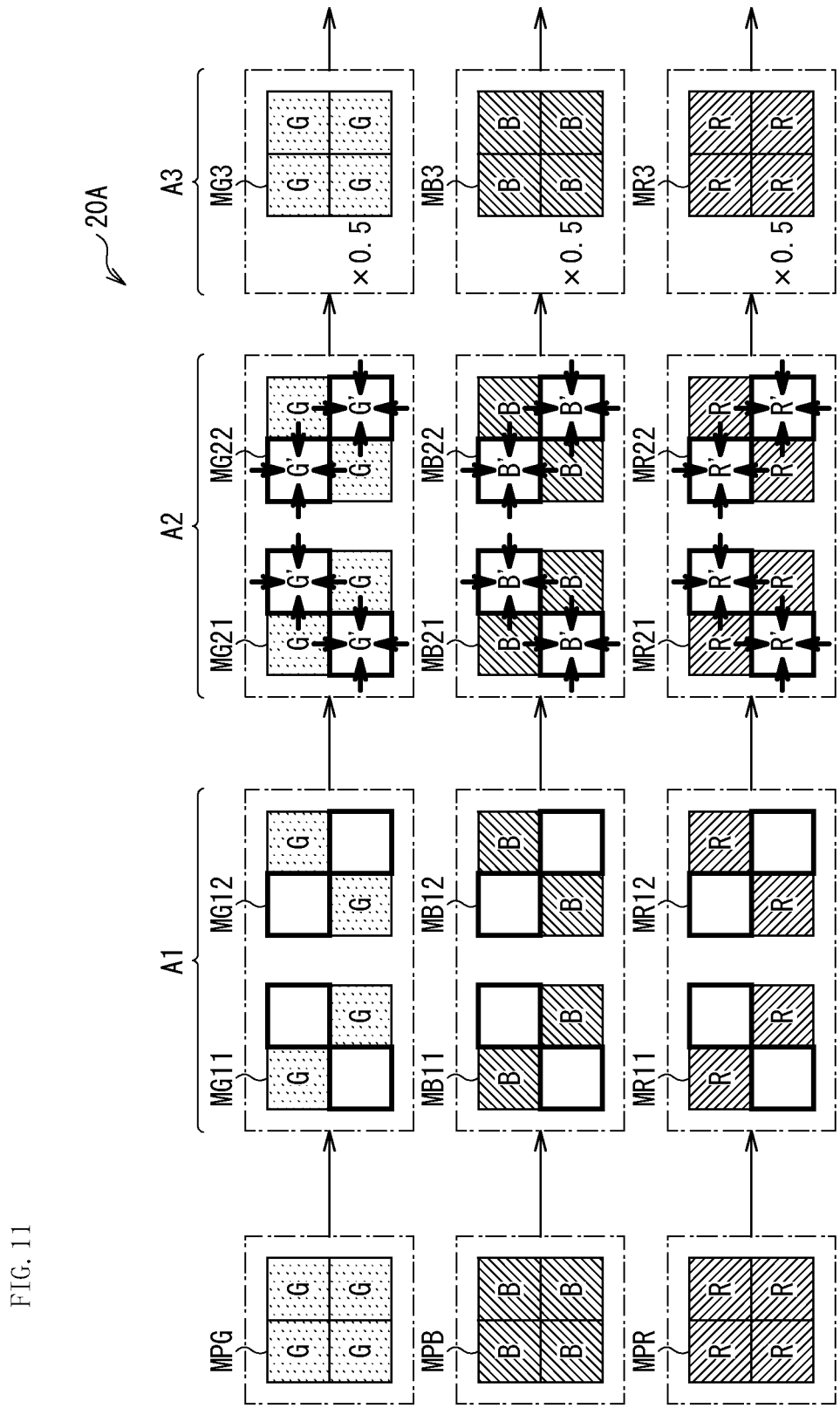
FIG. 11 is an explanatory diagram illustrating an operation example of an image processing section according to a modification example.

In the embodiment described above, for example, the synthesis processing section 24 sums the pixel values at positions corresponding to each other in two map data MG21 and MG22 to generate a pixel value at a position corresponding to the positions in the map data MG3; however, this is not limitative. Alternatively, for example, as illustrated in an imaging device 1A in FIG. 11, pixel values at positions corresponding to each other in two map data MG21 and MG22 may be summed and a summation of the pixel values may be halved, thereby generating a pixel value at a position corresponding to the positions in the map data MG3. This makes it possible to make the pixel value in the map data MG3 substantially equal to the pixel value in the image map data MPG. The same applies to the map data MB3 and MR3. This makes it possible to reduce the number of bits in a digital code indicating each of the pixel values in the map data MG3, MB3, and MR3 while maintaining the signal-to-noise ratio. This consequently makes it possible to facilitate design of a dynamic range in the signal processing section 25.

Modification Example 1-2

In the embodiment described above, the arrangement patterns PAT of the pixel values in the image segmentation processing A1 are checkered patterns in units of one pixel value, but this is not limitative. The present modification example is described in detail with some examples below. It is to be noted that map data related to green (G) is described below as an example, but the same applies to map data related to blue (B) and map data related to red (R).
(Other Checkered Patterns)

Figure 12A:
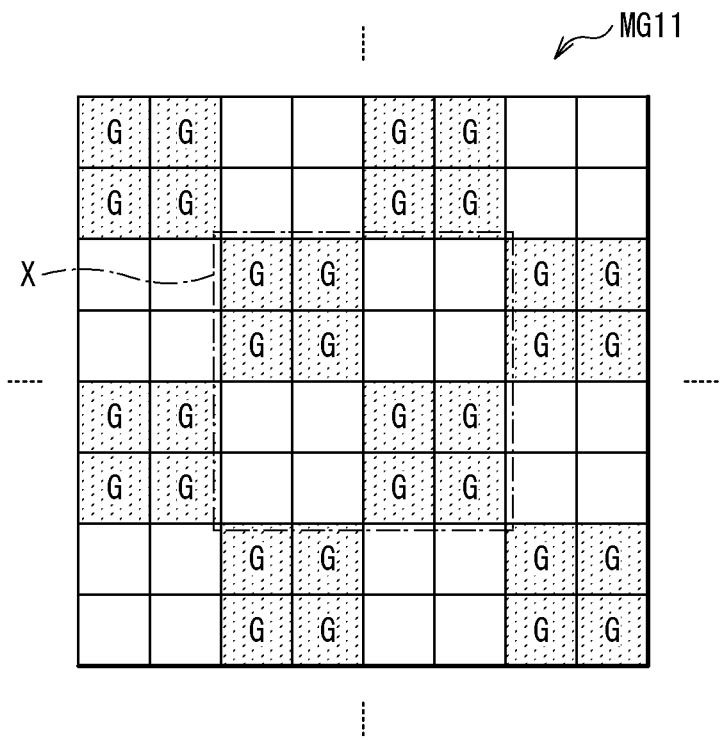
FIG. 12A is another explanatory diagram illustrating an example of map data according to another modification example.
Figure 12B:
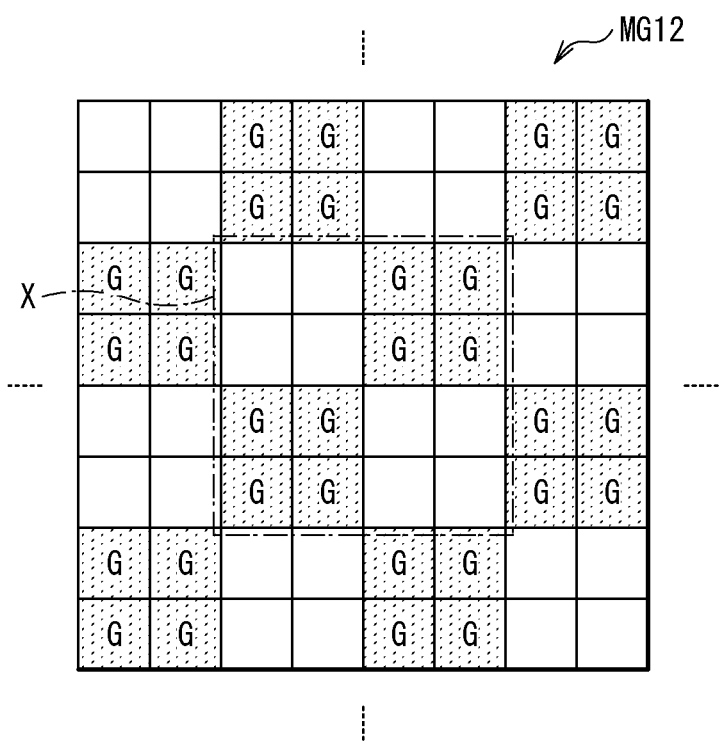
FIG. 12B is another explanatory diagram illustrating an example of map data according to another modification example.

FIGS. 12A and 12B illustrate examples of map data MG11 and MG12 in a case where the arrangement patterns PAT of the pixel values are checkered patterns in units of four pixel values arranged in two rows and two columns. A pitch in the horizontal direction (the lateral direction) in the arrangement patterns PAT illustrated in FIGS. 12A and 12B is twice a pitch in the vertical direction in the arrangement patterns PAT illustrated in FIGS. 8A and 8B. Similarly, a pitch in the vertical direction (the longitudinal direction) in the arrangement patterns PAT illustrated in FIGS. 12A and 12B is twice a pitch in the vertical direction in the arrangement patterns PAT illustrated in FIGS. 8A and 8B. The arrangement patterns PAT of the pixel values in the map data MG11 and MG12 are shifted by two pixels in the horizontal direction and the vertical direction from each other.

Figure 13A:
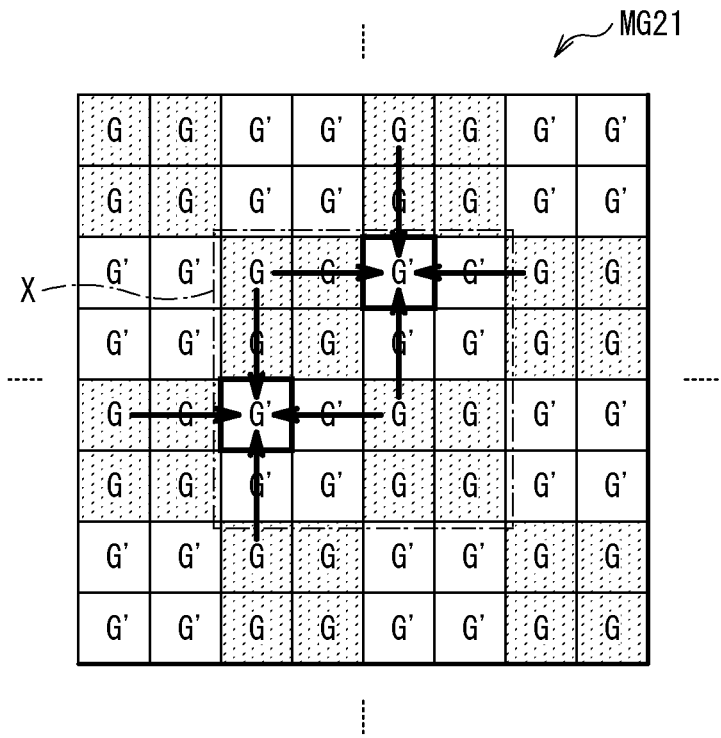
FIG. 13A is another explanatory diagram illustrating an example of map data according to another modification example.
Figure 13B:
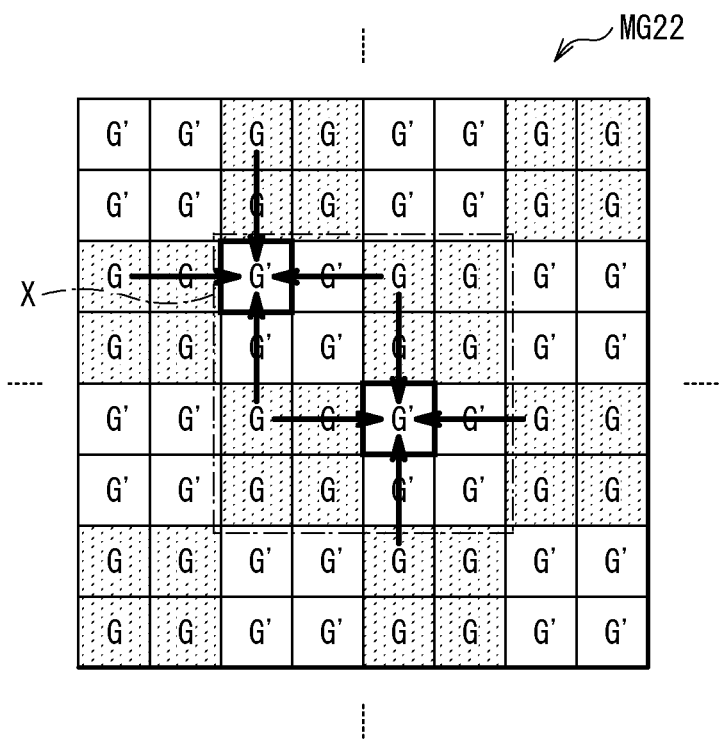
FIG. 13B is another explanatory diagram illustrating an example of map data according to another modification example.

FIGS. 13A and 13B illustrate examples of the map data MG21 and MG22 generated by performing the interpolation processing A2 on the basis of the map data MG11 and MG12 illustrated in FIGS. 12A and 12B. For example, it is possible for the interpolation processing section 23 to determine a pixel value at a position where no pixel value is present by performing the interpolation processing A2 on the basis of pixel values located two rows above, two columns to the left of, two rows below, and two columns to the right of the position where no pixel value is present.
(Striped Pattern)

Figure 14A:
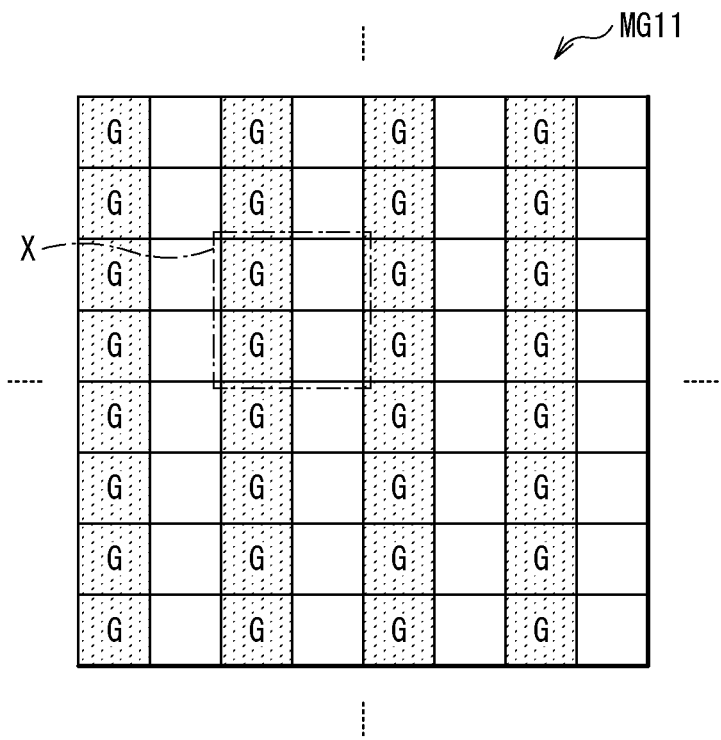
FIG. 14A is another explanatory diagram illustrating an example of map data according to another modification example.
Figure 14B:
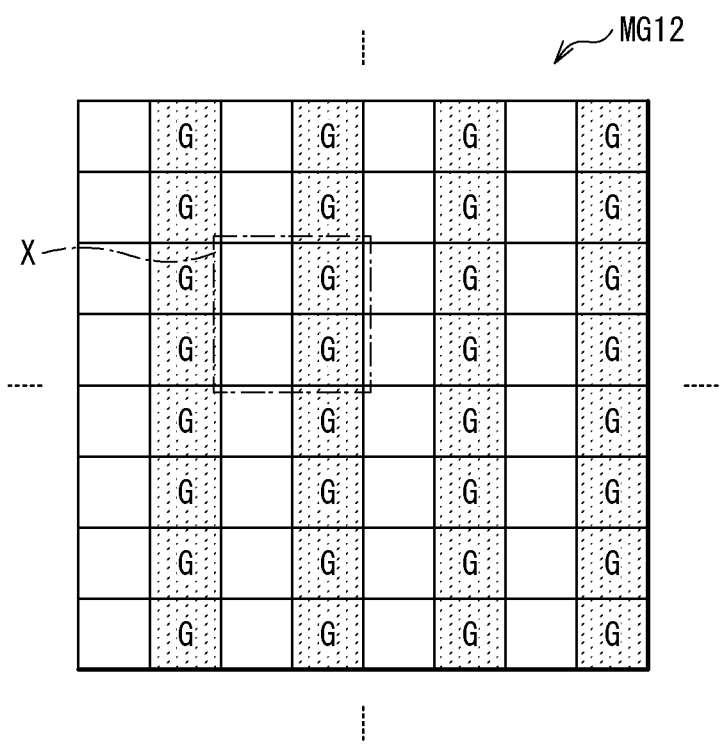
FIG. 14B is another explanatory diagram illustrating an example of map data according to another modification example.

FIGS. 14A and 14B illustrate examples of the map data MG11 and MG12 in a case where the arrangement patterns PAT of the pixel values are striped patterns in which the positions where a pixel value is present and the positions where no pixel value is present are arranged alternately in the horizontal direction (the lateral direction). The arrangement patterns PAT of the pixel values in the map data MG11 and MG12 are shifted by one pixel in the horizontal direction to each other.

Figure 15A:
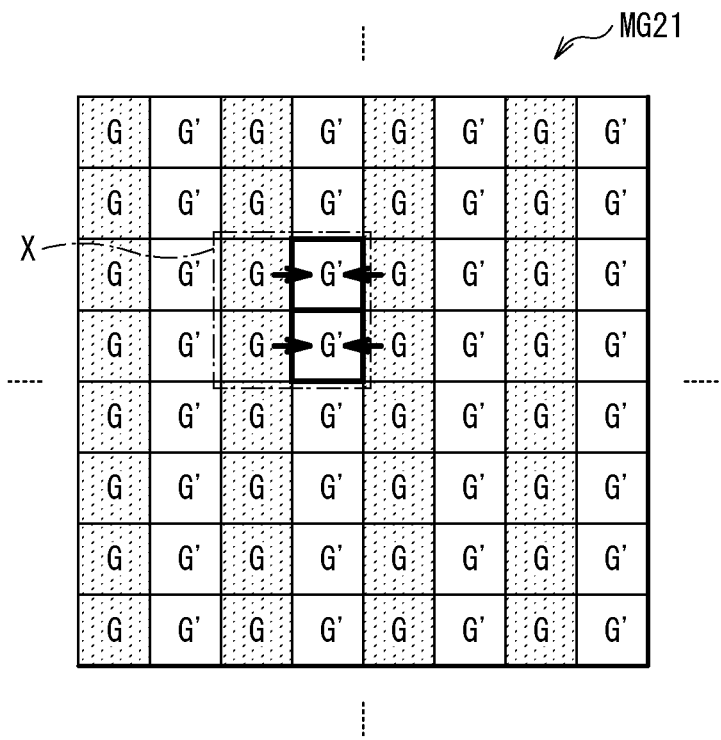
FIG. 15A is another explanatory diagram illustrating an example of map data according to another modification example.
Figure 15B:
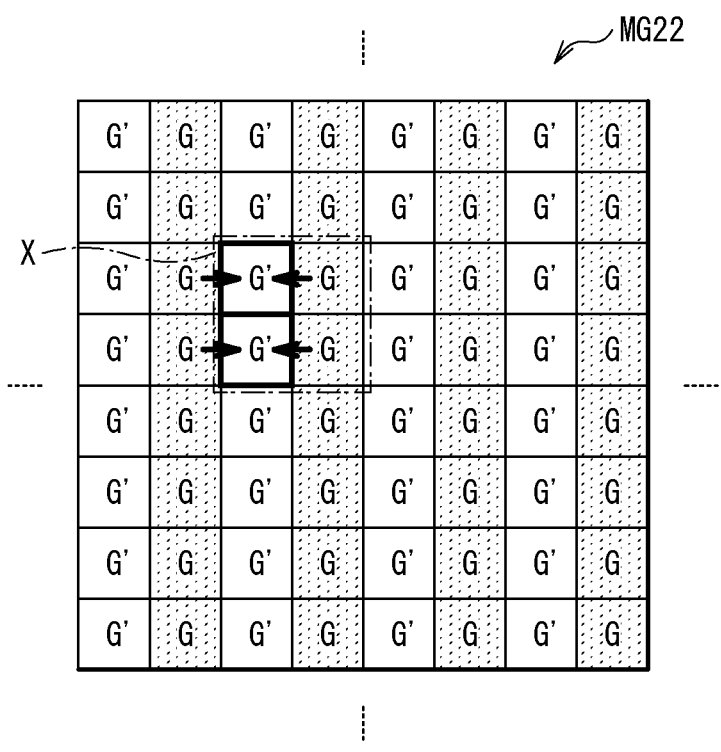
FIG. 15B is another explanatory diagram illustrating an example of map data according to another modification example.

FIGS. 15A and 15B illustrate examples of the map data MG21 and MG22 generated by performing the interpolation processing A2 on the basis of the map data MG11 and MG12 illustrated in FIGS. 14A and 14B. It is possible for the interpolation processing section 23 to determine a pixel value at a position where no pixel value is present by performing the interpolation processing A2 on the basis of pixel values located one column to the left of and one column to the right of the position where no pixel value is present.

Figure 16A:
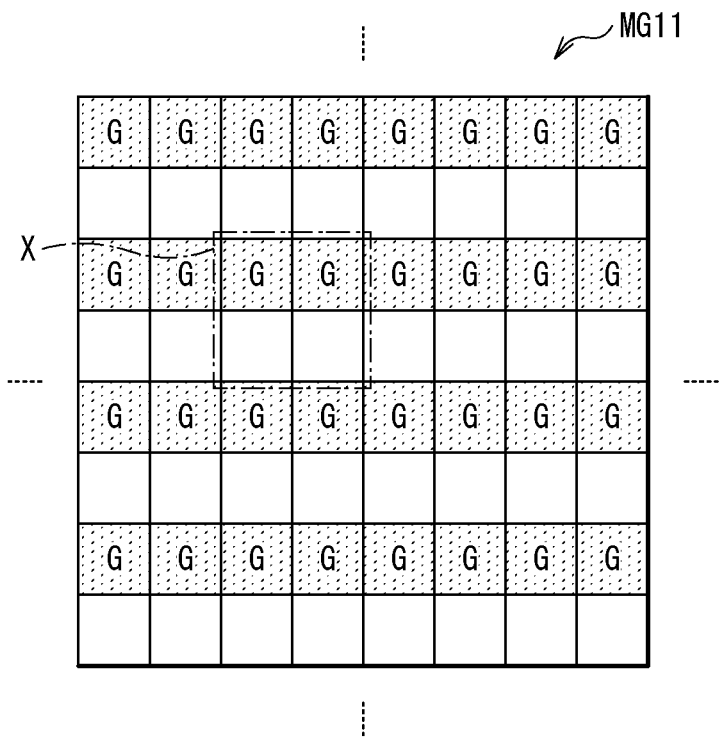
FIG. 16A is another explanatory diagram illustrating an example of map data according to another modification example.
Figure 16B:
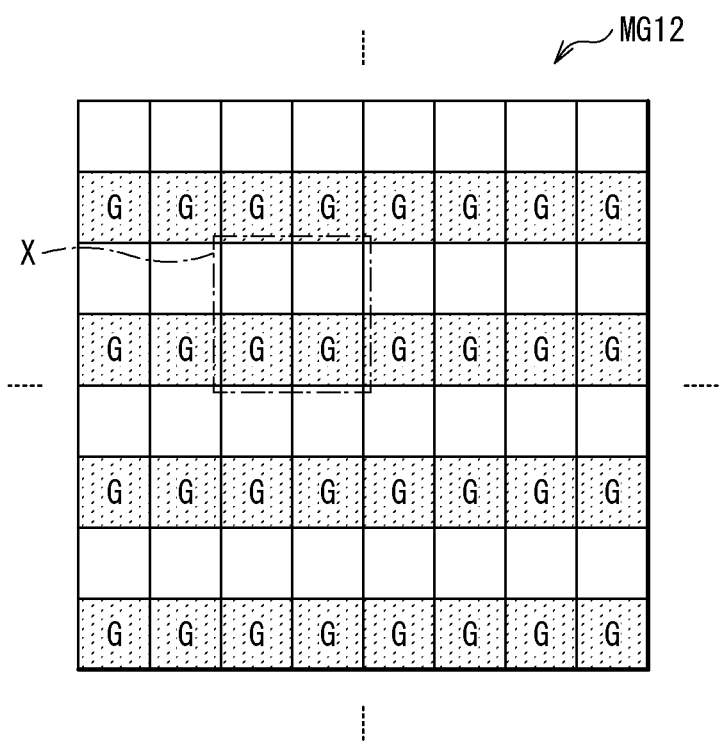
FIG. 16B is another explanatory diagram illustrating an example of map data according to another modification example.

FIGS. 16A and 16B illustrate examples of the map data MG11 and MG12 in a case where the arrangement patterns PAT of the pixel values are striped patterns in which the positions where a pixel value is present and the positions where no pixel value is present are arranged alternately in the vertical direction. The arrangement patterns PAT of the pixel values in the map data MG11 and MG12 are shifted by one pixel in the vertical direction to each other.

FIGS. 17A and 17B illustrate examples of the map data MG21 and MG22 generated by performing the interpolation processing A2 on the basis of the map data MG11 and MG12 illustrated in FIGS. 16A and 16B. It is possible for the interpolation processing section 23 to determine a pixel value at a position where no pixel value is present by performing the interpolation processing A2 on the basis of pixel values located one row above and one row below the position where no pixel value is present.
(Other Patterns)

In the examples described above, for example, the image segmentation processing section 22 generates two map data MG11 and MG12 by performing the image segmentation processing A1 on the basis of one image map data MPG, the interpolation processing section 23 generates two map data MG21 and MG22 by performing the interpolation processing A2 on the two map data MG11 and MG12, and the synthesis processing section 24 generates the map data MG3 by performing the synthesis processing A3 on the basis of the two map data MG21 and MG22, but this is not limitative. Alternatively, for example, the image segmentation processing section 22 may generate three map data MG11, MG12, and MG13 by performing the image segmentation processing A1 on the basis of, for example, one image map data MPG, the interpolation processing section 23 may generate three map data MG21, MG22, and MG23 by performing the interpolation processing A2 on the three map data MG11, MG12, and MG13, and the synthesis processing section 24 may generate map data MG3 by performing the synthesis processing A3 on the basis of the three map data MG21, MG22, and MG23.

Figure 18A:
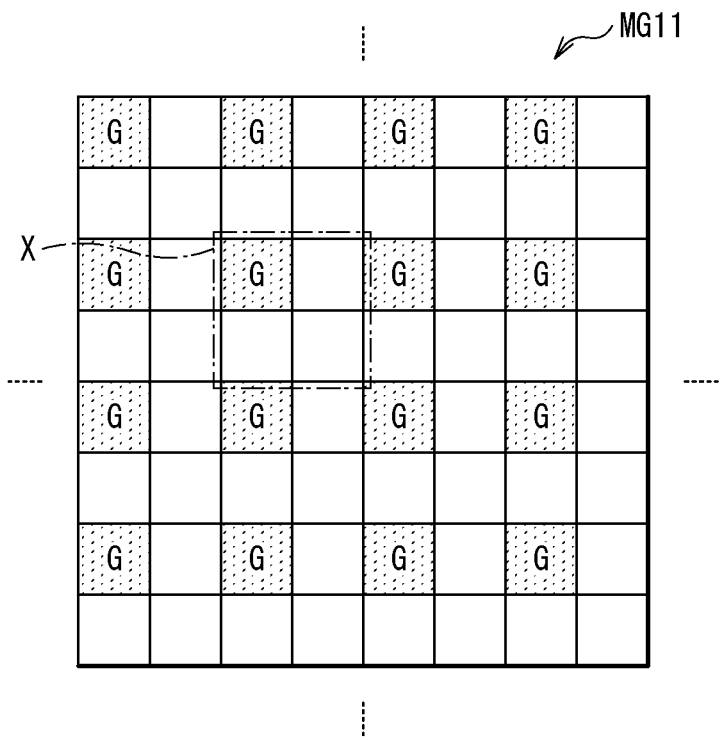
FIG. 18A is another explanatory diagram illustrating an example of map data according to another modification example.
Figure 18B:
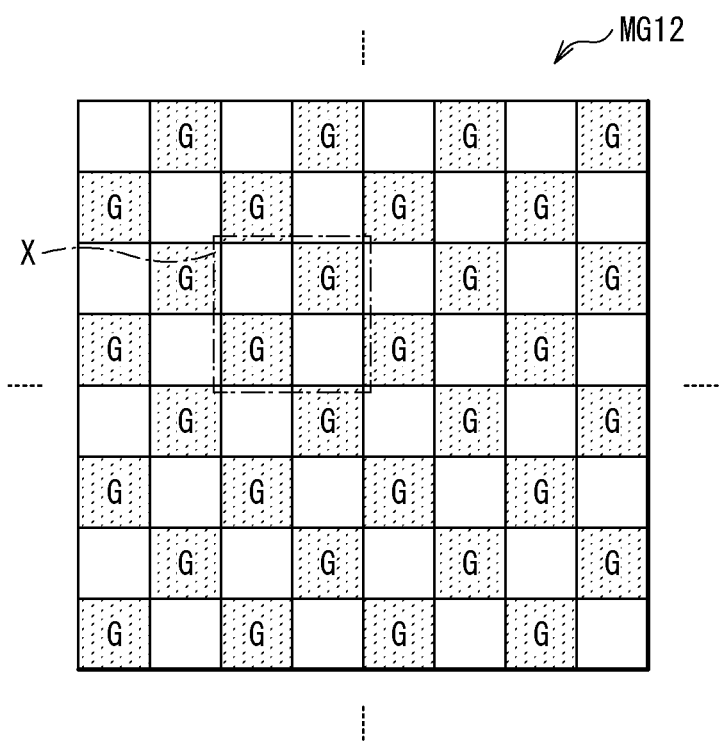
FIG. 18B is another explanatory diagram illustrating an example of map data according to another modification example.
Figure 18C:
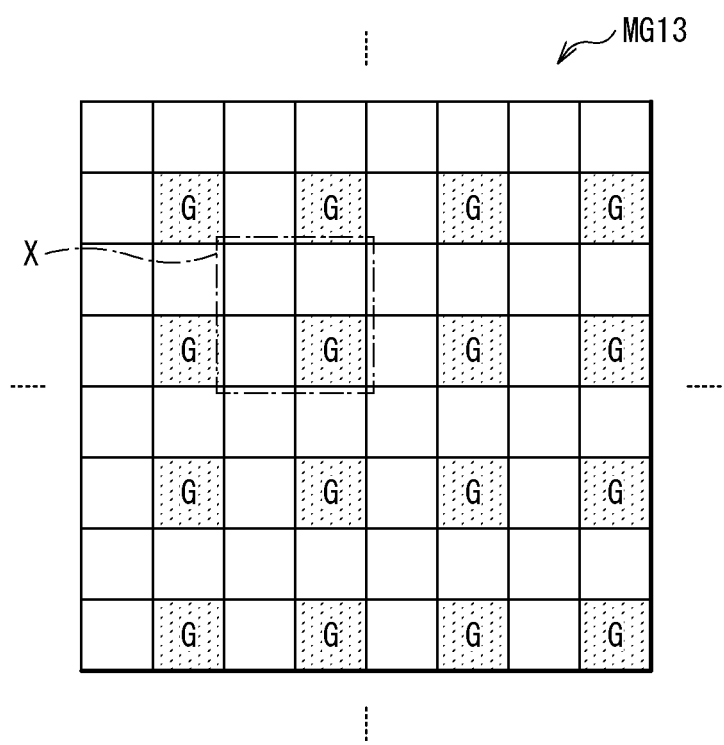
FIG. 18C is another explanatory diagram illustrating an example of map data according to another modification example.

FIGS. 18A, 18B, and 18C illustrate examples of the map data MG11, MG12, and MG13 in a case where the arrangement patterns PAT of the pixel values are patterns such as a so-called Bayer array. Specifically, for example, in the map data MG11, as illustrated in FIG. 8A, in the region X, a pixel value is present on the upper left and no pixel value is present on the lower left, the upper right and the lower right. In the map data MG12, as illustrated in FIG. 8B, in the region X, pixel values are present on the lower left and the upper right, and no pixel value is present on the upper left and the lower right. In the map data MG13, as illustrated in FIG. 8C, in the region X, a pixel value is present on the lower right, and no pixel value is present on the upper left, the lower left, and the upper right. The pixel value at each position in the map data MG 11 is the same as the pixel value at a corresponding position in the image map data MPG, the pixel value at each position in the map data MG12 is the same as the pixel value at a corresponding position in the image map data MPG, and the pixel value at each position in the map data MG13 is the same as the pixel value at a corresponding position in the image map data MPG.

Figure 19A:
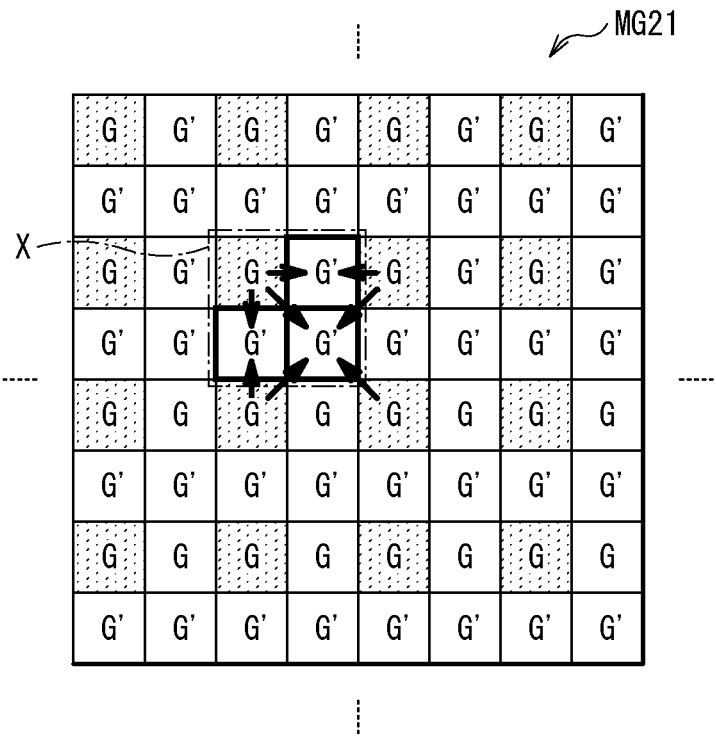
FIG. 19A is another explanatory diagram illustrating an example of map data according to another modification example.
Figure 19B:
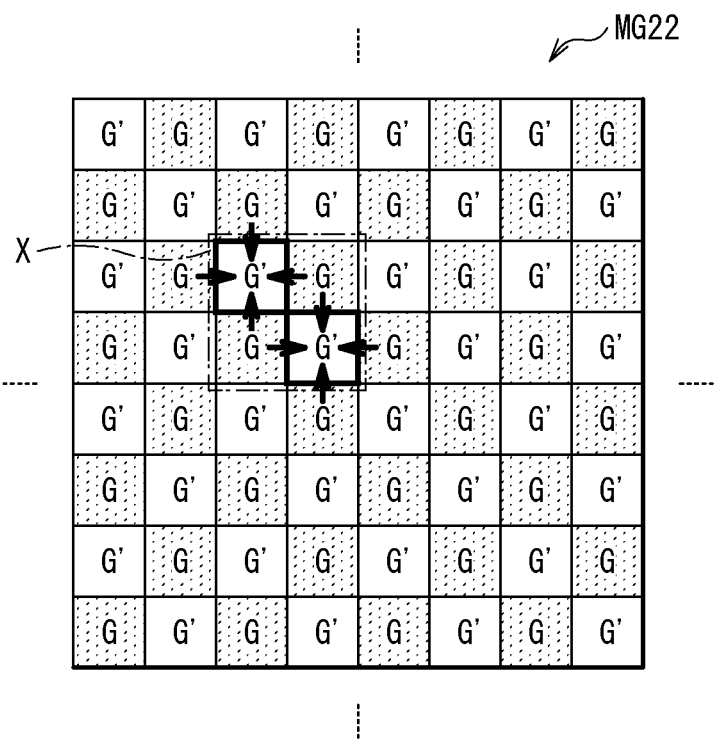
FIG. 19B is another explanatory diagram illustrating an example of map data according to another modification example.
Figure 19C:
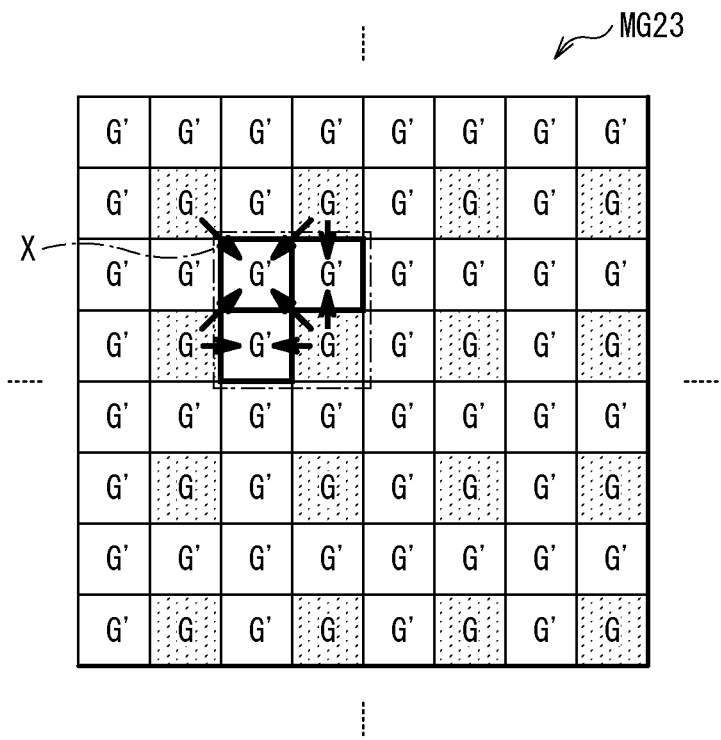
FIG. 19C is another explanatory diagram illustrating an example of map data according to another modification example.

FIGS. 19A, 19B, and 19C illustrate examples of the map data MG21, MG22, and MG23 generated by performing the interpolation processing A2 on the basis of the map data MG11, MG12, and MG13 illustrated in FIGS. 18A, 18B, and 18C. In a case where pixel values are located above and below the position where no pixel value is present, the interpolation processing section 23 performs the interpolation processing A2 on the map data MG11 and MG13 (FIGS. 18A and 18C) on the basis of these two pixel values. In a case where pixel values are located to the left and the right of the position where no pixel value is present, the interpolation processing section 23 performs the interpolation processing A2 on the map data MG11 and MG13 on the basis of these two pixel values. In a case where pixel values are located on the upper left, the lower left, the upper right, and the lower right of the position where no pixel value is present, the interpolation processing section 23 performs the interpolation processing A2 on the map data MG11 and MG13 on the basis of these four pixel values. Thus, the map data MG21 and MG23 are generated. In addition, the interpolation processing section 23 generates map data MG22 by performing the interpolation processing A2 on the map data MG12 (FIG. 18B) on the basis of four pixel values located above, below and to the left, and to the right of the position where no pixel value is present.

Figure 20:
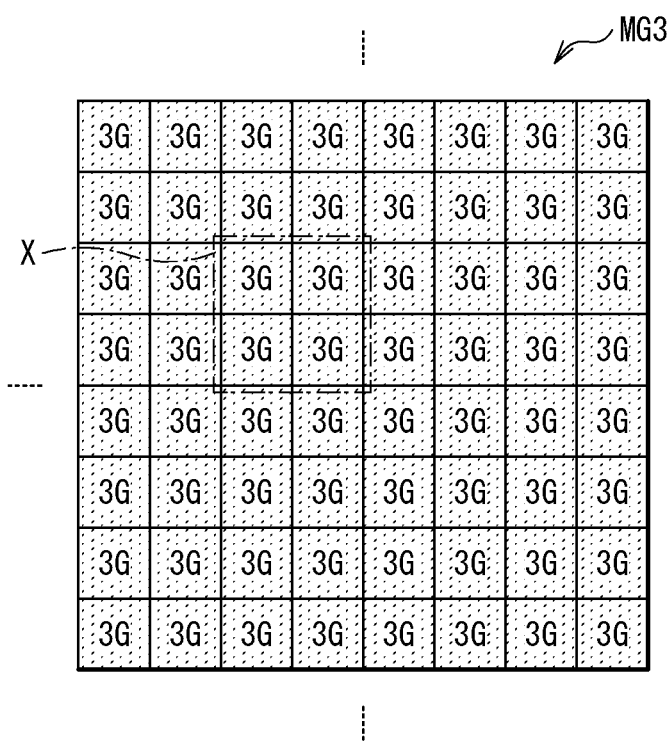
FIG. 20 is another explanatory diagram illustrating an example of map data according to another modification example.

FIG. 20 illustrates an example of the map data MG3 generated by performing the synthesis processing A3 on the basis of the map data MG21, MG22, and MG23 illustrated in FIGS. 19A, 19B, and 19C. The synthesis processing section 24 sums pixel values at positions corresponding to each other in the three map data MG21, MG22, and MG23 to generate a pixel value at a position corresponding to the positions in the map data MG3. In FIG. 20, "3G" indicates that a pixel value becomes about three times the pixel value in the image map data MPG by the synthesis processing A3.

Modification Example 1-3

In the embodiment described above, the interpolation processing section 23 performs the interpolation processing A2, but the interpolating method in the interpolation processing A2 may be changeable. The present modification example is described in detail below.

Figure 21:
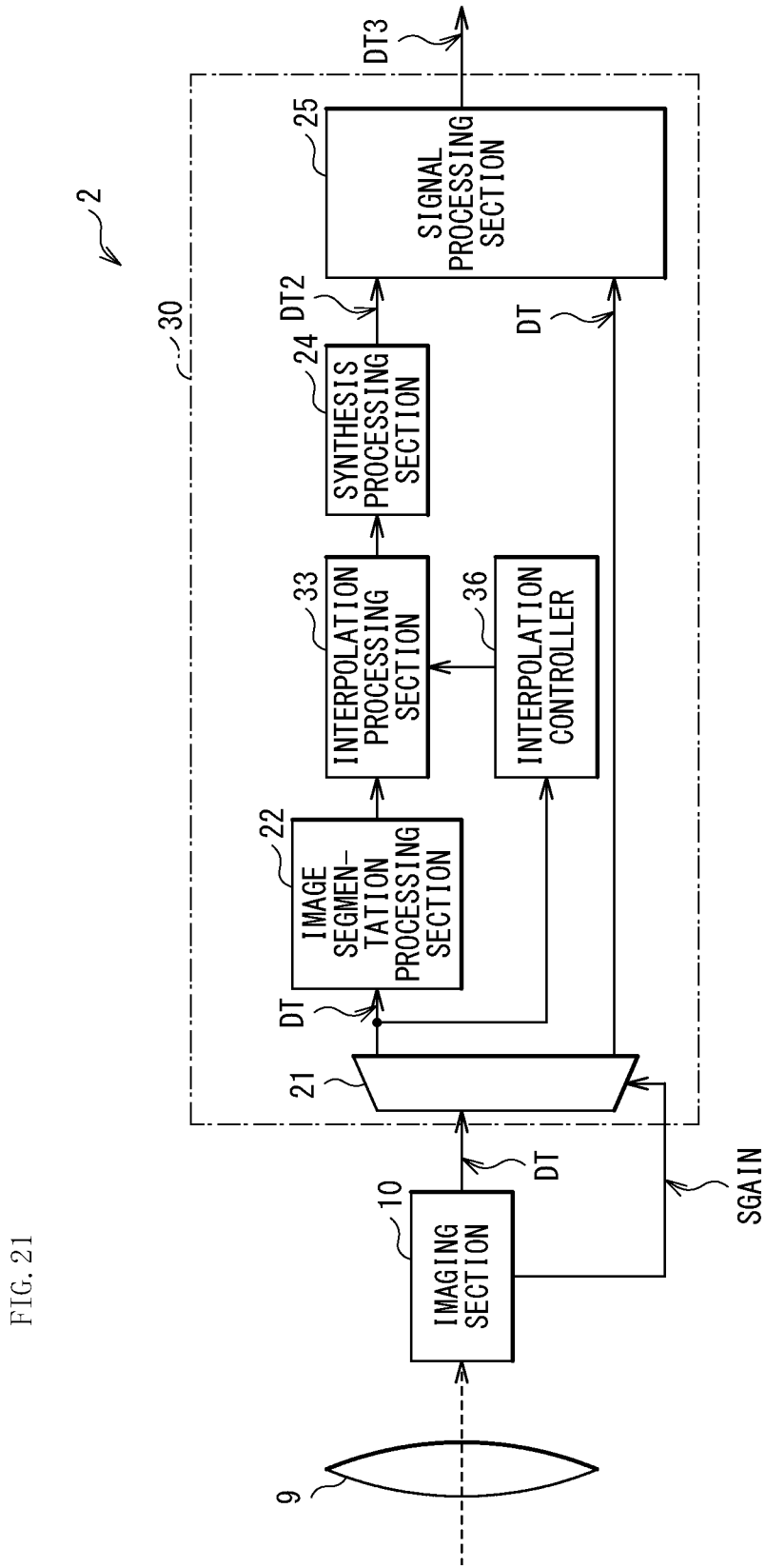
FIG. 21 is a block diagram illustrating a configuration example of an imaging device according to another modification example.

FIG. 21 illustrates a configuration example of an imaging device 2 according to the present modification example. The imaging device 2 includes an image processing section 30. The image processing section 30 includes an interpolation controller 36 and an interpolation processing section 33.

The interpolation controller 36 performs interpolation control processing B1 on the basis of the image map data MPG, MPB, and MPR included in the image signal DT to determine the interpolation method in the interpolation processing A2 in the interpolation processing section 33. The interpolation controller 36 corresponds to a specific example of an "interpolation controller" in the present disclosure.

The interpolation processing section 33 respectively performs the interpolation processing A2 on the six map data MG11, MG12, MB11, MB12, MR11, and MR12 supplied from the image segmentation processing section 22 with use of an interpolation method instructed by the interpolation controller 36 to generate six map data MG21, MG22, MB21, MB22, MR21, and MR22.

Figure 22:
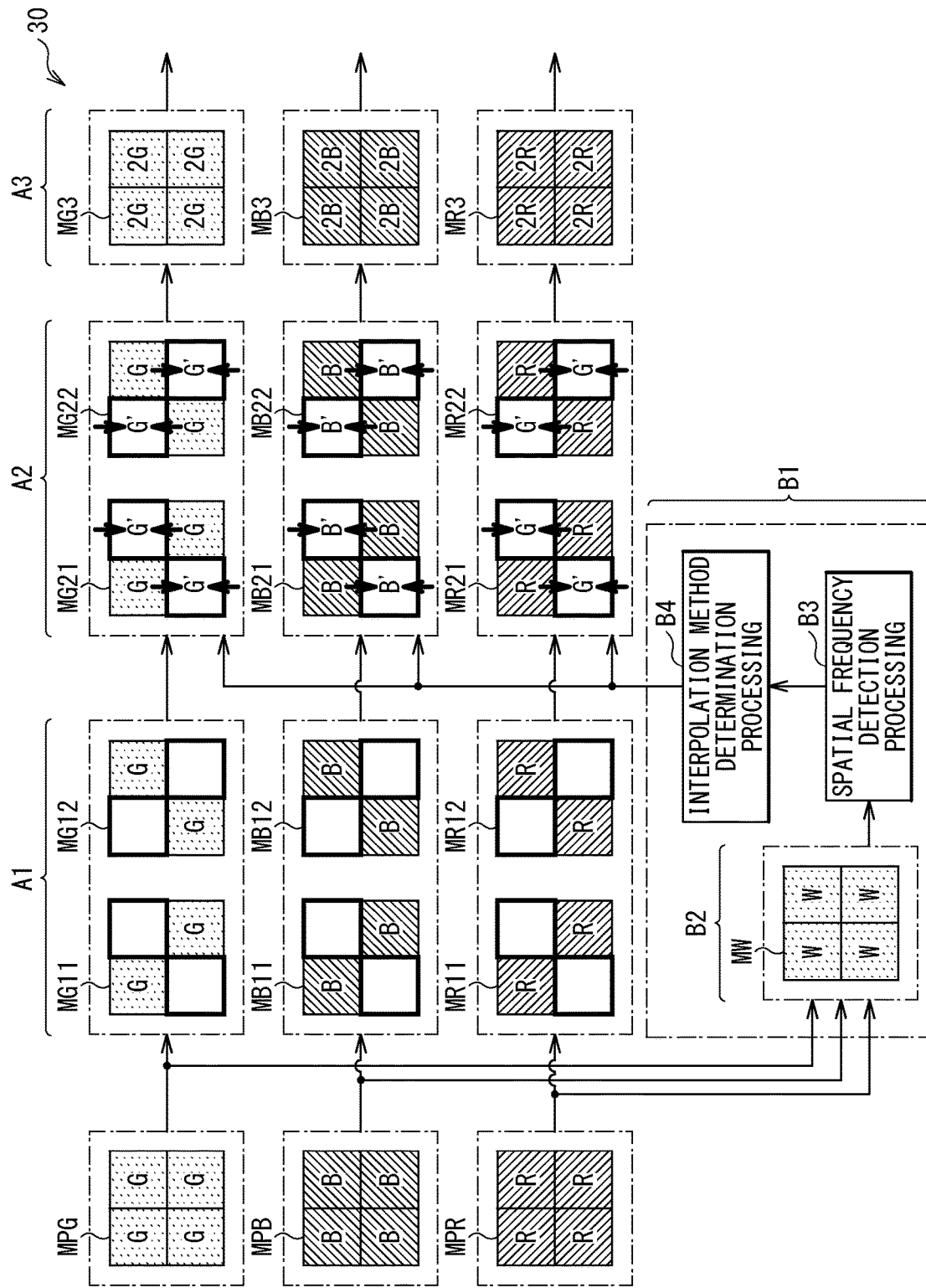
FIG. 22 is an explanatory diagram illustrating an operation example of an image processing section illustrated in FIG. 21.

FIG. 22 schematically illustrates examples of the image segmentation processing A1, the interpolation control processing B1, the interpolation processing A2, and the synthesis processing A3 in the image processing section 30.

The interpolation controller 36 first performs synthesis processing B2 on the basis of the image map data MPG, MPB, and MPR included in the image signal DT to generate map data MW. In this synthesis processing B2, the interpolation controller 36 sums pixel values at positions corresponding to each other in the three image map data MPR, MPB, and MPR, which makes it possible to generate a pixel value at a position corresponding to the positions in the map data MW.

Next, the interpolation controller 36 performs spatial frequency detection processing B3 on the basis of this map data MW to detect a spatial frequency. In this spatial frequency detection processing B3, the interpolation controller 36 divides one frame image into a plurality of image regions, and determines a spatial frequency in each of the image regions on the basis of the map data MW.

Next, the interpolation controller 36 performs interpolation method determination processing B4 on the basis of the spatial frequency determined by the spatial frequency detection processing B3 to determine the interpolation method in the interpolation processing A2.

Figure 23A:
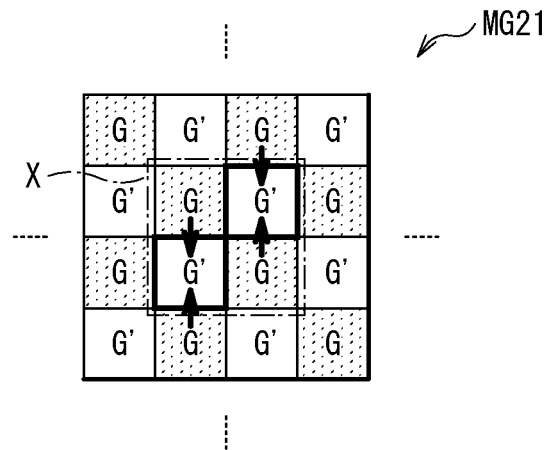
FIG. 23A is an explanatory diagram illustrating an operation example of the image processing section illustrated in FIG. 21.
Figure 23B:
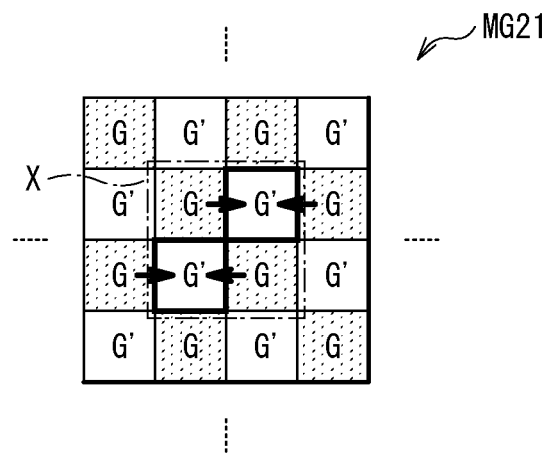
FIG. 23B is an explanatory diagram illustrating an operation example of the image processing section illustrated in FIG. 21.
Figure 23C:
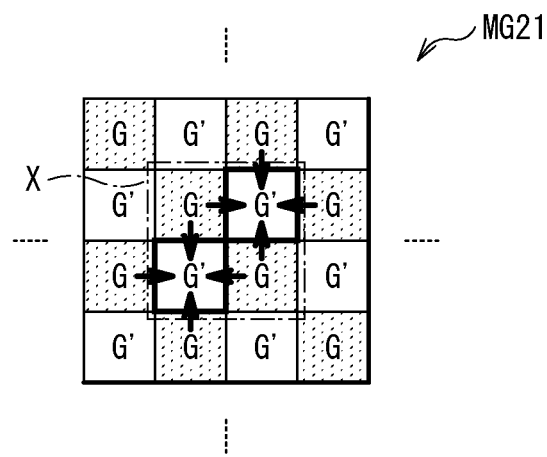
FIG. 23C is an explanatory diagram illustrating an operation example of the image processing section illustrated in FIG. 21.

FIGS. 23A, 23B, and 23C illustrate examples of the interpolation method in the interpolation processing A2. These diagrams illustrate the map data MG21 generated by performing the interpolation processing A2. In the interpolation method illustrated in FIG. 23A, a pixel value at a position where no pixel value is present is determined on the basis of pixel values located one row above and one row below the position where no pixel value is present. That is, in the example in FIG. 23A, a direction (an interpolation direction) in which the interpolation processing is performed is the vertical direction (the longitudinal direction). In the interpolating method illustrated in FIG. 23B, a pixel value at a position where no pixel value is present is determined on the basis of pixel values located one column to the left of and one column to the right of the position where no pixel value is present. That is, in the example in FIG. 23B, the direction (the interpolation direction) in which the interpolation processing is performed is the horizontal direction (the lateral direction). In addition, in the interpolation method illustrated in FIG. 23C, a pixel value at a position where no pixel value is present is determined on the basis of pixel values located one row above, one row below, one column to the left and one column to the right of the position where no pixel value is present. That is, in the example in FIG. 23C, the direction (the interpolation direction) in which the interpolation processing is performed is the vertical direction and the horizontal direction. It is to be noted that three examples have been described in FIGS. 23A to 23C, but the interpolation method is not limited thereto.

In the interpolation method determination processing B4, the interpolation controller 36 determines the interpolation method in the interpolation processing A2 on the basis of the spatial frequency in each of the image regions. Specifically, in a case where the interpolation controller 36 decides that an image in a certain image region is a vertically striped pattern on the basis of the spatial frequency in the certain image region, the interpolation controller 36 selects the interpolation method (FIG. 23A) in which the interpolation direction is the vertical direction. Further, for example, in a case where the interpolation controller 36 decides that an image in a certain image region is a horizontally striped pattern on the basis of the spatial frequency in the certain image region, the interpolation controller 36 selects the interpolation method (FIG. 23B) in which the interpolation direction is the horizontal direction. Then, the interpolation controller 36 provides an instruction on the interpolation method for each of the image regions to the interpolation processing section 33.

The interpolation processing section 33 respectively performs the interpolation processing A2 on six map data MG11, MG12, MB11, MB12, MR11, and MR12 supplied from the image segmentation processing section 22 with use of the interpolation method instructed for each of the image regions from the interpolation controller 36 to generate six map data MG21, MG22, MB21, MB22, MR21, and MR22. The interpolation methods for generating the six map data MG21, MG22, MB21, MB22, MR21, and MR22 are the same as each other.

As described above, in the imaging device 2, the interpolation method in the interpolation processing A2 is changeable, which makes it possible to use an optimal interpolation method according to imaging pixels. This makes it possible to enhance image quality of a captured image.

In particular, in the imaging device 2, the map data MW is generated by performing the synthesis processing B2 on the basis of the image map data MPG, MPB, and MPR, and the spatial frequency is detected on the basis of this map data MW. Thus, it is possible to detect the spatial frequency with high accuracy in the imaging device 2, and the interpolation processing A2 is performed on the basis of the thus-obtained spatial frequency, which makes it possible to enhance accuracy of the interpolation processing A2. This consequently makes it possible for the imaging device 2 to achieve a higher restoring effect, which makes it possible to enhance image quality of a captured image.

Figure 24:
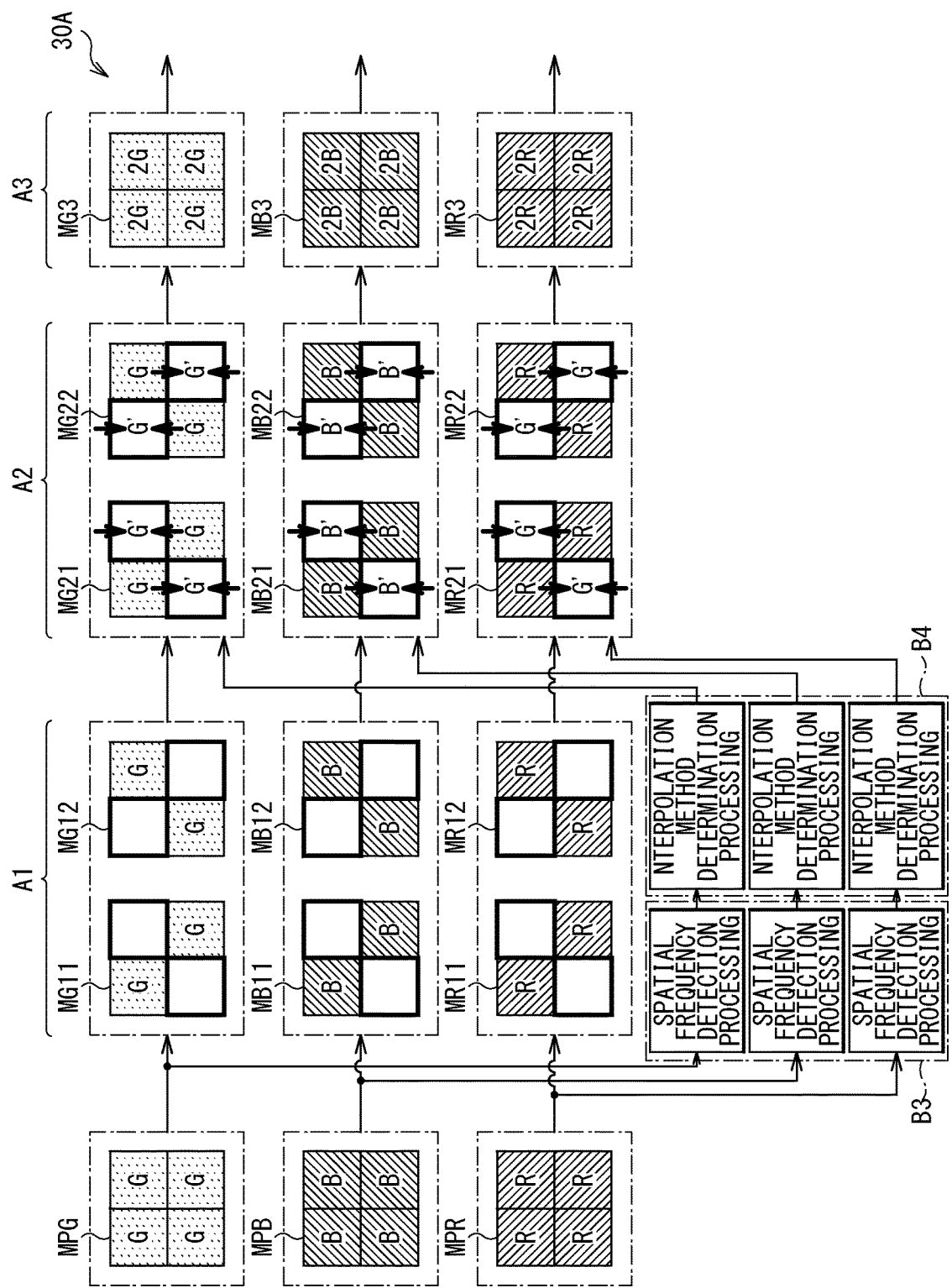
FIG. 24 is an explanatory diagram illustrating an operation example of an image processing section according to another modification example.

It is to be noted that in this example, the map data MW is generated by performing the synthesis processing B2 on the basis of the image map data MPG, MPB, and MPR, and the spatial frequency is detected on the basis of the map data MW, but this is not limitative. Alternatively, for example, as in an image processing section 30A illustrated in FIG. 24, the spatial frequency detection processing B3 may be performed on the basis of the image map data MPG related to green (G), and the interpolation method in the interpolation processing A2 for generating the map data MG21 and MG22 of green (G) may be determined for each of the image regions on the basis of the spatial frequency in each of the image regions obtained by this spatial frequency detection processing B3. The same applies to the image map data MPB and MPR. In addition, this is not limitative. For example, the spatial frequency detection processing B3 may be performed on the basis of the image map data MPG related to green (G), the spatial frequency detection processing B3 may be performed on the basis of the image map data MPB related to blue (B), the spatial frequency detection processing B3 may be performed on the basis of the image map data MPR related to red (R), and the interpolating methods in the interpolation processing A2 for generating the six map data MG21, MG22, MB21, MB22, MR21, and MR22 may be determined collectively for each of the image regions on the basis of the spatial frequency in each of the image regions obtained by the spatial frequency detection processing B3. In this case, it is possible to cause the interpolation methods for generating the six map data MG21, MG22, MB21, MB22, MR21, and MR22 to be the same as each other.

Modification Example 1-4

In the embodiment described above, the image processing section 20 performs the image segmentation processing A1, the interpolation processing A2, and the synthesis processing A3 on the basis of the image map data MPR related to red (R), the image map data MPG related to green (G), and the image map data MPB related to blue (B), but this is not limitative. Alternatively, for example, the image segmentation processing A1, the interpolation processing A2, and the synthesis processing A3 may be performed on the basis of a luminance signal. The present modification example is described in detail below.

Figure 25:
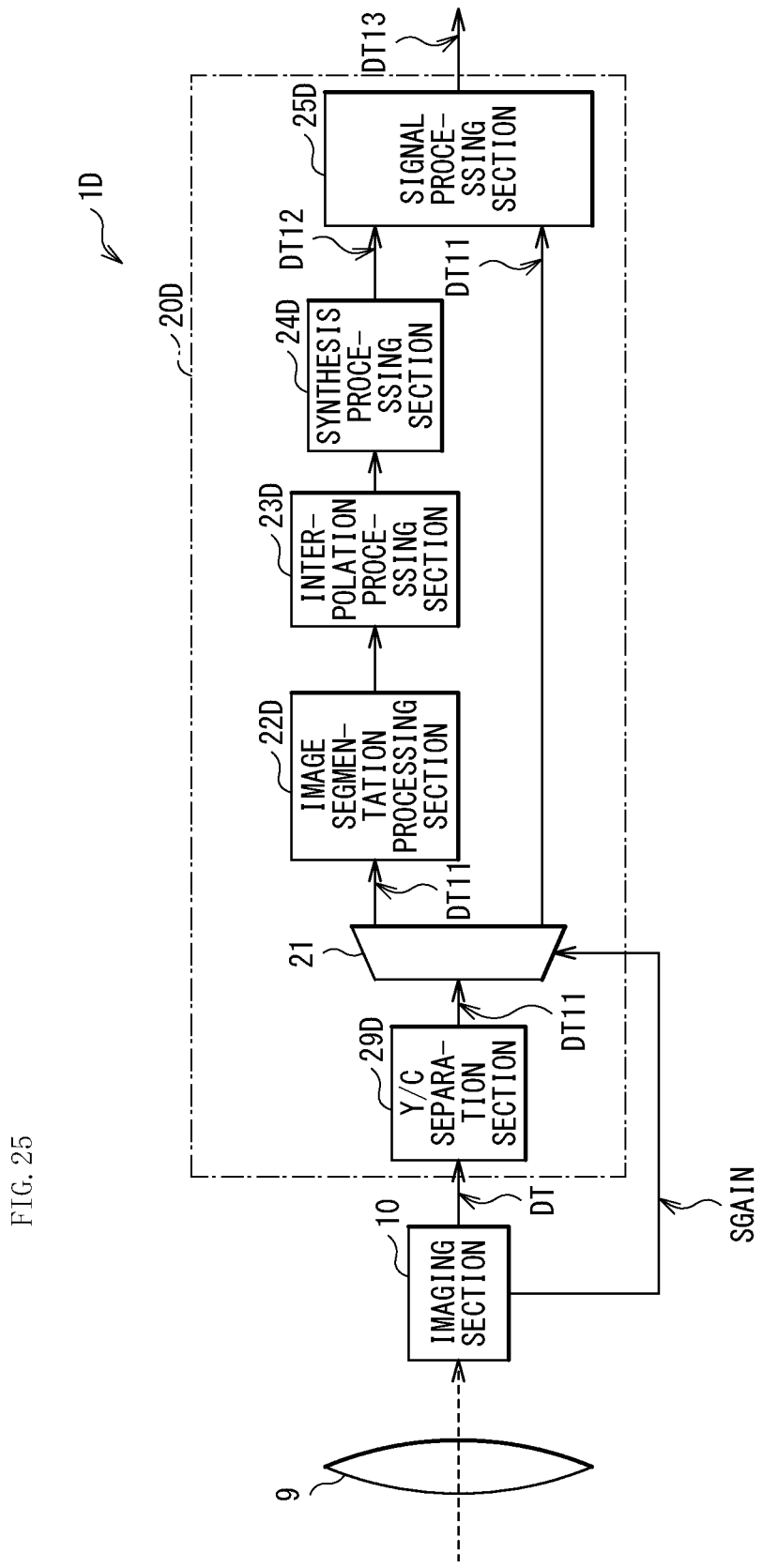
FIG. 25 is a block diagram illustrating a configuration example of an imaging device according to another modification example.

FIG. 25 illustrates a configuration example of an imaging device 1D according to the present modification example. This imaging device 1D includes an image processing section 20D. The image processing section 20D includes a Y/C separation section 29D, an image segmentation processing section 22D, an interpolation processing section 23D, a synthesis processing section 24D, and a signal processing section 25D.

The Y/C separation section 29D separates an RGB signal included in the image signal DT into a luminance (Y) signal and a color (C) signal by performing Y/C separation processing C1, and outputs the luminance signal and the color signal as an image signal DT11. The image signal DT11 includes map data MY, MCr, and MCb. The map data MY includes pixel values for one frame image related to luminance (Y), the map data MCr includes pixel values for one frame image related to an R-Y color difference (Cr), and the map data MCb includes pixel values for one frame image related to a B-Y color difference (Cb). Each of the pixel values is represented by a digital code having a plurality of bits. The Y/C separation section 29D corresponds to a specific example of a "generator" in the present disclosure, respectively.

The image segmentation processing section 22D performs the image segmentation processing A1 on the basis of the map data MY included in the image signal DT11 supplied from the Y/C separation section 29D via the switching section 21 to generate two map data MY11 and MY12. In addition, the image segmentation processing section 22D outputs the map data MCr and MCb included in the image signal DT11 as they are.

The interpolation processing section 23D respectively performs the interpolation processing A2 on the two map data MY11 and MY12 supplied from the image segmentation processing section 22D to generate two map data MY21 and MY22. In addition, the interpolation processing section 23D outputs the map data MCr and MCb supplied from the image segmentation processing section 22D as they are.

The synthesis processing section 24D performs the synthesis processing A3 on the basis of the two map data MY21 and MY22 supplied from the interpolation processing section 23D to generate one map data MY3. Then, the synthesis processing section 24D supplies the map data MY3 generated by the synthesis processing A3 and the map data MCr and MCb supplied from the interpolation processing section 23D as an image signal DT12 to the signal processing section 25D.

The signal processing section 25D performs the predetermined signal processing on the basis of the image signal DT12 supplied from the synthesis processing section 24D or the image signal DT11 supplied from the Y/C separation section 29D via the switching section 21. Then, the signal processing section 25D outputs a processing result of the predetermined signal processing as an image signal DT13.

Figure 26:
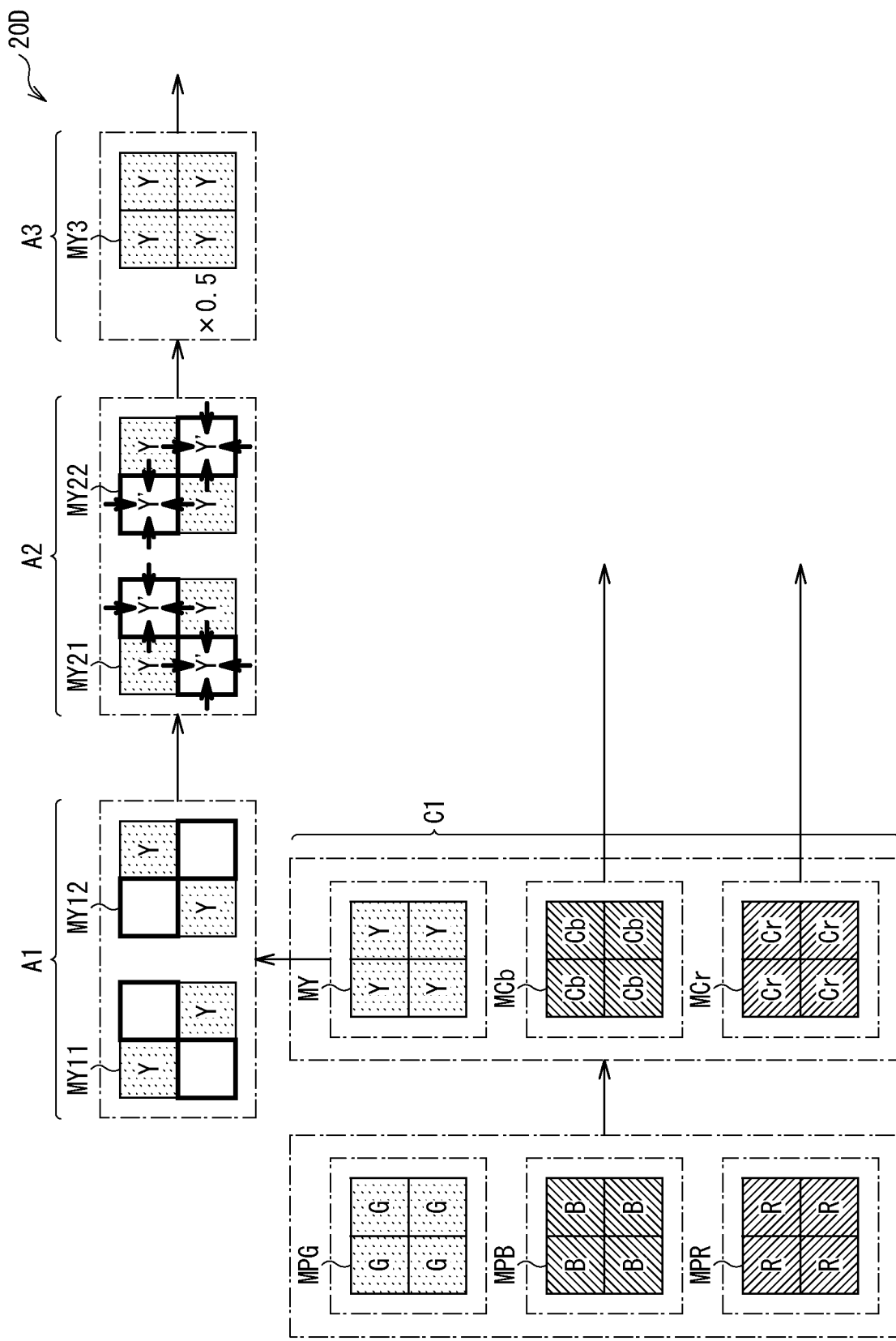
FIG. 26 is an explanatory diagram illustrating an operation example of an image processing section illustrated in FIG. 25.

FIG. 26 schematically illustrates examples of the image segmentation processing A1, the interpolation processing A2, and the synthesis processing A3 in the image processing section 20D.

The Y/C separation section 29D performs the Y/C separation processing C1 to separate the RGB signal included in the image signal DT into the luminance (Y) signal and the color (C) signal. Specifically, the Y/C separation section 29D generates the map data MY, MCb, and MCr on the basis of the image map data MPG, MPB, and MPR. The Y/C separation section 29D generates a pixel value related to luminance (Y) with use of, for example, the following expression, on the basis of pixel values at positions corresponding to each other in the three image map data MPG, MPB, and MPR.

$$VY = VG \times 0.59 + VB \times 0.11 + VR \times 0.3$$

In this expression, "VY" is a pixel value related to luminance (Y), "VG" is a pixel value related to green (G), "VB" is a pixel value related to blue (B), and "VR" is a pixel value related to red (R).

The image segmentation processing section 22D performs the image segmentation processing A1 on the basis of the thus-generated map data MY to generate two map data MY11 and MY12. The interpolation processing section 23D respectively performs the interpolation processing A2 on the two map data MY11 and MY12 to generate two map data MY21 and MY22. The synthesis processing section 24D performs the synthesis processing A3 on the basis of the two map data MY21 and MY22 to generate one map data MY3. Specifically, the synthesis processing section 24D sums pixel values at positions corresponding to each other in the two map data MY21 and MY22 and halves a summation of the pixel values to generate a pixel value at a position corresponding to the positions in the map data MY3. The map data MY corresponds to a specific example of "first image map data" in the present disclosure. The map data MY11 and MY12 correspond to a specific example of a "plurality of first map data" in the present disclosure. The map data MY21 and MY22 correspond to a specific example of a "plurality of second map data" in the present disclosure. The map data MY3 corresponds to a specific example of "third map data" in the present disclosure.

As described above, in the imaging device 1D, it is possible to increase a signal-to-noise ratio (SN ratio) for the luminance signal, which makes it possible to enhance image quality of a captured image. In addition, in this example, the image segmentation processing A1, the interpolation processing A2, and the synthesis processing A3 are performed only on the map data MY related to luminance (Y), which makes it possible to reduce a processing amount. This consequently makes it possible to reduce power consumption in the imaging device 1D, for example.

Anther Modification Example

In addition, two or more of these modification examples may be combined.

2. Second Embodiment

Next, description is given of an imaging device 3 according to a second embodiment. The present embodiment differs from the first embodiment in configurations of blue and red photoelectric converters in an imaging section. It is to be noted that components substantially the same as those of the imaging device 1 according to the first embodiment described above are denoted by the same reference numerals, and description thereof is omitted as appropriate.

Figure 27:
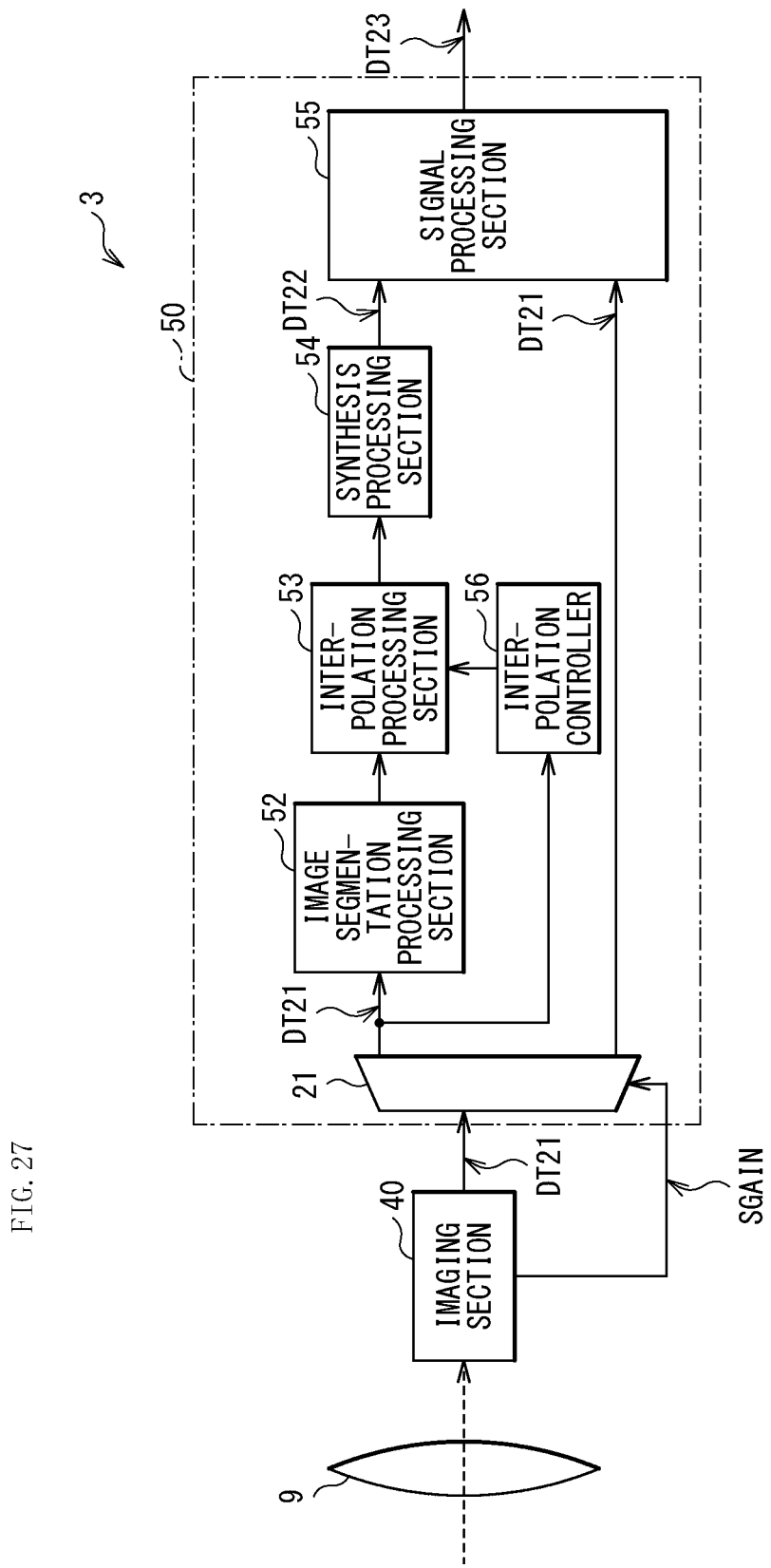
FIG. 27 is a block diagram illustrating a configuration example of an imaging device according to a second embodiment.

FIG. 27 illustrates a configuration example of the imaging device 3 according to the present embodiment. The imaging device 3 includes an imaging section 40 and an image processing section 50.

Figure 28:
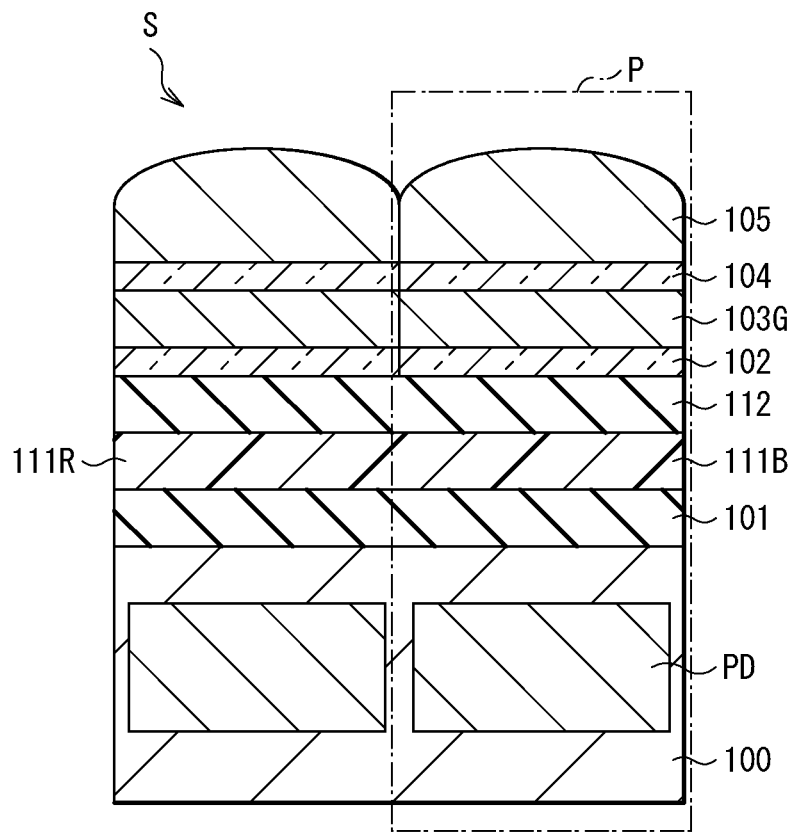
FIG. 28 is an explanatory diagram illustrating a configuration example of imaging pixels in an imaging section illustrated in FIG. 27.

FIG. 28 schematically illustrates cross-sectional configurations of the imaging pixels P in the imaging section 40. The semiconductor substrate 100 includes one photodiode PD formed in the pixel region corresponding to one imaging pixel P. This photodiode PD is configured to receive light of various wavelengths, unlike the photodiodes PDB and PDR according to the first embodiment described above. The insulating film 101 is formed on the surface, on side of the imaging surface S, of the semiconductor substrate 100, and a color filter 111 is formed on the insulating film 101. Specifically, a color filter 111B or a color filter 111R is selectively formed on the insulating film 101. The color filter 111B allows blue (B) light to pass therethrough, and blocks red (R) light and green (G) light. The color filter 111R allows red (R) light to pass therethrough, and blocks blue (B) light and green (G) light. The color filter 111B and the photodiode PD are included in a photoelectric converter that is configured to receive blue (B) light, and the color filter 111R and the photodiode PD are included in a photoelectric converter that is configured to receive red (R) light. An insulating film 112 is formed on the color filter 111. The insulating film 112 is configured using, for example, silicon dioxide ($SiO_2$). Then, a transparent electrode 102, a photoelectric conversion film 103G, a transparent electrode 104, and an on-chip lens 105 are formed in this order on the insulating film 112.

Figure 29:
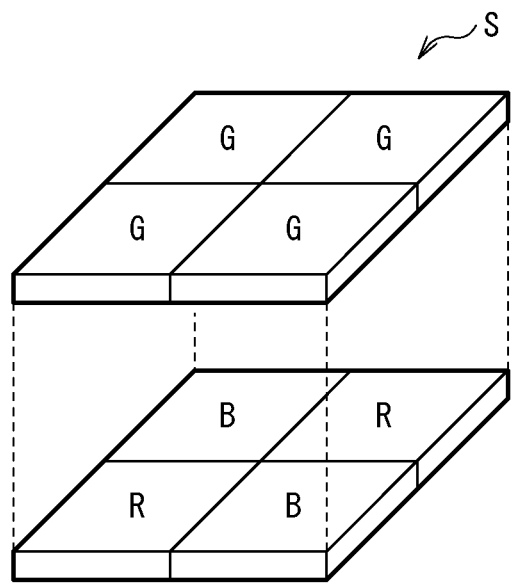
FIG. 29 is a schematic diagram illustrating a configuration example of the imaging pixels in the imaging section illustrated in FIG. 27.

FIG. 29 schematically illustrates positions of photoelectric converters in the region X in which four imaging pixels P are arranged. Thus, in the imaging section 40, a photoelectric converter related to green (G) and a photoelectric converter related to blue (B) or red (R) are respectively disposed in an upper layer and a lower layer in the pixel region corresponding to one imaging pixel P. The photoelectric converters related to blue (B) and red (R) are arranged in a checkered pattern. That is, in the imaging section 40, the color filter 111B and the color filter 111R are arranged in a checkered pattern. This makes it possible for each of the imaging pixels P to generate a pixel signal related to green and a pixel signal related to blue or red in the imaging section 40.

With such a configuration, the imaging section 40 generates an image signal DT21 and the gain signal SGAIN. The image signal DT21 includes two image map data MPG and MPBR. The image map data MPG includes pixel values for one frame image related to green (G), and the image map data MPBR includes pixel values for one frame image related to blue (B) and red (R). In the image map data MPBR, pixel values related to blue (B) and pixel values related to red (R) are arranged in a checkered pattern corresponding to arrangement of color filters 111B and 111R.

The image processing section 50 (FIG. 27) includes an image segmentation processing section 52, an interpolation controller 56, an interpolation processing section 53, a synthesis processing section 54, and a signal processing section 55.

The image segmentation processing section 52 performs the image segmentation processing A1 on the basis of the image map data MPG and MPBR included in the image signal DT21 supplied from the imaging section 40 via the switching section 21 to generate four map data MG11, MG12, MR11, and MB12.

The interpolation controller 56 performs the interpolation control processing B1 on the basis of the image map data MPG included in the image signal DT21 to determine the interpolation method in the interpolate interpolation processing A2 in the interpolation processing section 53.

The interpolation processing section 53 respectively performs the interpolation processing A2 on the four map data MG11, MG12, MR11, and MB12 supplied from the image segmentation processing section 52 with use of the interpolation method instructed from the interpolation controller 56 to generate four map data MG21, MG22, MR21, and MB22.

The synthesis processing section 54 performs the synthesis processing A3 on the basis of two map data MG21 and MG22 supplied from the interpolation processing section 53 to generate one map data MG3. Then, the synthesis processing section 54 supplies the map data MG3 generated by the synthesis processing A3 and the map data MR21 and MB22 supplied from the interpolation processing section 53 as an image signal DT22 to the signal processing section 55.

The signal processing section 55 performs the predetermined signal processing on the basis of the image signal DT22 supplied from the synthesis processing section 54 or the image signal DT21 supplied from the imaging section 40 via the switching section 21. Then, the signal processing section 55 outputs a processing result of these predetermined signal processing as an image signal DT23.

Figure 30:
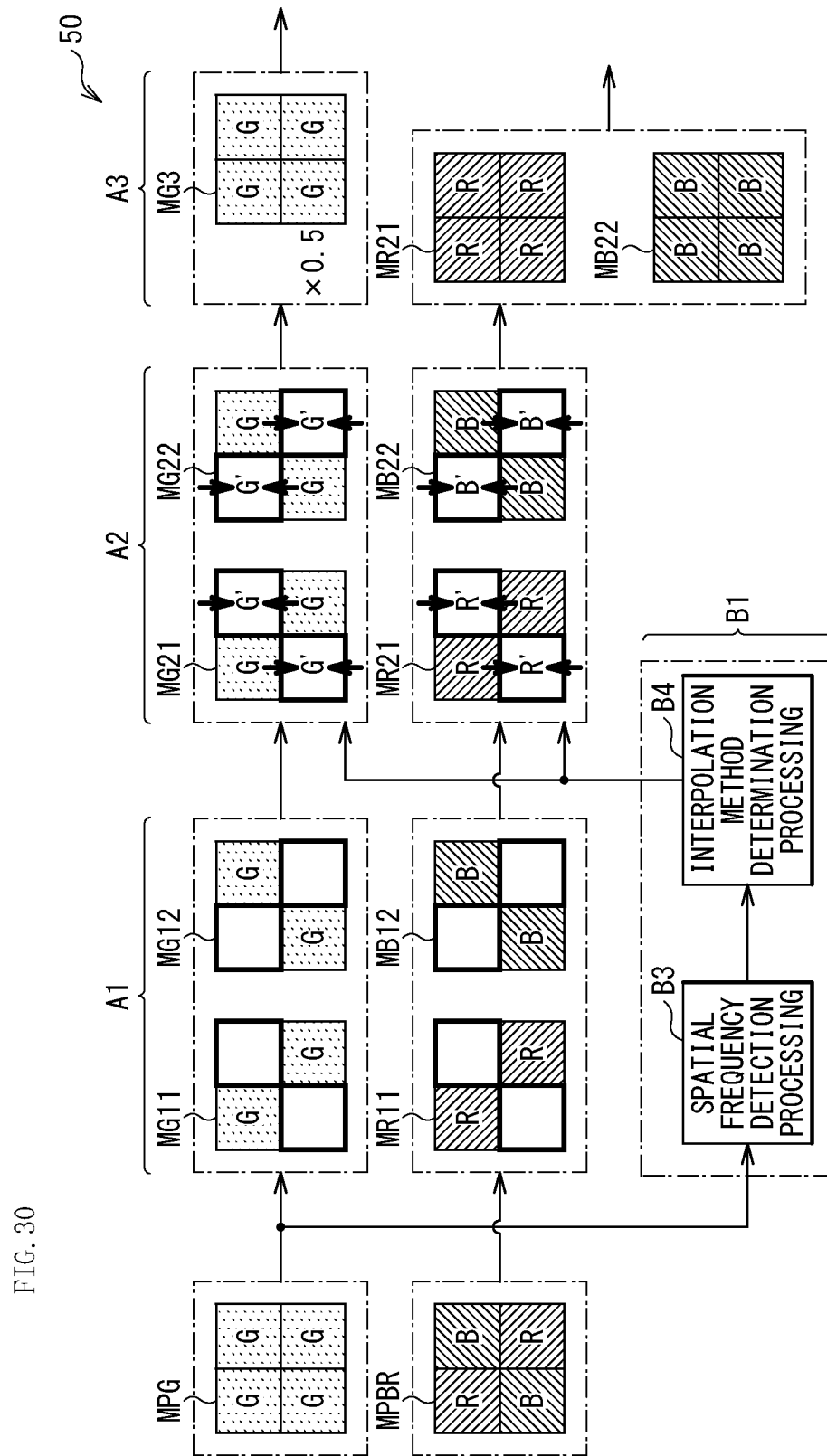
FIG. 30 is an explanatory diagram illustrating an operation example of an image processing section illustrated in FIG. 27.

FIG. 30 schematically illustrates examples of the image segmentation processing A1, the interpolation control processing B1, the interpolation processing A2, and the synthesis processing A3 in the image processing section 50.

The image segmentation processing section 52 performs the image segmentation processing A1 on the basis of the image map data MPG to generate two map data MG11 and MG12. In addition, the image segmentation processing section 52 performs the image segmentation processing A1 on the basis of the image map data MPBR to generate two map data MR11 and MB12. In the map data MR11, as illustrated in FIG. 30, pixel values related to red (R) are present on the upper left and the lower right in the region X, and no pixel value is present on the lower left and the upper right in the region X. In addition, in the map data MB12, pixel values related to blue (B) are present on the lower left and the upper right in the region X, and no pixel value is present on the upper left and lower right in the region X. That is, in this example, the arrangement patterns PAT of pixel values in the image segmentation processing A1 are checkered pattern to correspond to checkered pattern arrangement of the color filter 111B and 111R in the imaging section 40. Accordingly, pixel values related to red (R) included in the image map data MPBR are included only in the map data MR11, and pixel values related to blue (B) included in the image map data MPBR are included only in the map data MB12. As illustrated in FIG. 30, the map data MG11 and MR11 have the same arrangement pattern PAT, and the map data MG12 and MB12 have the same arrangement pattern PAT.

The interpolation controller 56 performs the spatial frequency detection processing B3 on the basis of the image map data MPG related to green (G) to detect a spatial frequency. Then, the interpolation controller 56 performs the interpolation method determination processing B4 to determine the interpolation method in the interpolation processing A2 for each of the image regions on the basis of the spatial frequency determined by the spatial frequency detection processing B3. Then, the interpolation controller 56 provides an instruction on the interpolation method for each of the image regions to the interpolation processing section 53.

The interpolation processing section 53 respectively performs the interpolation processing A2 on the four map data MG11, MG12, MR11, and MB12 supplied from the image segmentation processing section 52 with use of the interpolating method instructed for each of the image regions from the interpolation controller 56 to generate four map data MG21, MG22, MR21, and MB22. The interpolating methods for generating the four map data MG21, MG22, MR21, and MB22 are the same as each other.

The synthesis processing section 54 performs the synthesis processing A3 on the basis of two map data MG21 and MG22 to generate one map data MG3. Specifically, the synthesis processing section 54 sums pixel values at positions corresponding to each other in the two map data MG21 and G22 and halves a summation of the pixel values to generate a pixel value at a position corresponding to the positions in the map data MG3.

The image map data MPG and MPBR respectively correspond to specific examples of "first image map data" and "second image map data" in the present disclosure, The map data MR11 and MB12 correspond to a specific example of a "plurality of fourth map data" in the present disclosure. The map data MR21 and MB22 correspond to a specific example of a "plurality of fifth map data" in the present disclosure.

As described above, in the imaging device 3, for example, the image segmentation processing A1 is performed on the basis of the image map data MPG to generate the map data MG11 and MG12, the interpolation processing A2 is respectively performed on the map data MG11 and MG12 to generate the map data MG21 and MG22, and the synthesis processing A3 is performed on the basis of the map data MG21 and MG22 to generate the map data MG3. This makes it possible to increase a signal-to-noise ratio (S/N ratio) in the map data MG3 and enhance image quality of a captured image in the imaging device 3, as in the first embodiment described above.

In addition, in the imaging device 3, the arrangement patterns PAT of pixel values in the image segmentation processing A1 are checkered patterns to correspond to the checkered pattern arrangement of the color filters 111B and 111R in the imaging section 40. The arrangement patterns PAT of pixel values in the map data MG11 and MR11 are the same as each other, and the arrangement patterns PAT of pixel values in the map data MG12 and MB12 are the same as each other. This makes it possible for the image segmentation processing section 52 to perform the image segmentation processing A1 by the same method on the basis of two image map data MPG and MPBR, which makes it possible to simplify a circuit configuration of the image segmentation processing section 52. Further, as in a case of the imaging device 1, it is possible to reduce a possibility that false colors occur and enhance image quality of a captured image.

In addition, in the imaging device 3, the interpolating methods for generating the map data MG21, MG22, MR21, and MB22 in the interpolation processing A2 are the same as each other. This makes it possible for the interpolation processing section 53 to generate four map data MG21, MG22, MR21, and MB22 with use of the same interpolating method, which makes it possible to simplify a circuit configuration of the interpolation processing section 53. In addition, as in the case of the imaging device 1, it is possible to reduce a possibility that false colors occur, and enhance image quality of a captured image.

In addition, in the imaging device 3, the spatial frequency is detected on the basis of the image map data MPG all over which pixel values related to green (G) are located, and the interpolation method in the interpolation processing A2 is determined on the basis of the detected spatial frequency. This makes it possible for the imaging device 3 to detect the spatial frequency with high accuracy, which makes it possible to enhance accuracy of the interpolation processing A2. This consequently makes it possible for the imaging device 3 to achieve a higher restoring effect, which makes it possible to enhance image quality of a captured image.

In addition, in the imaging device 3, as in the imaging device 1 according to the first embodiment described above, it is possible to control whether or not to perform the image segmentation processing, the interpolation processing, and the synthesis processing. Accordingly, in the imaging device 3, for example, in a case where an image of a dark subject is captured, performing the image segmentation processing A1, the interpolation processing A2, and the synthesis processing A3 makes it possible to increase a signal-to-noise ratio (SN ratio) in the captured image. For example, in a case where an image of a bright subject is captured, the image segmentation processing A1, the interpolation processing A2, and the synthesis processing A3 are not performed, which makes it possible to increase resolution in the captured image. This consequently makes it possible for the imaging device 3 to enhance image quality of the captured image.

As described above, in the present embodiment, the image segmentation processing, the interpolation processing, and the synthesis processing are performed, which makes it possible to increase the signal-to-noise ratio in the captured image. This makes it possible to enhance image quality of the captured image.

In the present embodiment, the arrangement patterns of pixel values in the image segmentation processing are checkered patterns to correspond to checkered pattern arrangement of the color filters in the imaging section, which makes it possible to simplify a circuit configuration of the image segmentation processing section, and to reduce a possibility that false colors occurs and enhance image quality of the captured image.

In the present embodiment, in the interpolation processing, the interpolation methods for generating four map data are the same as each other, which makes it possible to simplify a circuit configuration of the interpolation processing section, and to reduce a possibility that false colors occur and enhance image quality of the captured image.

In the present embodiment, the spatial frequency is detected on the basis of the mage map data MPG over which the pixel values related to green (G) are located to determine the interpolation method in the interpolation processing, which makes it possible to detect the spatial frequency with high accuracy and enhance image quality of the captured image.

In the present embodiment, it is possible to control whether or not to perform the image segmentation processing, the interpolation processing, and the synthesis processing, which makes it possible to enhance image quality of the captured image.

3. Third Embodiment

Next, description is given of an imaging device 4 according to a third embodiment. The present embodiment differs from the first embodiment described above in an arrangement density of photoelectric converters that are configured to receive blue (B) light and red (R) light in an imaging section. It is to be noted that components substantially the same as those of the imaging device 1 according to the first embodiment described above are denoted by the same reference numerals, and description thereof is omitted as appropriate.

Figure 31:
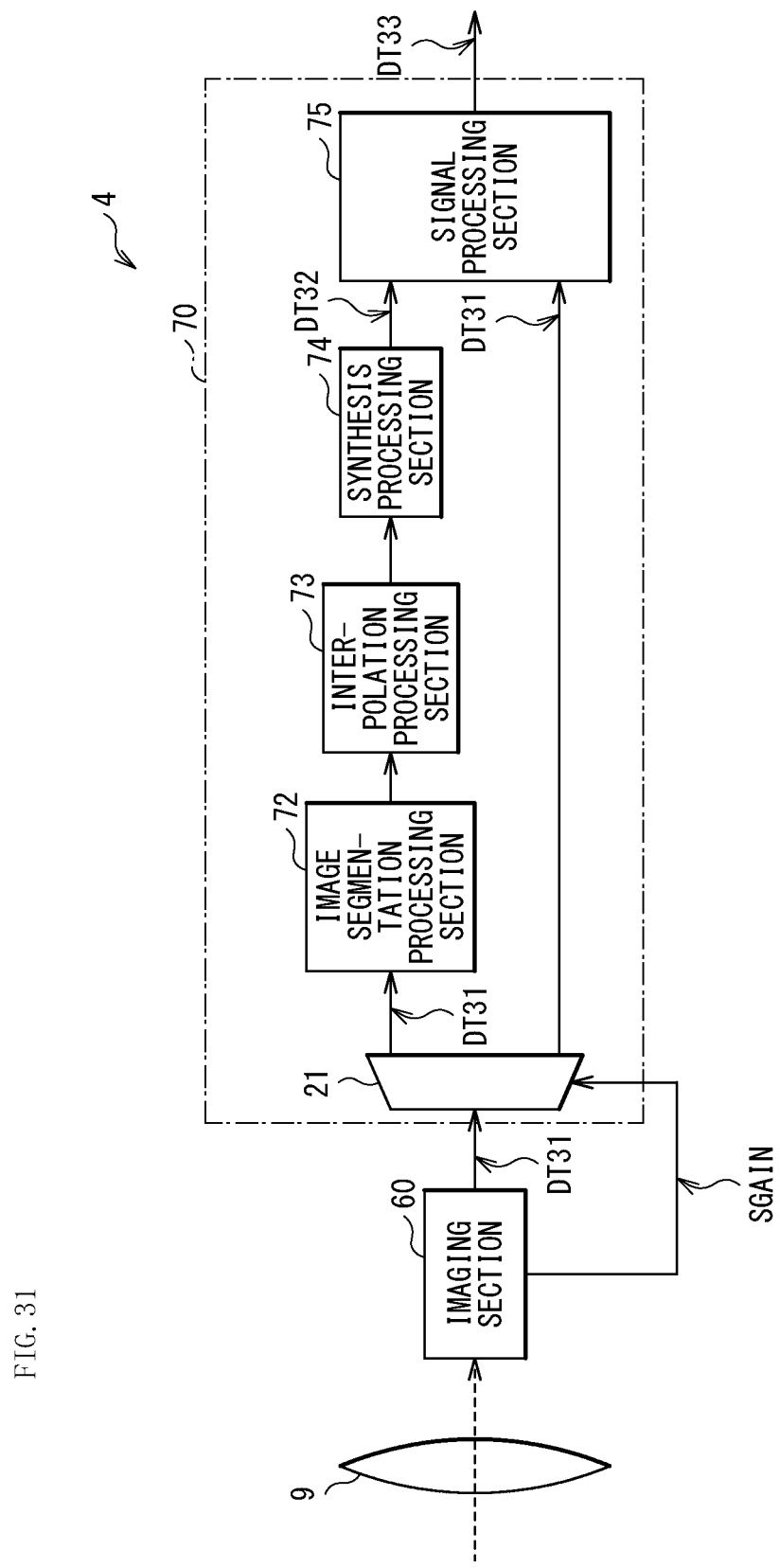
FIG. 31 is a block diagram illustrating a configuration example of an imaging device according to a third embodiment.

FIG. 31 illustrates a configuration example of the imaging device 4 according to the present embodiment. The imaging device 4 includes an imaging section 60 and an image processing section 70.

Figure 32:
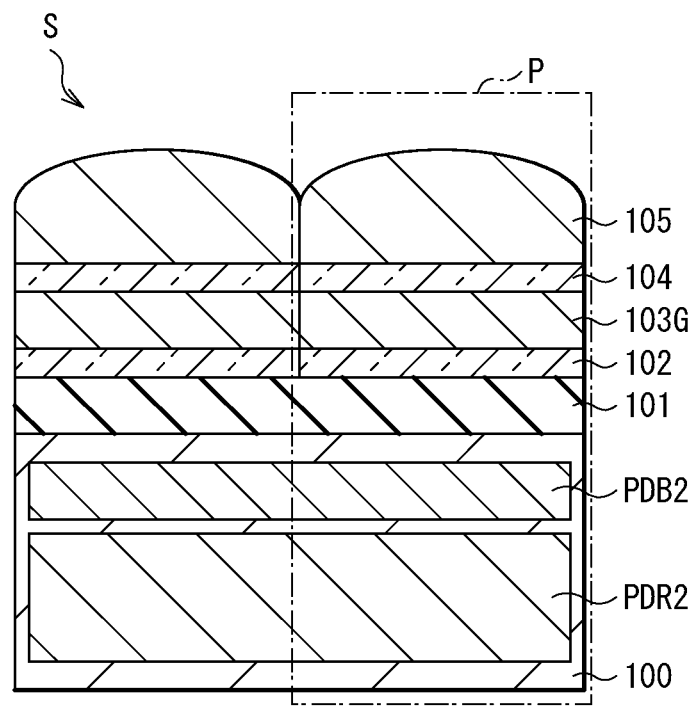
FIG. 32 is an explanatory diagram illustrating a configuration example of imaging pixels in an imaging section illustrated in FIG. 31.
Figure 33:
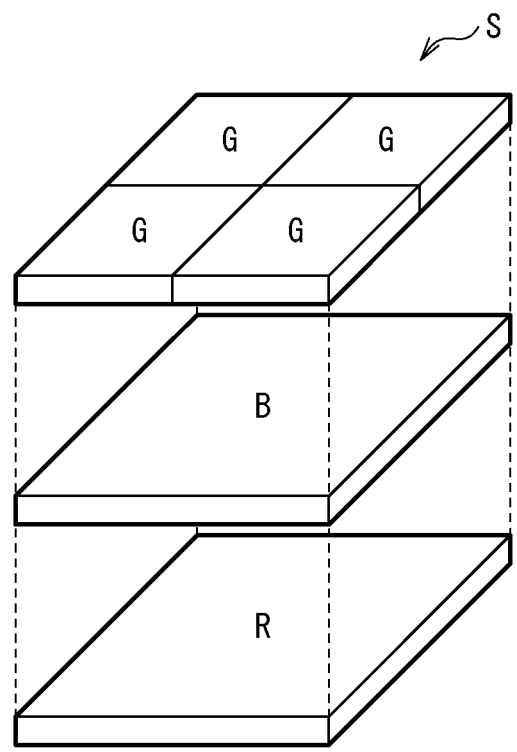
FIG. 33 is a schematic diagram illustrating a configuration example of the imaging pixels in the imaging section illustrated in FIG. 31.

FIG. 32 schematically illustrates cross-sectional configurations of the imaging pixels P in the imaging section 60. FIG. 33 schematically illustrates positions of photoelectric converters in the region X in which four imaging pixels P are arranged. The semiconductor substrate 100 includes photodiodes PDR2 and PDB2 formed in the region X corresponding to the four imaging pixels P. The photodiode PDR2 is a photoelectric converter that is configured to receive red (R) light as in the photodiode PDR, and the photodiode PDB2 is a photoelectric converter that is configured to receive blue (B) light as in the photodiode PDB. The photodiode PDR2 and the photodiode PDB2 are formed and stacked in the semiconductor substrate 100 in the region X corresponding to the four imaging pixels P in such a manner that the photodiode PDB2 is located on side of the imaging surface S. That is, in the imaging section 10 according to the first embodiment, the photodiodes PDB and PDR are formed and stacked in the pixel region corresponding to one imaging pixel P, whereas in the imaging section 60 according to the present embodiment, the photodiodes PDB2 and PDR2 are formed and stacked in the region X corresponding to the four imaging pixels P. Accordingly, in the imaging section 60, four photoelectric converters related to green (G), one photoelectric converter related to blue (B), one photoelectric converter related to red (R) is formed and stacked in the region X corresponding to the four imaging pixels P. In other words, in the imaging section 60, an arrangement density of the photoelectric converters related to blue (B) is ¼ of an arrangement density of the photoelectric converters related to green (G), and an arrangement density of the photoelectric converters related to red (R) is ¼ of the arrangement density of the photoelectric converters related to green (G). The insulating film 112 is formed on the color filter 111. The insulating film 112 is configured using, for example, silicon dioxide ($SiO_2$). The insulating film 101 is formed on the semiconductor substrate 100, and the transparent electrode 102, the photoelectric conversion film 103G, the transparent electrode 104, and the on-chip lens 105 are formed in this order on the insulating film 101.

With such a configuration, the imaging section 60 generates an image signal DT31 and the gain signal SGAIN. The image signal DT31 includes three image map data MPG, MPB, and MPR. The image map data MPG includes pixel values for one frame image related to green (G). The image map data MPB includes pixel values for one frame image related to blue (B). The image map data MPR includes pixel values for one frame image related to red (R). The number of pixel values in the image map data MPB is ¼ of the number of pixel values in the image map data MPG, and the number of pixel values in the image map data MPR is ¼ of the number of pixel values in the image map data MPG. Four pixel values in the image map data MPG are associated with one pixel value in the image map data MPB, and are also associated with one pixel value in image map data MPR.

The image processing section 70 (FIG. 31) includes an image segmentation processing section 72, an interpolation processing section 73, a synthesis processing section 74, and a signal processing section 75.

The image segmentation processing section 72 performs the image segmentation processing A1 on the basis of the image map data MPG, MPB, and MPR included in the image signal DT31 supplied from the imaging section 60 via the switching section 21 to generate six map data MG11, MG12, MB11, MB12, MR11, and MB12.

The interpolation processing section 73 respectively performs the interpolation processing A2 on the six map data MG11, MG12, MB11, MB12, MR11, and MR12 supplied from the image segmentation processing section 72 to generate six map data MG21, MG22, MB21, MB22, MR21, and MB22.

The synthesis processing section 74 performs the synthesis processing A3 on the basis of the six map data MG21, MG22, MB21, MB22, MR21, and MR22 supplied from the interpolation processing section 73 to generates three map data MG3, MB3, and MR3. Then, the synthesis processing section 74 supplies the map data MG3, MB3, and MR3 generated by the synthesis processing A3 as an image signal DT32 to the signal processing section 75.

The signal processing section 75 performs the predetermined signal processing on the basis of the image signal DT32 supplied from the synthesis processing section 74 or the image signal DT31 supplied from the imaging section 60 via the switching section 21. Then, the signal processing section 75 outputs a processing result of these predetermined signal processing as an image signal DT33.

Figure 34:
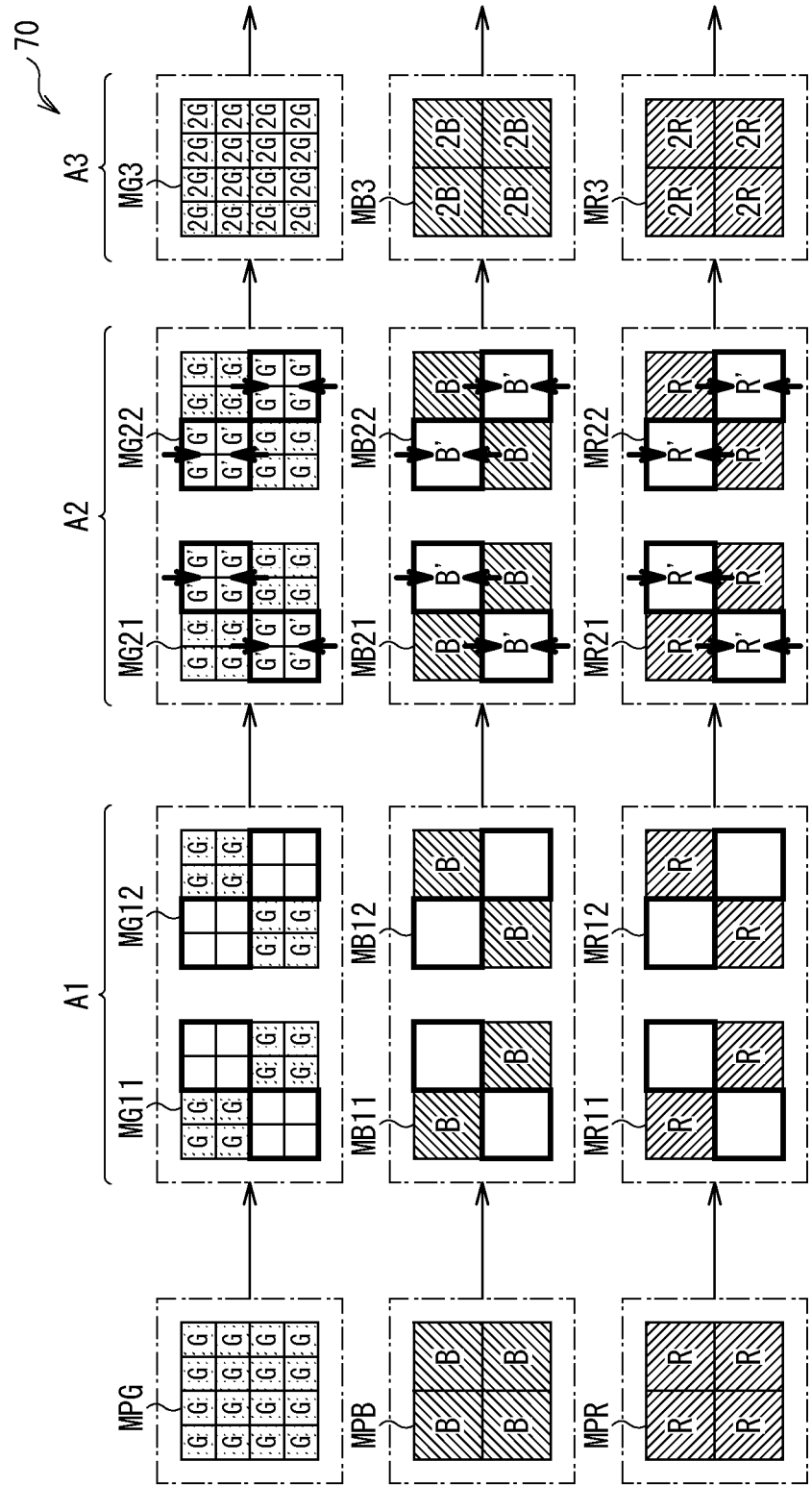
FIG. 34 is an explanatory diagram illustrating an operation example of an image processing section illustrated in FIG. 31.

FIG. 34 schematically illustrates examples of the image segmentation processing A1, the interpolation processing A2, and the synthesis processing A3 in the image processing section 70.

The image segmentation processing section 72 performs the image segmentation processing A1 on the basis of the image map data MPG, MPB, and MPR to generate six map data MG11, MG12, MB11, MB12, MR11, and MR12. As illustrated in FIG. 34, the arrangement patterns PAT of pixel values in the map data MG11 and MG12 are checkered patterns in units of four pixel values (FIGS. 12A and 12B). In contrast, the arrangement patterns PAT of pixel values in the map data MB11, MB12, MR11, and MR12 are checkered patterns (FIGS. 8A and 8B) in units of one pixel value. That is, the unit in the checkered pattern in each of the map data MG11 and MG12 is four times the unit in the checkered pattern in each of map data MB11, MB12, MR11, and MR12 correspondingly to the arrangement densities of photoelectric converters related to green (G), blue (B), and red (R) in the imaging section 60.

The interpolation processing section 73 respectively performs the interpolation processing A2 on the six map data MG11, MG12, MB11, MB12, MR11, and MR12 supplied from the image segmentation processing section 22 to generate six map data MG21, MG22, MB21, MB22, MR21, and MR22. In a case where the interpolation processing A2 is performed on the map data MG11 and MG12, it is possible for the interpolation processing section 73 to use the interpolating methods illustrated in FIGS. 13A and 13B. The interpolating methods for generating the map data MB21, MB22, MR21, and MR22 are the same as each other. In addition, it is possible to cause the interpolation method for generating each of the map data MG21 and MG22 to be the same as the interpolation method for generating each of the map data MB21, MB22, MR21, and MR22. Specifically, for example, it is possible to cause interpolation directions in these two interpolation methods to be the same as each other.

The synthesis processing section 74 performs the synthesis processing A3 on the basis of the six map data MG21, MG22, MB21, MB22, MR21, and MR22 to generate three map data MG3, MB3, and MR3.

As described above, in the imaging device 4, for example, the image segmentation processing A1 is performed on the basis of the image map data MPG to generate the map data MG11 and MG12, the interpolation processing A2 is respectively performed on the map data MG11 and MG12 to generate the map data MG21 and MG22, and the synthesis processing A3 is performed on the basis of the map data MG21 and MG22 to generate the map data MG3. The same applies to the image map data MPB and MPR. This makes it possible to increase a signal-to-noise ratio (S/N ratio) in the map data MG3, MB3, and MR3 and enhance image quality of a captured image in the imaging device 4, as in the first embodiment described above.

In addition, in the imaging device 4, the unit in the checkered pattern in each of the map data MG11 and MG12 is four times the unit in the checkered pattern in each of the map data MB11, MB12, MR11, and MR12 correspondingly to the arrangement densities of the photoelectric converters related to green (G), blue (B), and red (R) in the imaging section 60. This makes it possible for the image segmentation processing section 72 to perform the image segmentation processing A1 by a similar method on the basis of the three image map data MPG, MPB, and MPR, which makes it possible to simplify a circuit configuration of the image segmentation processing section 72. Further, as in the case of the imaging device 1, it is possible to reduce a possibility that false colors occur, and enhance image quality of a captured image.

In addition, in the imaging device 4, the interpolating methods for generating the map data MB21, MB22, MR21, and MR22 in the interpolation processing A2 are the same as each other. This makes it possible for the interpolation processing section 73 to generate four map data MB21, MB22, MR21, and MR22 with use of the same interpolating method, which makes it possible to simplify a circuit configuration of the interpolation processing section 73. In addition, in the interpolation processing A2, the interpolation method for generating each of the map data MG21 and MG22 is similar to the interpolation method for generating each of the map data MB21, MB22, MR21, and MR22, which makes it possible to reduce a possibility that false colors occur, and enhance image quality of a captured image as in the case of the imaging device 1.

In addition, in the imaging device 4, as in the imaging device 1 according to the first embodiment described above, it is possible to control whether or not to perform the image segmentation processing, the interpolation processing, and the synthesis processing. Accordingly, in the imaging device 4, for example, in a case where an image of a dark subject is captured, performing the image segmentation processing A1, the interpolation processing A2, and the synthesis processing A3 makes it possible to increase a signal-to-noise ratio (SN ratio) in the captured image. For example, in a case where an image of a bright subject is captured, the image segmentation processing A1, the interpolation processing A2, and the synthesis processing A3 are not performed, which makes it possible to increase resolution in the captured image. This consequently makes it possible for the imaging device 4 to enhance image quality of the captured image.

As described above, in the present embodiment, the image segmentation processing, the interpolation processing, and the synthesis processing are performed, which makes it possible to increase the signal-to-noise ratio in the captured image. This makes it possible to enhance image quality of the captured image.

In the present embodiment, the unit in the checkered pattern in each of the map data MG11 and MG12 is four times the unit in the checkered pattern in each of the map data MB11, MB12, MR11, and MR12 correspondingly the arrangement densities of the photoelectric converters related to green, blue, and red in the imaging section, which makes it possible to simplify a circuit configuration of the image segmentation processing section and to reduce a possibility that false colors occurs and enhance image quality of the captured image.

In the present embodiment, in the interpolation processing, the interpolation methods for generating the map data MB21, MB22, MR21, and MR22 are the same as each other, which makes it possible to simplify a circuit configuration of the interpolation processing section, and to reduce a possibility that false colors occur.

In the present embodiment, in the interpolation processing, the interpolation method for generating each of the map data MG21 and MG22 is similar to the interpolation method for generating each of the map data MB21, MB22, MR21, and MR22, which makes it possible to reduce a possibility that false colors occur and enhance image quality of the captured image.

In the present embodiment, it is possible to control whether or not to perform the image segmentation processing, the interpolation processing, and the synthesis processing, which makes it possible to enhance image quality of the captured image.

Modification Example 3-1

In the embodiment described above, the image processing section 70 performs the image segmentation processing A1, the interpolation processing A2, and the synthesis processing A3 on the basis of the image map data MPR related to red (R), the image map data MPG related to green (G), and the image map data MPB related to blue (B), but this is not limitative. Alternatively, the image segmentation processing A1, the interpolation processing A2, and the synthesis processing A3 may be performed on the basis of a luminance signal as in a case of the imaging device 1D according to the modification example of the first embodiment (FIG. 25). The present modification example is described in detail below.

Figure 35:
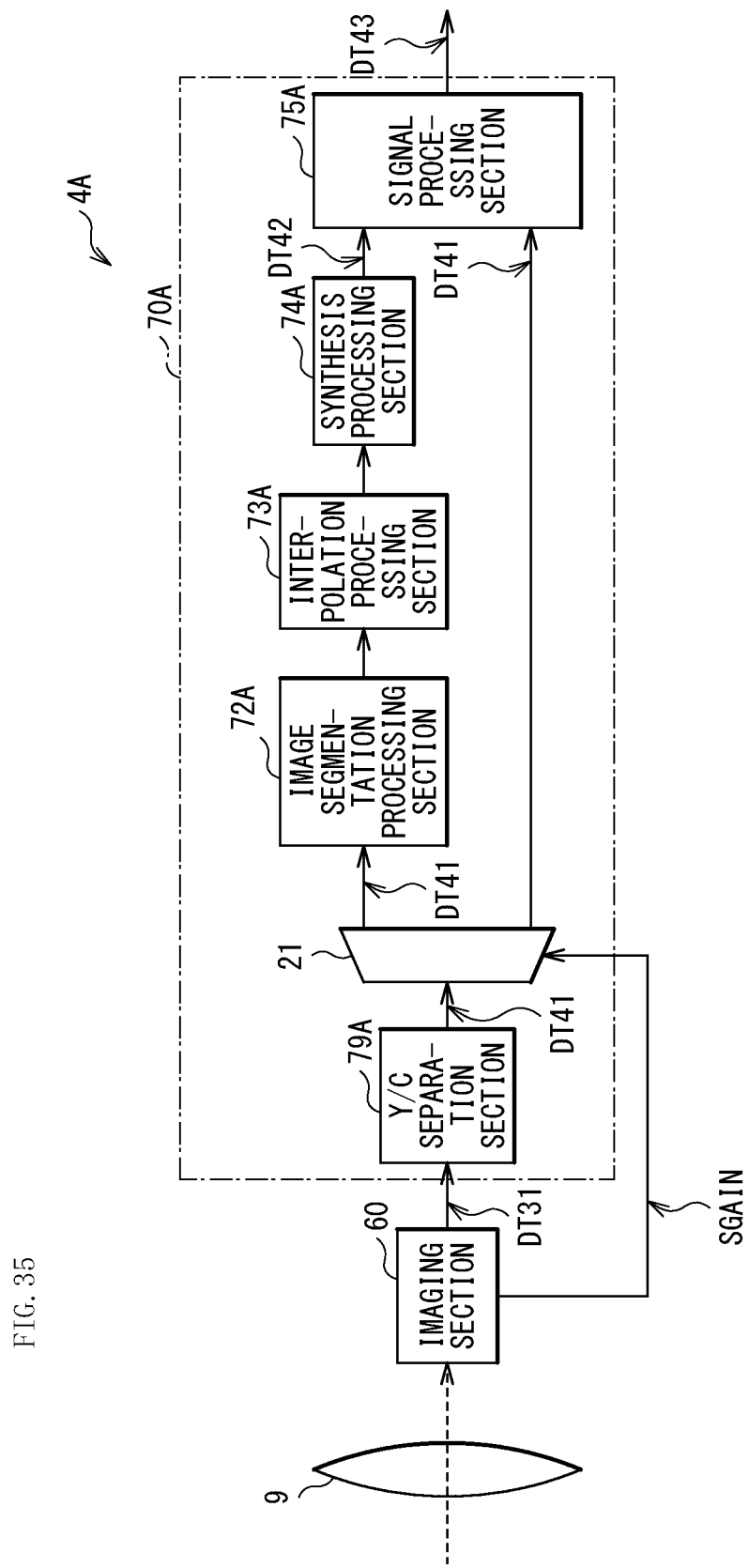
FIG. 35 is a block diagram illustrating a configuration example of an imaging device according to a modification example.

FIG. 35 illustrates a configuration example of an imaging device 4A according to the present modification example. The imaging device 4A includes an image processing section 70A. The image processing section 70A includes a Y/C separation section 79A, an image segmentation processing section 72A, an interpolation processing section 73A, a synthesis processing section 74A, and a signal processing section 75A.

The Y/C separation section 79A separates an RGB signal included in the image signal DT31 into a luminance (Y) signal and a color (C) signal by performing the Y/C separation processing C1, and outputs the luminance signal and the color signal as an image signal DT41. The image signal DT41 includes map data MY, MCr, and MCb. The map data MY includes pixel values for one frame image related to luminance (Y), the map data MCr includes pixel values for one frame image related to an R-Y color difference (Cr), and the map data MCb includes pixel values for one frame image related to a B-Y color difference (Cb). The number of pixel values in the map data MCr is ¼ of the number of pixel values in the map data MY. Similarly, the number of pixel values in the map data MCb is ¼ of the number of pixel values in the map data MY.

The image segmentation processing section 72A performs the image segmentation processing A1 on the basis of the map data MY included in the image signal DT41 supplied from the Y/C separation section 79A via the switching section 21 to generate two map data MY11 and MY12. In addition, the image segmentation processing section 72A outputs the map data MCr and MCb included in the image signal DT41 as they are.

The interpolation processing section 73A respectively performs the interpolation processing A2 on the two map data MY11 and MY12 supplied from the image segmentation processing section 72A to generate two map data MY21 and MY22. In addition, the interpolation processing section 73A outputs the map data MCr and MCb supplied from the image segmentation processing section 72A as they are.

The synthesis processing section 74A performs the synthesis processing A3 on the basis of the two map data MY21 and MY22 supplied from the interpolation processing section 73A to generate one map data MY3. Then, the synthesis processing section 74A supplies the map data MY3 generated by the synthesis processing A3 and the map data MCr and MCb supplied from the interpolation processing section 73A as an image signal DT42 to the signal processing section 75A.

The signal processing section 75A performs the predetermined signal processing on the basis of the image signal DT42 supplied from the synthesis processing section 74A or the image signal DT41 supplied from the Y/C separation section 79A via the switching section 21. Then, the signal processing section 75A outputs a processing result of these predetermined signal processing as an image signal DT43.

Figure 36:
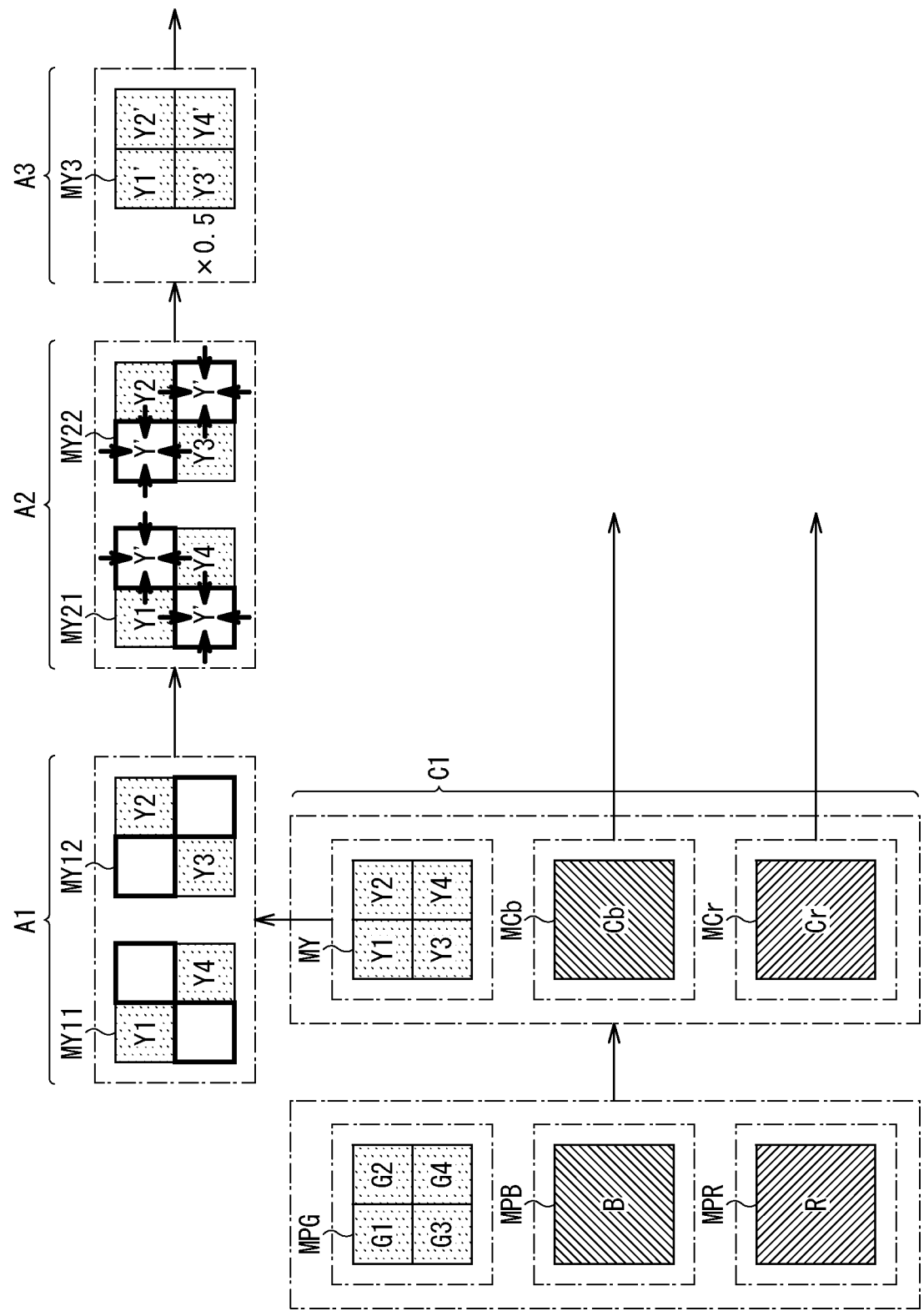
FIG. 36 is an explanatory diagram illustrating an operation example of an image processing section illustrated in FIG. 35.

FIG. 36 schematically illustrates examples of the image segmentation processing A1, the interpolation processing A2, and the synthesis processing A3 in the image processing section 70A.

The Y/C separation section 79A performs the Y/C separation processing C1 to separate the RGB signal included in the image signal DT31 into the luminance (Y) signal and the color (C) signal. Specifically, the Y/C separation section 79A generates the map data MY, MCb, and MCr on the basis of the image map data MPG, MPB, and MPR. The Y/C separation section 79A generates a pixel value related to luminance (Y) with use of, for example, the following expression, on the basis of pixel values at positions corresponding to each other in the three image map data MPG, MPB, and MPR.

$VY1 = VG1 \times 0.59 + VB/4 \times 0.11 + VR/4 \times 0.3$ $VY2 = VG2 \times 0.59 + VB/4 \times 0.11 + VR/4 \times 0.3$ $VY3 = VG3 \times 0.59 + VB/4 \times 0.11 + VR/4 \times 0.3$ $VY4 = VG4 \times 0.59 + VB/4 \times 0.11 + VR/4 \times 0.3$ In this expression, each of "VY1" to "VY4" is a pixel value related to luminance (Y), each of "VG1" to "VG4" is a pixel value related to green (G), "VB" is a pixel value related to blue (B), and "VR" is a pixel value related to red (R). Each of "VY1" and "VG1" indicates a pixel value on the upper left in the region X, each of "VY2" and "VG2" indicates a pixel value on the upper right in the region X, each of "VY3" and "VG3" indicate a pixel value on the lower left in the region X, and each of "VY4" and "VG4" indicate a pixel value on the lower right in the region X.

The image segmentation processing section 72A performs the image segmentation processing A1 on the basis of the thus-generated map data MY to generate two map data MY11 and MY12. The interpolation processing section 73A respectively performs the interpolation processing A2 on the two map data MY11 and MY12 to generate two map data MY21 and MY22. The synthesis processing section 74A performs the synthesis processing A3 on the basis of the two map data MY21 and MY22 to generate one map data MY3.

As described above, in the imaging device 4A, it is possible to increase a signal-to-noise ratio (SN ratio) for the luminance signal, which makes it possible to enhance image quality of a captured image. In addition, in this example, the image segmentation processing A1, the interpolation processing A2, and the synthesis processing A3 are performed only on the map data MY related to luminance (Y), which makes it possible to reduce a processing amount. This consequently makes it possible to reduce power consumption in the imaging device 4A, for example.

Modification Example 3-2

Each of the modification examples of the first embodiment may be applied to the imaging device 4 according to the embodiment described above. Specifically, for example, as in the imaging device 2 (FIG. 21) according to the modification example of the first embodiment described above, the interpolation method in the interpolation processing A2 in the interpolation processing section 73 may be controlled by performing the interpolation control processing B1 on the basis of the image map data MPG, MPB, and MPR included in the image signal DT31.

4. Fourth Embodiment

Next, description is given of an imaging device 5 according to a fourth embodiment. In the present embodiment, an imaging section includes a photoelectric converter that is configured to receive infrared (IR) light in addition to photoelectric converters that are configured to receive green (G) light, blue (B) light, and red (R) light. It is to be noted that components substantially the same as those of the imaging device 1 according to the first embodiment described above are denoted by the same reference numerals, and description thereof is omitted as appropriate.

Figure 37:
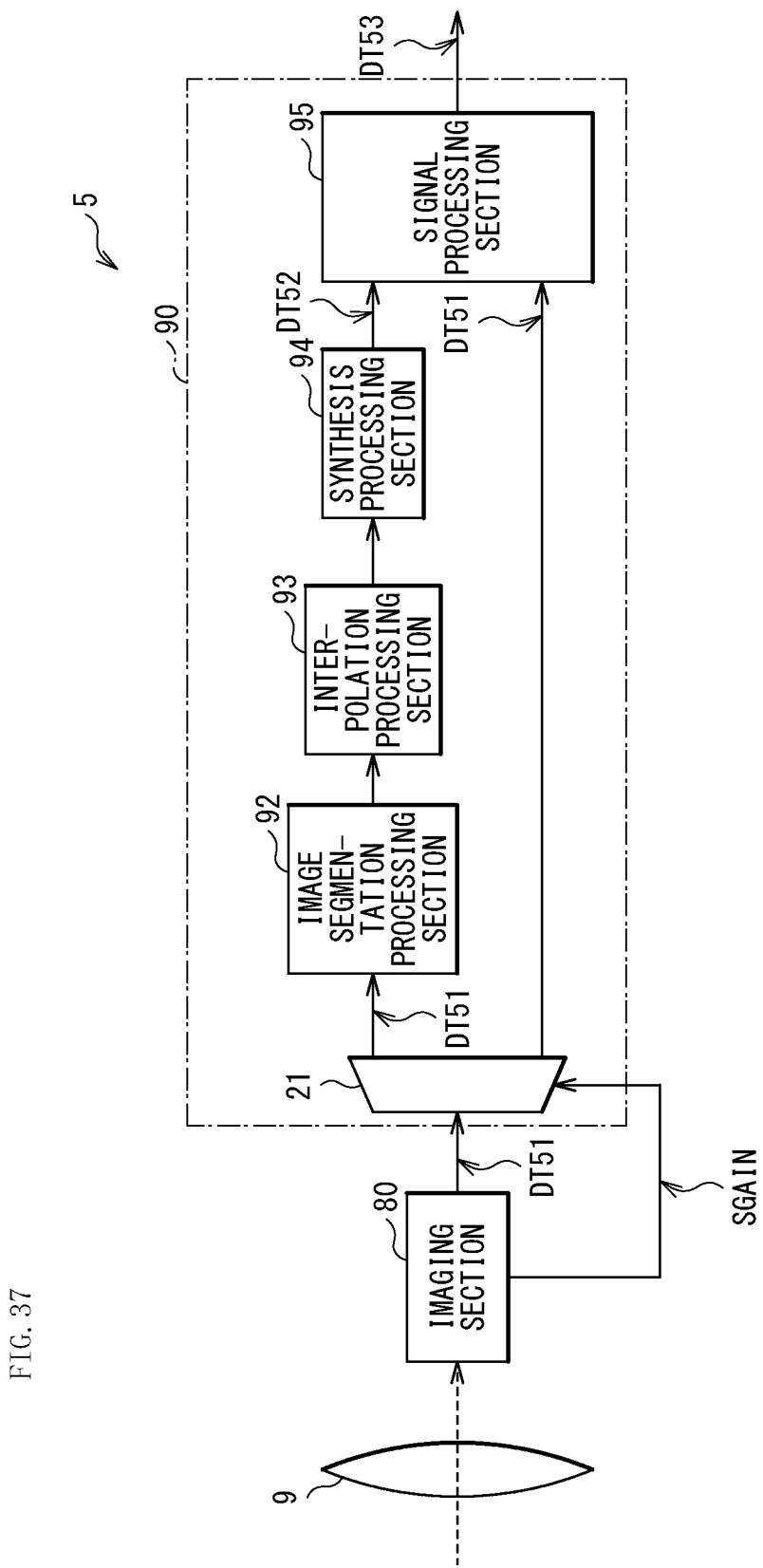
FIG. 37 is a block diagram illustrating a configuration example of an imaging device according to a fourth embodiment.

FIG. 37 illustrates a configuration example of the imaging device 5 according to the present embodiment. The imaging device 5 includes an imaging section 80 and an image processing section 90.

Figure 38:
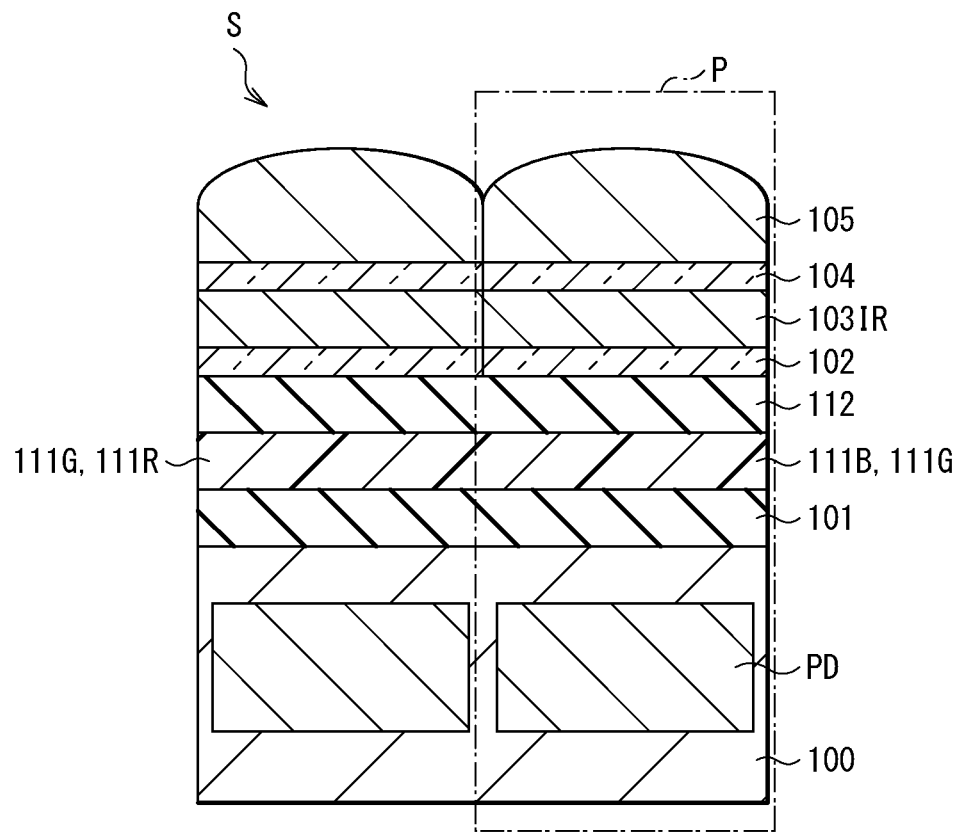
FIG. 38 is an explanatory diagram illustrating a configuration example of imaging pixels in an imaging section illustrated in FIG. 37.
Figure 39:
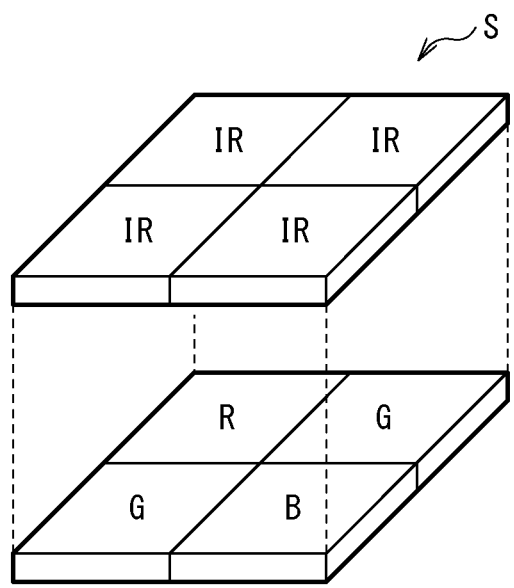
FIG. 39 is a schematic diagram illustrating a configuration example of the imaging pixels in the imaging section illustrated in FIG. 37.

FIG. 38 schematically illustrates cross-sectional configurations of the imaging pixels P in the imaging section 80. FIG. 39 schematically illustrates positions of photoelectric converters in the region X in which four imaging pixels P are arranged. The semiconductor substrate 100 includes the photodiode PD formed in the pixel region corresponding to one imaging pixel P. This photodiode PD is configured to receive light of various wavelengths corresponding to visible light. The insulating film 101 is formed on the surface, on side of the imaging surface S, of the semiconductor substrate 100, and the color filter 111 is formed on the insulating film 101. Specifically, in this example, the color filter 111R of red (R), color filters 111G of green (G), and the color filter 111B of blue (B) are respectively formed on the upper left, the lower left and the upper right, and the lower right in the region X corresponding to four imaging pixels P on the insulating film 101. The color filter 111R allows red (R) light to pass therethrough, and blocks blue (B) light and green (G) light. The color filter 111G allows green (G) light to pass therethrough, and blocks red (R) light and blue (B) light. The color filter 111B allows blue (B) light to pass therethrough, and blocks red (R) light and green (G) light. The color filter 111R and the photodiode PD are included in a photoelectric converter that is configured to receive red (R) light. The color filter 111G and the photodiode PD are included in a photoelectric converter that is configured to receive green (G) light. The color filter 111B and the photodiode PD are included in a photoelectric converter that is configured to receive blue (B) light. The color filters 111R, 111G, and 111B are arranged in a so-called Bayer array.

The insulating film 112 is formed on the color filter 111. Then, the transparent electrode 102, a photoelectric conversion film 1031B, and the transparent electrode 104 are formed in this order on the insulating film 112. The transparent electrodes 102 and 104 are electrodes that allow red light, green light, blue light, and infrared light to pass therethrough. The photoelectric conversion film 1031R is a photoelectric conversion film that is configured to receive green (G) light, and allows red light, green light, and blue light to pass therethrough. The photoelectric conversion film 1031R and the transparent electrodes 102 and 104 are included in a photoelectric converter that is configured to receive infrared (IR) light. The on-chip lens 105 is formed on the transparent electrode 104.

As described above, in the imaging section 80, the photoelectric converter related to infrared (IR) and the photoelectric converter related to red (R), green (G), or blue (B) are respectively disposed in an upper layer and a lower layer in the pixel region corresponding to one imaging pixel P, as illustrated in FIG. 39. The photoelectric converters related to red (R), green (G), and blue (B) are arranged in a Bayer array. This makes it possible for each of the imaging pixels P in the imaging section 80 to generate a pixel signal related to infrared and a pixel signal related to red, green, or blue.

With such a configuration, the imaging section 80 generates an image signal DT51 and the gain signal SGAIN. The image signal DT51 includes two image map data MPIR and MPRGB. The image map data MPIR includes pixel values for one frame image related to infrared (IR), and the image map data MPRGB includes pixel values for one frame image related to red (R), green (G), and blue (B).

The image processing section 90 (FIG. 37) includes an image segmentation processing section 92, an interpolation processing section 93, a synthesis processing section 94, and a signal processing section 95.

The image segmentation processing section 92 performs the image segmentation processing A1 on the basis of the image map data MPIR included in the image signal DT51 supplied from the imaging section 80 via the switching section 21 to generate three map data MIR12, MIR11, and MIR13, and performs the image segmentation processing A1 on the basis of the image map data MPRGB included in the image signal DT51 to generate three map data MG12, MR11, and MB13.

The interpolation processing section 93 respectively performs the interpolation processing A2 on the six map data MIR12, MIR11, MIR13, MG12, MR11, and MB13 supplied from the image segmentation processing section 92 to generate six map data MIR22, MIR21, MIR23, MG22, MR21, and MB23.

The synthesis processing section 94 performs the synthesis processing A3 on the basis of three map data MIR22, MIR21, and MIR23 supplied from the interpolation processing section 93 to generate map data MIR3. Then, the synthesis processing section 94 supplies the map data MIR3 generated by the synthesis processing A3 and the map data MG22, MR21, and MB23 supplied from the interpolation processing section 93 as an image signal DT52 to the signal processing section 95.

The signal processing section 95 performs the predetermined signal processing on the basis of the image signal DT52 supplied from the synthesis processing section 94 or the image signal DT51 supplied from the imaging section 60 via the switching section 21. Then, the signal processing section 95 outputs a processing result of these predetermined signal processing as an image signal DT53.

Figure 40:
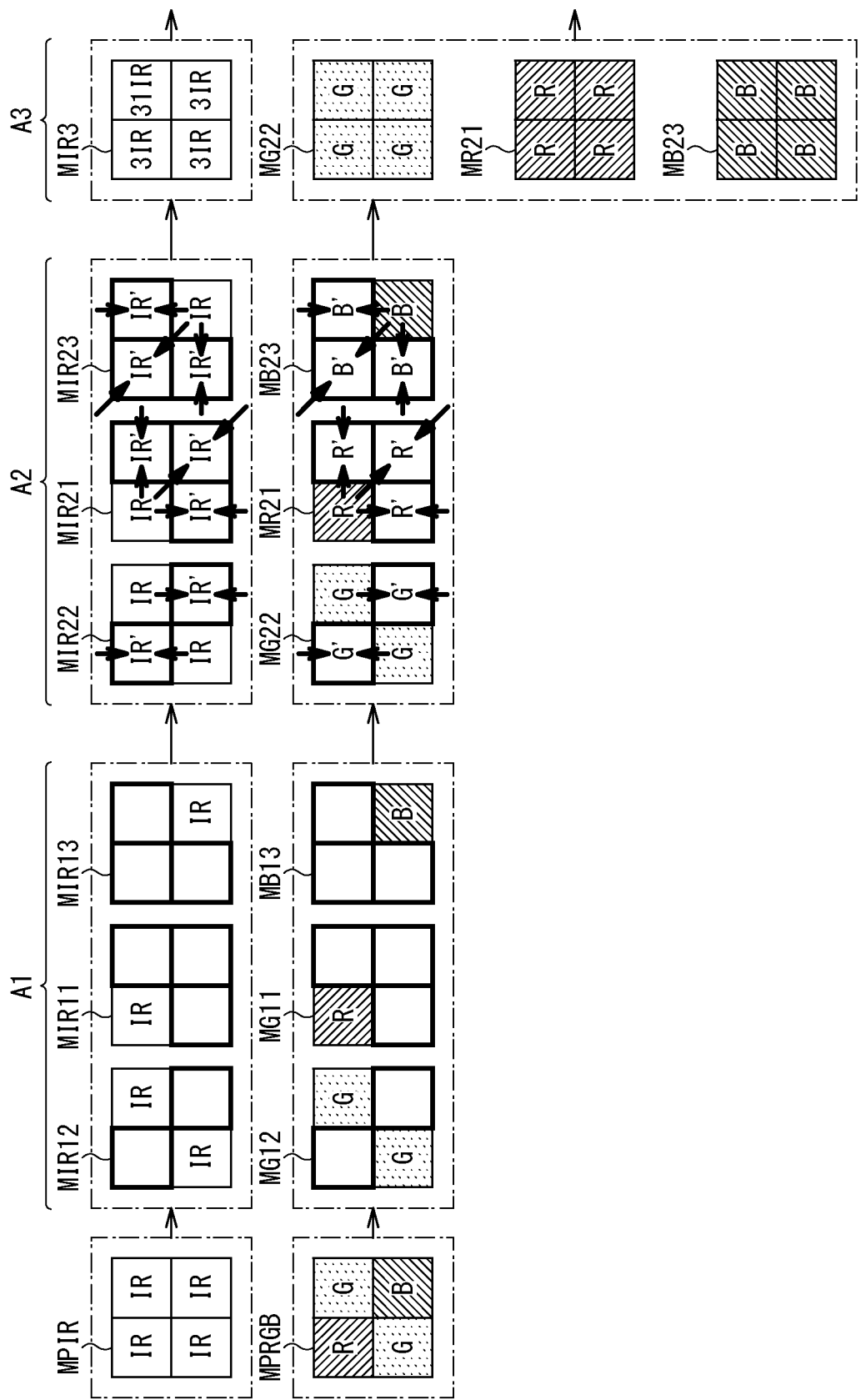
FIG. 40 is an explanatory diagram illustrating an operation example of an image processing section illustrated in FIG. 37.

FIG. 40 schematically illustrates examples of the image segmentation processing A1, the interpolation processing A2, and the synthesis processing A3 in the image processing section 90.

The image segmentation processing section 92 performs the image segmentation processing A1 on the basis of the image map data MPIR to generate three map data MIR12, MIR11, and MIR13, and performs the image segmentation processing A1 on the basis of the image map data MPRGB to generate three map data MG12, MR11, and MB13. As illustrated in FIG. 40, arrangement patterns PAT of pixel values in the map data MIR12, MIR11, and MIR13 are patterns (FIGS. 18A to 18C) corresponding to the Bayer array. The same applies to arrangement patterns PAT of pixel values in the map data MG12, MR11, and MB13. That is, in this example, the arrangement patterns PAT of pixel values in the image segmentation processing A1 are patterns corresponding to the Bayer array indicating arrangement of the color filters 111R, 111G, and 111B in the imaging section 80. Accordingly, pixel value for the red (R) included in the image map data MPRGB are included only in the map data MR11, pixel values for green (G) included in the image map data MPRGB are included only in the map data MG12, and pixel values for blue (B) included in the image map data MPRGB are included only in the map data MB13. As illustrated in FIG. 40, the map data MIR12 and MG12 have the same arrangement pattern PAT, the map data MIR11 and MR11 have the same arrangement pattern PAT, and the map data MIR13 and MB13 have the same arrangement pattern PAT.

The interpolation processing section 93 respectively performs the interpolation processing A2 on the six map data MIR12, MIR11, MIR13, MG12, MR11, and MB13 supplied from the image segmentation processing section 92 to generate six map data MIR22, MIR21, MIR23, MG22, MR21, and MB23. In a case where the interpolation processing A2 is performed on the map data MIR12, MIR11, and MIR13, it is possible for the interpolation processing section 93 to use the interpolation methods illustrated in FIGS. 19A to 19C, for example. The same applies to the interpolation processing A2 on the map data MG12, MR11, and MB13. The interpolation methods for generating the respective map data MIR22 and MG22 are the same as each other. The interpolation methods for generating the respective map data MIR21 and MR21 are the same as each other. The interpolation methods for generating the respective map data MIR23 and MB23 are the same as each other.

The synthesis processing section 94 performs the synthesis processing A3 on the basis of three map data MIR22, MIR21, and MIR23 to generate map data MIR3.

The image map data MPIR and MPRGB respectively correspond to specific examples of "first image map data" and "second image map data" in the present disclosure. The map data MIR12, MIR11, and MIR13 correspond to a specific example of a "plurality of first map data" in the present disclosure. The map data MIR22, MIR21, and MIR23 correspond to a specific example of a "plurality of second map data" in the present disclosure. The map data MIR3 corresponds to a specific example of "third map data" in the present disclosure. The map data MG12, MR11, and MB13 correspond to a specific example of a "plurality of fourth map data" in the present disclosure. The map data MG22, MR21, and MB23 correspond to a specific example of a "plurality of fifth map data" in the present disclosure.

As described above, in the imaging device 5, for example, the image segmentation processing A1 is performed on the basis of the image map data MPIR to generate the map data MIR12, MIR11, and MIR13, the interpolation processing A2 is respectively performed on the map data MIR12, MIR11, and MIR13 to generate the map data MIR22, MIR21, and MIR23, and the synthesis processing A3 is performed on the basis of the map data MIR22, MIR21, and MIR23 to generate the map data MIR3. This makes it possible to increase a signal-to-noise ratio (S/N ratio) in the map data MIR3 and enhance image quality of a captured image in the imaging device 5, as in the first embodiment described above.

In addition, in the imaging device 5, the arrangement patterns PAT of pixel values in the image segmentation processing A1 are patterns corresponding to the Bayer array to correspond to arrangement of color filters 111R, 111G, and 111B in the imaging section 80. The arrangement patterns PAT of pixel values in the map data MIR12 and MG12 are the same as each other. The arrangement patterns PAT of pixel values in the map data MIR11 and MR11 are the same as each other. The arrangement patterns PAT of pixel values in the map data MIR13 and MB13 are the same as each other. This makes it possible for the image segmentation processing section 92 to perform the mage segmentation processing A1 by the same method on the basis of two image map data MPIR and MPRGB, which makes it possible to simplify a circuit configuration of the image segmentation processing section 92.

In addition, in the imaging device 5, in the interpolation processing A2, the interpolation methods for generating the map data MIR22 and MG22 are the same as each other, the interpolation methods for generating the map data MIR21 and MR21 are the same as each other, and the interpolation methods for generating the map data MIR23 and MB23 are the same as each other, which makes it possible to simplify a circuit configuration of the interpolation processing section 93.

In addition, in the imaging device 5, as in imaging device 1 according to the first embodiment described above, it is possible to control whether or not to perform the image segmentation processing, the interpolation processing, and the synthesis processing. Accordingly, in the imaging device 3, for example, in a case where an image of a dark subject is captured, performing the image segmentation processing A1, the interpolation processing A2, and the synthesis processing A3 makes it possible to increase a signal-to-noise ratio (SN ratio) in the captured image. For example, in a case where an image of a bright subject is captured, the image segmentation processing A1, the interpolation processing A2, and the synthesis processing A3 are not performed, which makes it possible to increase resolution in the captured image. This consequently makes it possible for the imaging device 5 to enhance image quality of the captured image.

As described above, in the present embodiment, the image segmentation processing, the interpolation processing, and the synthesis processing are performed, which makes it possible to increase the signal-to-noise ratio in the captured image. This makes it possible to enhance image quality of the captured image.

In the present embodiment, the arrangement patterns of pixel values in the image segmentation processing are patterns corresponding to the Bayer array to correspond to arrangement of the color filters in the imaging section, which makes it possible to simplify a circuit configuration of the image segmentation processing section.

In the present embodiment, in the interpolation processing, the interpolation methods for generating the map data MIR22 and MG22 are the same as each other, the interpolation methods for generating the map data MIR21 and MR21 are the same as each other, and the interpolation methods for generating the map data MIR23 and MB23 are the same as each other, which makes it possible to simplify a circuit configuration of the interpolation processing section 93.

In the present embodiment, it is possible to control whether or not to perform the image segmentation processing, the interpolation processing, and the synthesis processing, which makes it possible to enhance image quality of the captured image.

Modification Example 4-1

Each of the modification examples of the first embodiment may be applied to the imaging device 5 according to the embodiment described above. Specifically, for example, as in the imaging device 2 (FIG. 21) according to the modification example of the first embodiment described above, the interpolating method in the interpolation processing A2 in the interpolation processing section 93 may be controlled by performing the interpolation control processing B1 on the basis of the image map data MPRGB included in the image signal DT51.

5. Usage Examples of Imaging Device

Figure 41:
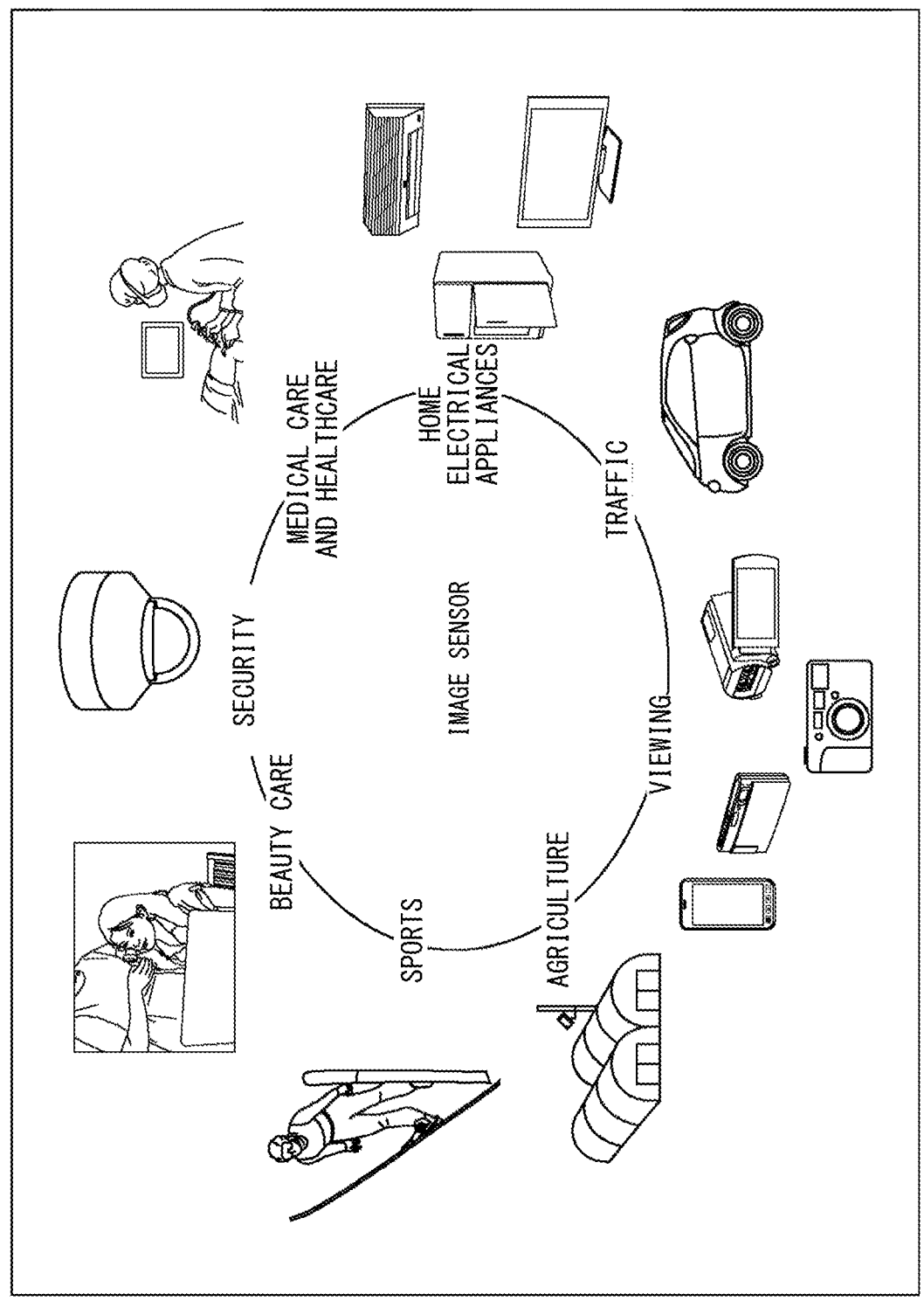
FIG. 41 is an explanatory diagram illustrating usage examples of an imaging device.

FIG. 41 illustrates usage examples of the imaging device 1 and the like according to the embodiments described above. For example, the imaging device 1 and the like described above are usable in a variety of cases of sensing light such as visible light, infrared light, ultraviolet light, and X-rays as follows.

- Devices that shoot images for viewing such as digital cameras and mobile devices having a camera function
- Devices for traffic use such as onboard sensors that shoot images of the front, back, surroundings, inside, and so on of an automobile for safe driving such as automatic stop and for recognition of a driver's state, monitoring cameras that monitor traveling vehicles and roads, and distance measuring sensors that measure vehicle-to-vehicle distance
- Devices for use in home electrical appliances such as televisions, refrigerators, and air-conditioners to shoot images of user's gesture and operate the appliances in accordance with the gesture
- Devices for medical care and healthcare use such as endoscopes and devices that shoot images of blood vessels by receiving infrared light
- Devices for security use such as monitoring cameras for crime prevention and cameras for individual authentication
- Devices for beauty care use such as skin measuring devices that shoot images of skin and microscopes that shoot images of scalp
- Devices for sports use such as action cameras and wearable cameras for sports applications, etc.
- Devices for agricultural use such as cameras for monitoring fields and crops 6. Application Examples Example of Application to In-Vivo Information Acquisition System Further, the technology (the present technology) according to the present disclosure is applicable to various products. For example, the technology according to the present disclosure may be applied to an endoscopic surgery system.

Figure 42:
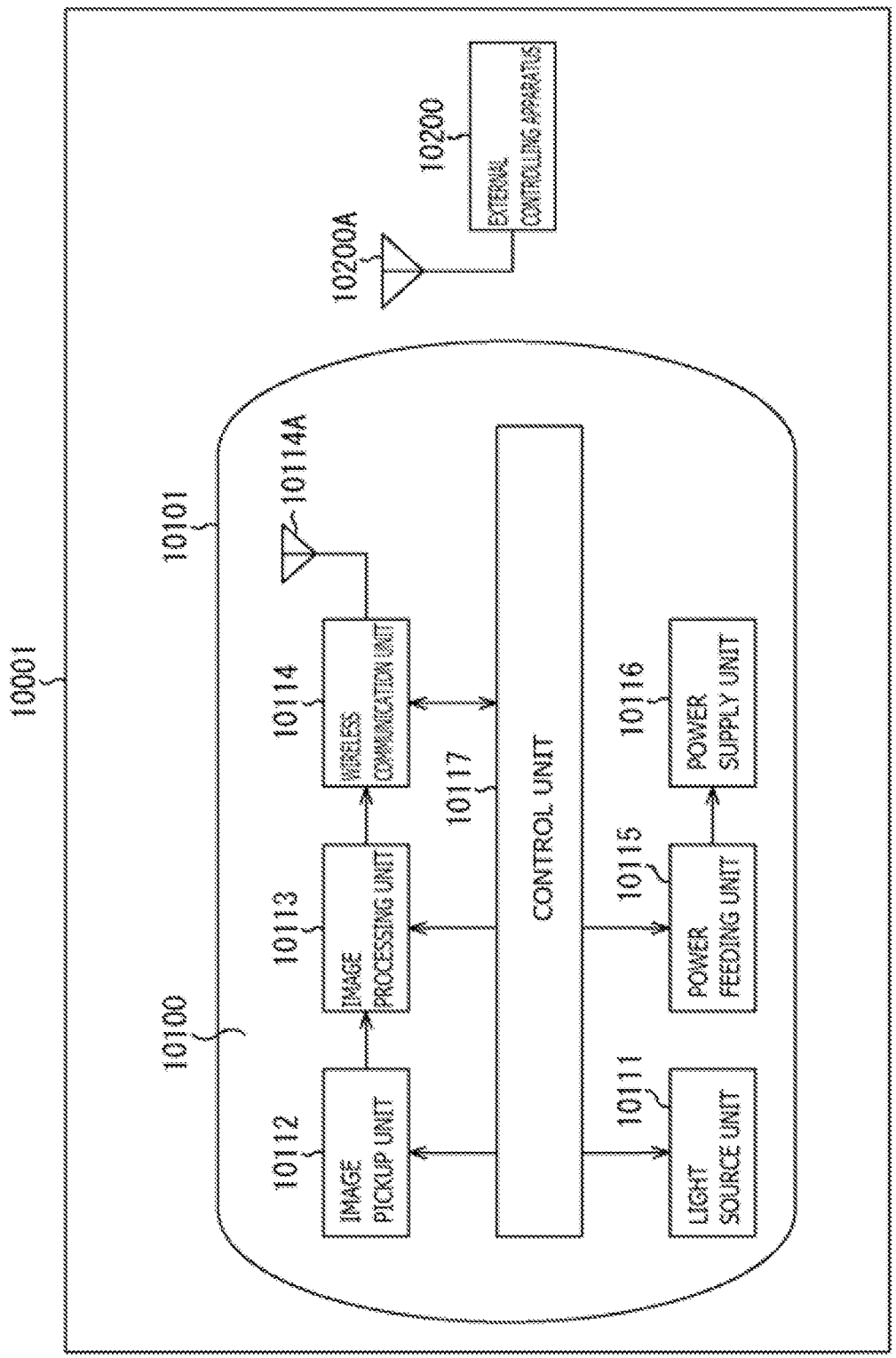
FIG. 42 is a block diagram depicting an example of a schematic configuration of an in-vivo information acquisition system.

FIG. 42 is a block diagram depicting an example of a schematic configuration of an in-vivo information acquisition system of a patient using a capsule type endoscope, to which the technology according to an embodiment of the present disclosure (present technology) can be applied.

The in-vivo information acquisition system 10001 includes a capsule type endoscope 10100 and an external controlling apparatus 10200.

The capsule type endoscope 10100 is swallowed by a patient at the time of inspection. The capsule type endoscope 10100 has an image pickup function and a wireless communication function and successively picks up an image of the inside of an organ such as the stomach or an intestine (hereinafter referred to as in-vivo image) at predetermined intervals while it moves inside of the organ by peristaltic motion for a period of time until it is naturally discharged from the patient. Then, the capsule type endoscope 10100 successively transmits information of the in-vivo image to the external controlling apparatus 10200 outside the body by wireless transmission.

The external controlling apparatus 10200 integrally controls operation of the in-vivo information acquisition system 10001. Further, the external controlling apparatus 10200 receives information of an in-vivo image transmitted thereto from the capsule type endoscope 10100 and generates image data for displaying the in-vivo image on a display apparatus (not depicted) on the basis of the received information of the in-vivo image.

In the in-vivo information acquisition system 10001, an in-vivo image imaged a state of the inside of the body of a patient can be acquired at any time in this manner for a period of time until the capsule type endoscope 10100 is discharged after it is swallowed.

A configuration and functions of the capsule type endoscope 10100 and the external controlling apparatus 10200 are described in more detail below.

The capsule type endoscope 10100 includes a housing 10101 of the capsule type, in which a light source unit 10111, an image pickup unit 10112, an image processing unit 10113, a wireless communication unit 10114, a power feeding unit 10115, a power supply unit 10116 and a control unit 10117 are accommodated.

The light source unit 10111 includes a light source such as, for example, a light emitting diode (LED) and irradiates light on an image pickup field-of-view of the image pickup unit 10112.

The image pickup unit 10112 includes an image pickup element and an optical system including a plurality of lenses provided at a preceding stage to the image pickup element. Reflected light (hereinafter referred to as observation light) of light irradiated on a body tissue which is an observation target is condensed by the optical system and introduced into the image pickup element. In the image pickup unit 10112, the incident observation light is photoelectrically converted by the image pickup element, by which an image signal corresponding to the observation light is generated. The image signal generated by the image pickup unit 10112 is provided to the image processing unit 10113.

The image processing unit 10113 includes a processor such as a central processing unit (CPU) or a graphics processing unit (GPU) and performs various signal processes for an image signal generated by the image pickup unit 10112. The image processing unit 10113 provides the image signal for which the signal processes have been performed thereby as RAW data to the wireless communication unit 10114.

The wireless communication unit 10114 performs a predetermined process such as a modulation process for the image signal for which the signal processes have been performed by the image processing unit 10113 and transmits the resulting image signal to the external controlling apparatus 10200 through an antenna 10114A. Further, the wireless communication unit 10114 receives a control signal relating to driving control of the capsule type endoscope 10100 from the external controlling apparatus 10200 through the antenna 10114A. The wireless communication unit 10114 provides the control signal received from the external controlling apparatus 10200 to the control unit 10117.

The power feeding unit 10115 includes an antenna coil for power reception, a power regeneration circuit for regenerating electric power from current generated in the antenna coil, a voltage booster circuit and so forth. The power feeding unit 10115 generates electric power using the principle of non-contact charging.

The power supply unit 10116 includes a secondary battery and stores electric power generated by the power feeding unit 10115. In FIG. 42, in order to avoid complicated illustration, an arrow mark indicative of a supply destination of electric power from the power supply unit 10116 and so forth are omitted. However, electric power stored in the power supply unit 10116 is supplied to and can be used to drive the light source unit 10111, the image pickup unit 10112, the image processing unit 10113, the wireless communication unit 10114 and the control unit 10117.

The control unit 10117 includes a processor such as a CPU and suitably controls driving of the light source unit 10111, the image pickup unit 10112, the image processing unit 10113, the wireless communication unit 10114 and the power feeding unit 10115 in accordance with a control signal transmitted thereto from the external controlling apparatus 10200.

The external controlling apparatus 10200 includes a processor such as a CPU or a GPU, a microcomputer, a control board or the like in which a processor and a storage element such as a memory are mixedly incorporated. The external controlling apparatus 10200 transmits a control signal to the control unit 10117 of the capsule type endoscope 10100 through an antenna 10200A to control operation of the capsule type endoscope 10100. In the capsule type endoscope 10100, an irradiation condition of light upon an observation target of the light source unit 10111 can be changed, for example, in accordance with a control signal from the external controlling apparatus 10200. Further, an image pickup condition (for example, a frame rate, an exposure value or the like of the image pickup unit 10112) can be changed in accordance with a control signal from the external controlling apparatus 10200. Further, the substance of processing by the image processing unit 10113 or a condition for transmitting an image signal from the wireless communication unit 10114 (for example, a transmission interval, a transmission image number or the like) may be changed in accordance with a control signal from the external controlling apparatus 10200.

Further, the external controlling apparatus 10200 performs various image processes for an image signal transmitted thereto from the capsule type endoscope 10100 to generate image data for displaying a picked up in-vivo image on the display apparatus. As the image processes, various signal processes can be performed such as, for example, a development process (demosaic process), an image quality improving process (bandwidth enhancement process, a super-resolution process, a noise reduction (NR) process and/or image stabilization process) and/or an enlargement process (electronic zooming process). The external controlling apparatus 10200 controls driving of the display apparatus to cause the display apparatus to display a picked up in-vivo image on the basis of generated image data. Alternatively, the external controlling apparatus 10200 may also control a recording apparatus (not depicted) to record generated image data or control a printing apparatus (not depicted) to output generated image data by printing.

An example of the in-vivo information acquisition system to which the technology according to the present disclosure may be applied has been described above. The technology according to the present disclosure may be applied to the image pickup unit 10112 and the image processing unit 10113 among the components described above. This makes it possible to enhance image quality of a captured image, which allows the doctor to comprehend a state of the inside of the body of a patient more accurately.

4. Example of Application to Endoscopic Surgery System

The technology (the present technology) according to the present disclosure is applicable to various products. For example, the technology according to the present disclosure may be applied to an endoscopic surgery system.

Figure 43:
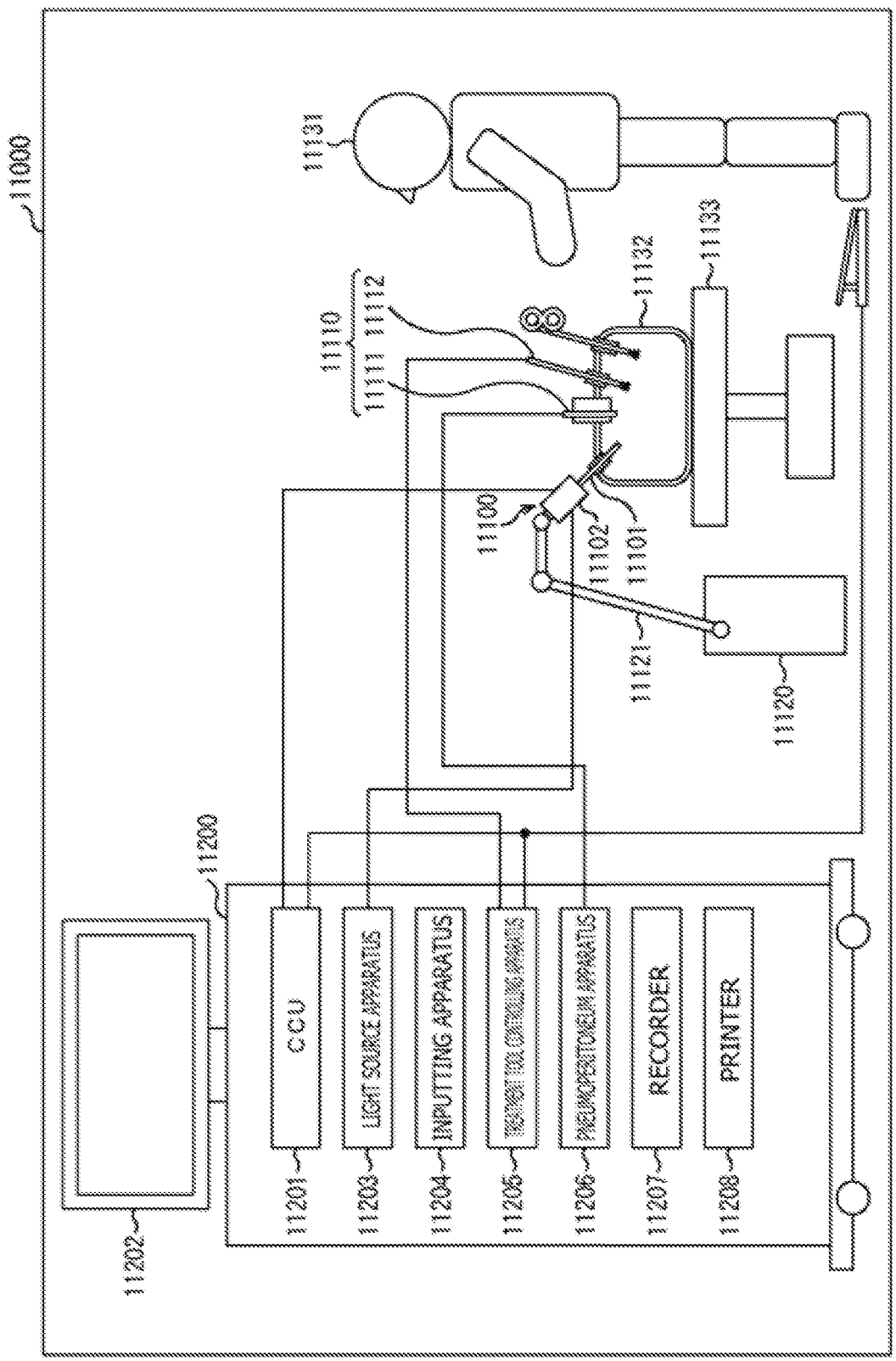
FIG. 43 is a view depicting an example of a schematic configuration of an endoscopic surgery system.

FIG. 43 is a view depicting an example of a schematic configuration of an endoscopic surgery system to which the technology according to an embodiment of the present disclosure (present technology) can be applied.

In FIG. 43, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 44:
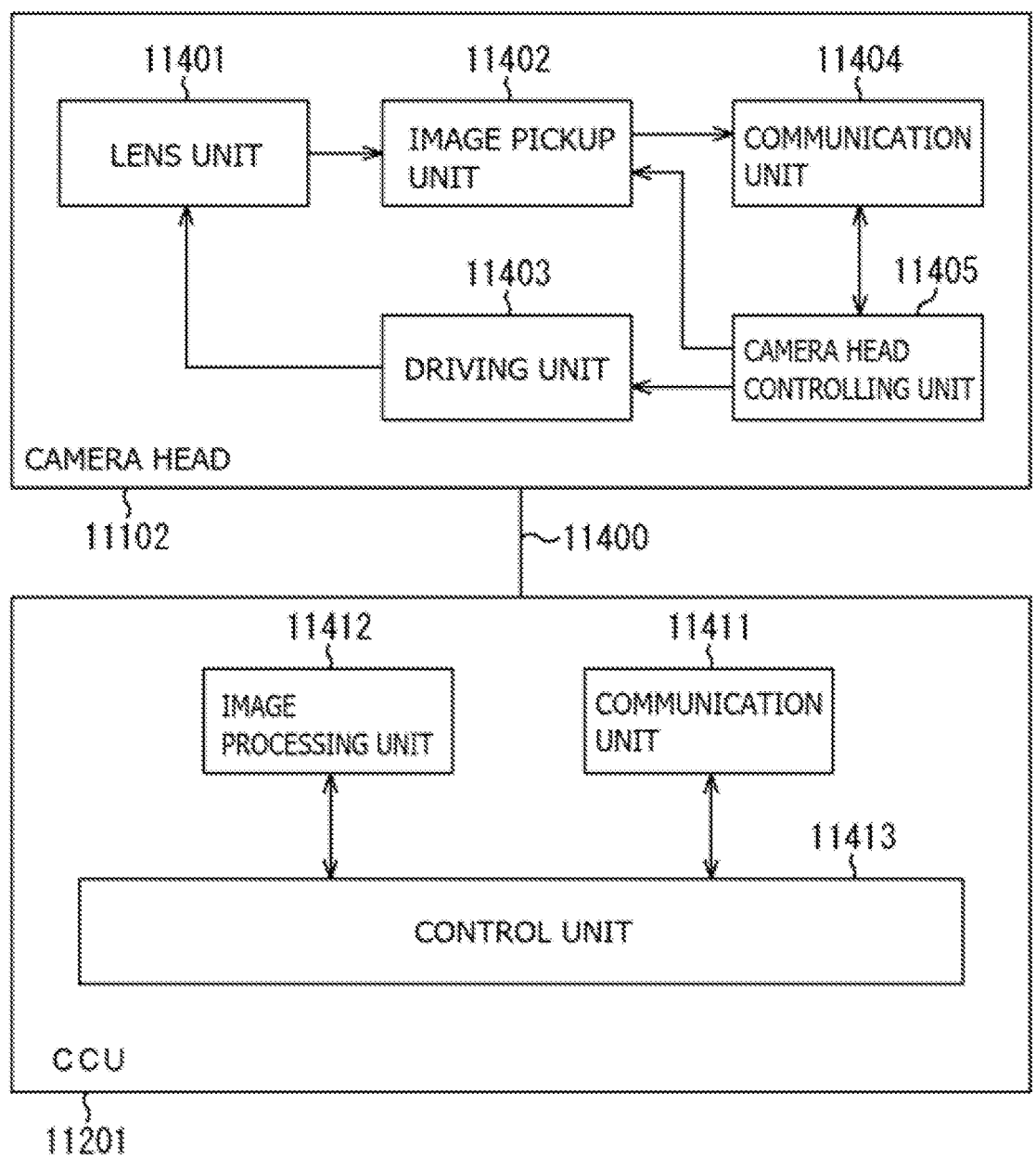
FIG. 44 is a block diagram depicting an example of a functional configuration of a camera head and a camera control unit (CCU).

FIG. 44 is a block diagram depicting an example of a functional configuration of the camera head 11102 and the CCU 11201 depicted in FIG. 43.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

An example of the endoscopic surgery system to which the technology according to the present disclosure may be applied has been described above. The technology according to the present disclosure may be applied to, for example, the image pickup unit 11402 and the image processing unit 11412 among the components described above. This makes it possible to enhance image quality of a captured image, which allows the doctor to comprehend a state of the inside of the body of a patient more accurately.

It is noted that the endoscopic surgery system has been described here as an example, but the technology according to the present disclosure may be additionally applied to, for example, a microscopic surgery system or the like.

Example of Application to Mobile Body

The technology according to the present disclosure is applicable to various products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, a robot, a construction machine, and an agricultural machine (tractor).

Figure 45:
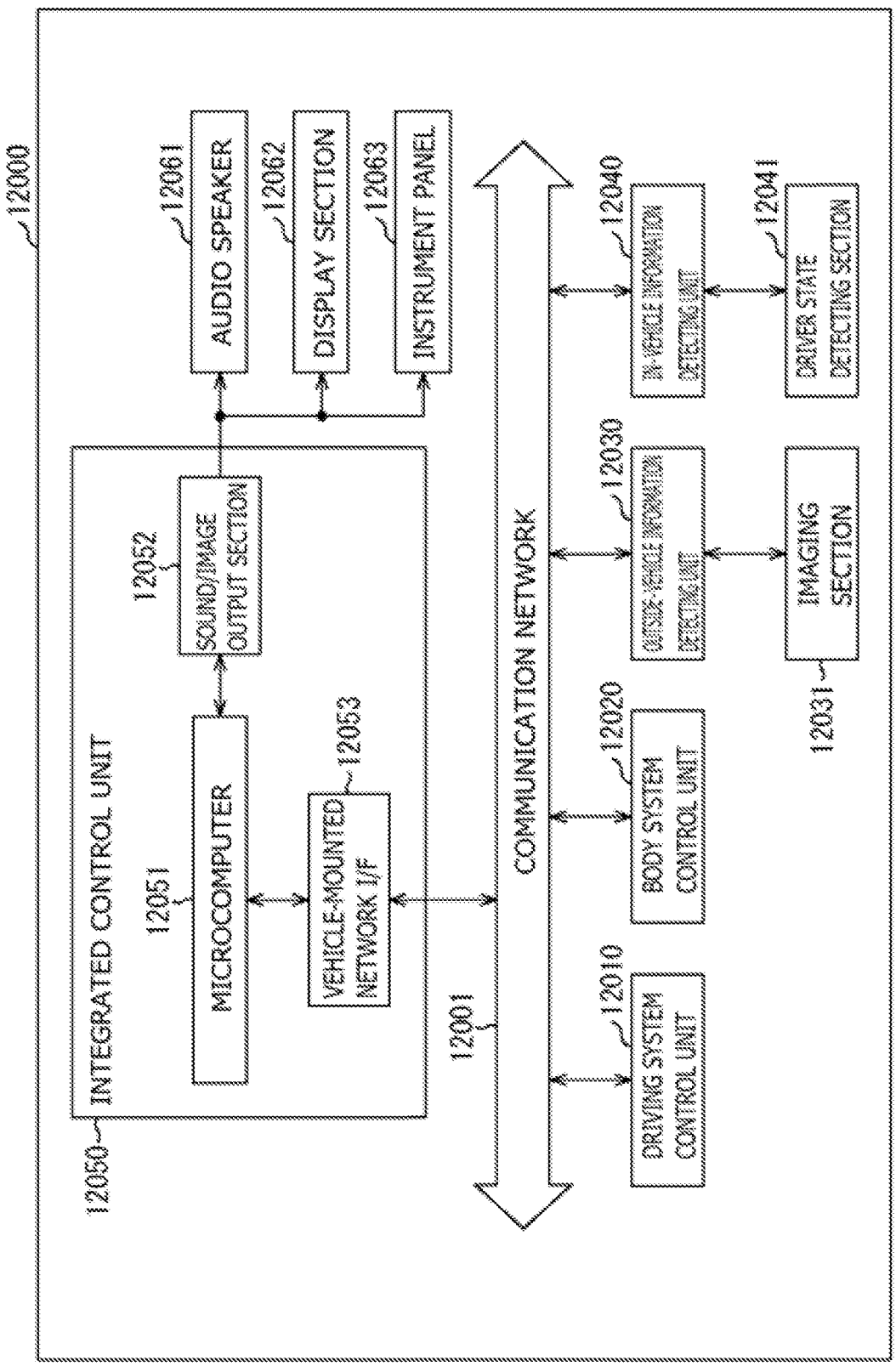
FIG. 45 is a block diagram depicting an example of schematic configuration of a vehicle control system.

FIG. 45 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 45, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 45, an audio speaker 12061, a display section 12062, and an instrument panel 12063 are illustrated as the output device. The display section 12062 may, for example, include at least one of an on-board display and a head-up display.

Figure 46:
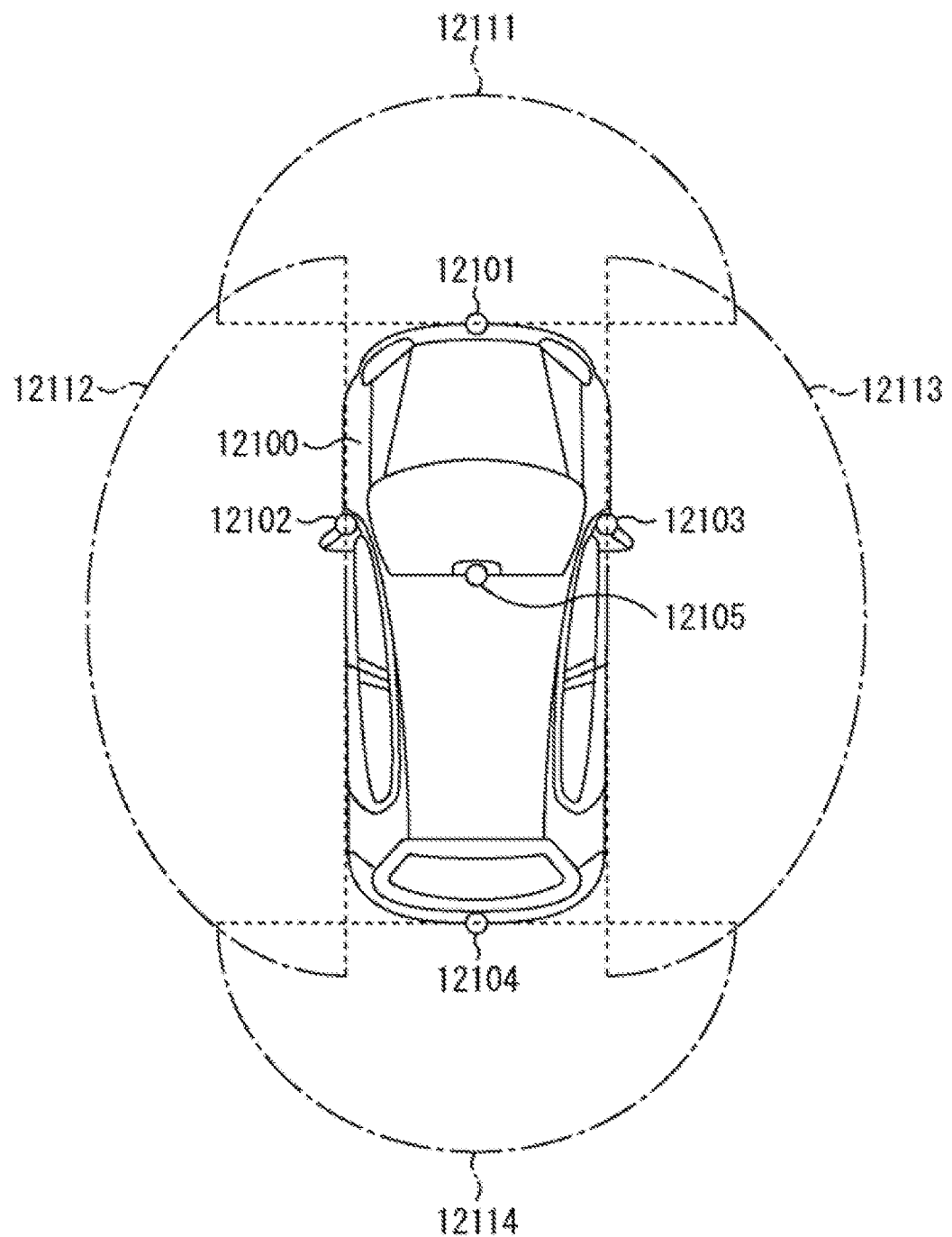
FIG. 46 is a diagram of assistance in explaining an example of installation positions of an outside-vehicle information detecting section and an imaging section.

FIG. 46 is a diagram depicting an example of the installation position of the imaging section 12031.

In FIG. 46, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 46 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure may be applied has been described above. The technology according to the present disclosure may be applied to the imaging section 12031 among the components described above. This makes it possible to enhance image quality of a captured image, which allows the vehicle control system 12000 to comprehend, for example, an outside-vehicle environment more accurately. This makes it possible to perform more accurate driving support and the like.

Although the present technology has been described above referring to some embodiments, modification examples, and specific application examples thereof, the present technology is not limited to these embodiments and the like, and may be modified in a variety of ways.

For example, in the respective embodiments described above, the imaging device 1 is configured using the imaging section 10 and the image processing section 20, but this is not limitative. Alternatively, for example, an operation device different from the imaging device 1 may have a function of the image processing section 20. In this case, the operation device is supplied with an image data file including information about the image map data MPR, MPG, and MPB and the conversion gain GC. This allows the operation device to perform the image segmentation processing A1, the interpolation processing A2, and the synthesis processing A3 on the basis of the image data file. The operation device may include a personal computer that executes an image processing program.

In addition, in the respective embodiments described above, for example, the image processing section 20 controls, on the basis of the conversion gain CG indicated by the gain signal SGAIN, whether or not to perform the image segmentation processing A1, the interpolation processing A2, and the synthesis processing A3, but this is not limitative. Alternatively, for example, the imaging section 10 may determine whether or not to perform the image segmentation processing A1, the interpolation processing A2, and the synthesis processing A3, and generate a mode signal indicating a result of such determination. In this case, it is possible for the image processing section 20 to perform an operation in accordance with the mode signal.

It is to be noted that the effects described here are merely illustrative and non-limiting, and other effects may be included.

It is to be noted that the present technology may be configured as follows.

(1)

An image processor including:

an image segmentation processing section that is configured to generate a plurality of first map data on the basis of first image map data including a plurality of pixel values, the plurality of first map data having arrangement patterns of pixel values different from each other and including pixel values located at positions different from each other;

an interpolation processing section that is configured to generate a plurality of second map data corresponding to the plurality of first map data by determining a pixel value at a position where no pixel value is present in each of the plurality of first map data with use of interpolation processing; and a synthesis processing section that is configured to generate third map data by generating, on the basis of pixel values at positions corresponding to each other in the plurality of second map data, a pixel value at a position corresponding to the positions.

(2)
The image processor according to (1), in which the arrangement patterns are checkered patterns.

(3)
The image processor according to (1) or (2), further including an interpolation controller that is configured to determine a processing method in the interpolation processing on the basis of the first image map data.

(4)
The image processor according to (3), in which the interpolation controller is configured to determine the processing method by determining an interpolation direction in the interpolation processing on the basis of the first image map data.

(5)
The image processor according to (3) or (4), in which the interpolation controller is configured to determine spatial frequency information on the basis of the first image map data and determine the processing method on the basis of the spatial frequency information.

(6)
The image processor according to any one of (3) to (5), in which the interpolation controller is configured to generate synthesized map data on the basis of the first image map data, second image map data, and third image map data and determine the processing method in the interpolation processing on the basis of the synthesized map data.

(7)
The image processor according to any one of (1) to (6), in which
the image segmentation processing section is configured to further generate a plurality of fourth map data on the basis of second image map data including a plurality of pixel values, the plurality of fourth map data having arrangement patterns of pixel values different from each other and including pixel values located at positions different from each other,
the interpolation processing section is configured to generate a plurality of fifth map data corresponding to the plurality of fourth map data by determining a pixel value at a position where no pixel value is present in each of the plurality of fourth map data with use of the interpolation processing,
the arrangement patterns of pixel values in the plurality of first map data include a first arrangement pattern and a second arrangement pattern, and
the arrangement patterns of pixel values in the plurality of fourth map data include the first arrangement pattern and the second arrangement pattern.

(8)
The image processor according to (7), in which an interpolation method in the interpolation processing on the plurality of first map data is same as an interpolation method in the interpolation processing on the plurality of fourth map data.

(9)
The image processor according to (7) or (8), in which
the plurality of pixel values in the first image map data includes a plurality of pixel values for a first color,
the plurality of pixel values in the second image map data includes a plurality of pixel values for a second color and a plurality of pixel values for a third color.

(10)
The image processor according to (7) or (8), in which
the plurality of pixel values in the first image map data includes a plurality of pixel values for a first color, and
the plurality of pixel values in the second image map data includes a plurality of pixel values for a second color, a plurality of pixel values for a third color, and a plurality of pixel values for a fourth color.

(11)
The image processor according to (7), in which
the synthesis processing section is configured to generate sixth map data by generating, on the basis of pixel values at positions corresponding to each other in the plurality of fifth map data, a pixel value at a position corresponding to the positions,
the image segmentation processing section is configured to further generate a plurality of seventh map data on the basis of third image map data including a plurality of pixel values, the plurality of seventh map data having arrangement patterns of pixel values different from each other and including pixel values located at positions different from each other,
the interpolation processing section is configured to generate a plurality of eighth map data corresponding to the plurality of seventh map data by determining a pixel value at a position where no pixel value is present in each of the plurality of seventh map data with use of the interpolation processing,
the synthesis processing section is configured to generate ninth map data by generating, on the basis of pixel values at positions corresponding to each other in the plurality of eighth map data, a pixel value at a position corresponding to the positions, and
the arrangement patterns of pixel values in the plurality of seventh map data include the first arrangement pattern and the second arrangement pattern.

(12)
The image processor according to (11), in which an interpolation method in the interpolation processing on the plurality of first map data is same as an interpolation method in the interpolation processing on the plurality of fourth map data and an interpolation method in the interpolation processing on the plurality of seventh map data.

(13)
The image processor according to (11) or (12), in which
the plurality of pixel values in the first image map data includes a plurality of pixel values for a first color,
the plurality of pixel values in the second image map data includes a plurality of pixel values for a second color, and
the plurality of pixel values in the third image map data include a plurality of pixel values for a third color.

(14)
The image processor according to any one of (11) to (13), in which number of the plurality of pixel values in the first image map data different from number of the plurality of pixel values in the second image map data.

(15)
The image processor according to (14), in which
the plurality of pixel values in the first image map data includes a plurality of pixel values for green, and
two or more pixel values in the first image map data are associated with one pixel value in the second image map data.

(16)
The image processor according to any one of (1) to (5), further including a generator that generates the first image map data on the basis of an image signal, in which
the first image map data includes luminance map data.

(17)

The image processor according to any one of (1) to (16), further including a processing controller that is configured to control whether or not the image segmentation processing section, the interpolation processing section, and the synthesis processing section are to perform processing.

(18)

The image processor according to (17) further including a processing section that is configured to perform predetermined signal processing on the basis of the first image map data or the third map data, in which
the processing controller is configured to cause the processing section to perform the predetermined signal processing on the basis of the first image map data in a first operation mode, and perform the predetermined signal processing on the basis of the third map data in a second operation mode.

(19)

The image processor according to (18), in which the processing controller is configured to control whether or not the image segmentation processing section, the interpolation processing section, and the synthesis processing section are to perform processing on the basis of a parameter.

(20)

The image processor according to (19), in which
the first image map data is supplied from an imaging section,
the parameter includes a gain value in the imaging section, and
in a case where the gain value is higher than a predetermined gain value, the processing controller performs control to cause the image segmentation processing section, the interpolation processing section, and the synthesis processing section to perform processing.

(21)

An image processing method including:
image segmentation processing of generating a plurality of first map data on the basis of first image map data including a plurality of pixel values, the plurality of first map data having arrangement patterns of pixel values different from each other and including pixel values located at positions different from each other;
interpolation processing of generating a plurality of second map data corresponding to the plurality of first map data by determining a pixel value at a position where no pixel value is present in each of the plurality of first map data with use of interpolation processing; and
synthesis processing of generating third map data by generating, on the basis of pixel values at positions corresponding to each other in the plurality of second map data, a pixel value at a position corresponding to the positions.

(22)

An imaging device including:
an imaging section that generates first image map data including a plurality of pixel values,
an image segmentation processing section that is configured to generate a plurality of first map data on the basis of the first image map data, the plurality of first map data having arrangement patterns of pixel values different from each other and including pixel values located at positions different from each other;
an interpolation processing section that is configured to generate a plurality of second map data corresponding to the plurality of first map data by determining a pixel value at a position where no pixel value is present in each of the plurality of first map data with use of interpolation processing; and
a synthesis processing section that is configured to generate third map data by generating, on the basis of pixel values at positions corresponding to each other in the plurality of second map data, a pixel value at a position corresponding to the positions.

(23)

The imaging device according to (22) in which
the imaging section includes a plurality of pixels arranged in predetermined color arrangement, and
the arrangement patterns have a pattern corresponding to the color arrangement.

This application claims the benefit of Japanese Priority Patent Application JP2018-022143 filed with Japan Patent Office on Feb. 9, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof

What is claimed is:

1. An image processor comprising:
an image segmentation processing section that is configured to generate a plurality of first map data on a basis of first image map data including a plurality of pixel values for a first color, the plurality of first map data having arrangement patterns of pixel values different from each other and including pixel values located at positions different from each other;
an interpolation processing section that is configured to generate a plurality of second map data corresponding to the plurality of first map data by determining a pixel value at a position where no pixel value is present in each of the plurality of first map data with use of interpolation processing; and
a synthesis processing section that is configured to generate third map data by generating, on a basis of pixel values at positions corresponding to each other in the plurality of second map data, a pixel value at a position corresponding to the positions,
wherein the image segmentation processing section is configured to further generate a plurality of fourth map data on a basis of second image map data including a plurality of pixel values, the plurality of fourth map data having arrangement patterns of pixel values different from each other and including pixel values located at positions different from each other,
wherein the interpolation processing section is configured to generate a plurality of fifth map data corresponding to the plurality of fourth map data by determining a pixel value at a position where no pixel value is present in each of the plurality of fourth map data with use of the interpolation processing,
wherein the arrangement patterns of pixel values in the plurality of first map data include a first arrangement pattern and a second arrangement pattern, and
wherein the arrangement patterns of pixel values in the plurality of fourth map data include the first arrangement pattern and the second arrangement pattern.

2. The image processor according to claim 1, wherein the arrangement patterns are checkered patterns.

3. The image processor according to claim 1, further comprising an interpolation controller that is configured to wherein a processing method in the interpolation processing is determined on a basis of the first image map data.

4. The image processor according to claim 3, wherein the processing method is determined by determining an interpolation direction in the interpolation processing on a basis of the first image map data.

5. The image processor according to claim 3, wherein spatial frequency information is determined on a basis of the first image map data, and wherein the processing method is determined on a basis of the spatial frequency information.

6. The image processor according to claim 3, wherein synthesized map data is generated on a basis of the first image map data, second image map data, and third image map data, and wherein the processing method in the interpolation processing is determined on a basis of the synthesized map data.

7. The image processor according to claim 1, wherein
the plurality of pixel values in the second image map data includes a plurality of pixel values for a second color and a plurality of pixel values for a third color.

8. The image processor according to claim 1, wherein
the plurality of pixel values in the second image map data includes a plurality of pixel values for a second color, a plurality of pixel values for a third color, and a plurality of pixel values for a fourth color.

9. The image processor according to claim 1, wherein
the synthesis processing section is configured to generate sixth map data by generating, on a basis of pixel values at positions corresponding to each other in the plurality of fifth map data, a pixel value at a position corresponding to the positions,
the image segmentation processing section is configured to further generate a plurality of seventh map data on a basis of third image map data including a plurality of pixel values, the plurality of seventh map data having arrangement patterns of pixel values different from each other and including pixel values located at positions different from each other,
the interpolation processing section is configured to generate a plurality of eighth map data corresponding to the plurality of seventh map data by determining a pixel value at a position where no pixel value is present in each of the plurality of seventh map data with use of the interpolation processing,
the synthesis processing section is configured to generate ninth map data by generating, on a basis of pixel values at positions corresponding to each other in the plurality of eighth map data, a pixel value at a position corresponding to the positions, and
the arrangement patterns of pixel values in the plurality of seventh map data include the first arrangement pattern and the second arrangement pattern.

10. The image processor according to claim 9, wherein
the plurality of pixel values in the second image map data includes a plurality of pixel values for a second color, and
the plurality of pixel values in the third image map data include a plurality of pixel values for a third color.

11. The image processor according to claim 9, wherein a number of the plurality of pixel values in the first image map data is different from a number of the plurality of pixel values in the second image map data.

12. The image processor according to claim 11, wherein
the plurality of pixel values in the first image map data includes a plurality of pixel values for green, and
two or more pixel values in the first image map data are associated with one pixel value in the second image map data.

13. The image processor according to claim 1, wherein the first image map data is generated on a basis of an image signal, and wherein the first image map data includes luminance map data.

14. An image processor, comprising:
an image segmentation processing section that is configured to generate a plurality of first map data on a basis of first image map data including a plurality of pixel values for a first color, the plurality of first map data having arrangement patterns of pixel values different from each other and including pixel values located at positions different from each other;
an interpolation processing section that is configured to generate a plurality of second map data corresponding to the plurality of first map data by determining a pixel value at a position where no pixel value is present in each of the plurality of first map data with use of interpolation processing; and
a synthesis processing section that is configured to generate third map data by generating, on a basis of pixel values at positions corresponding to each other in the plurality of second map data, a pixel value at a position corresponding to the positions wherein whether or not the image segmentation processing section, the interpolation processing section, and the synthesis processing section are to perform processing is controlled.

15. The image processor according to claim 14, further comprising a processing section that is configured to perform predetermined signal processing on a basis of the first image map data or the third map data, wherein
the processing section performs the predetermined signal processing on a basis of the first image map data in a first operation mode, and wherein the processing section performs the predetermined signal processing on a basis of the third map data in a second operation mode.

16. The image processor according to claim 15, wherein whether or not the image segmentation processing section, the interpolation processing section, and the synthesis processing section are to perform processing is controlled on a basis of a parameter.

17. The image processor according to claim 16, wherein
the first image map data is supplied from an imaging section,
wherein the parameter includes a gain value in the imaging section, and
wherein, in a case where the gain value is higher than a predetermined gain value, the image segmentation processing section, the interpolation processing section, and the synthesis processing section perform processing.

18. An image processing method, comprising:
image segmentation processing of generating a plurality of first map data on a basis of first image map data including a plurality of pixel values for a first color, the plurality of first map data having arrangement patterns of pixel values different from each other and including pixel values located at positions different from each other;
interpolation processing of generating a plurality of second map data corresponding to the plurality of first map data by determining a pixel value at a position where no pixel value is present in each of the plurality of first map data with use of interpolation processing; and
synthesis processing of generating third map data by generating, on a basis of pixel values at positions corresponding to each other in the plurality of second map data, a pixel value at a position corresponding to the positions, wherein the image segmentation processing further generates a plurality of fourth map data on a basis of second image map data including a plurality of pixel values, the plurality of fourth map data having arrangement patterns of pixel values different from each other and including pixel values located at positions different from each other, wherein the interpolation processing generates a plurality of fifth map data corresponding to the plurality of fourth map data by determining a pixel value at a position where no pixel value is present in each of the plurality of fourth map data with use of the interpolation processing, wherein the arrangement patterns of pixel values in the plurality of first map data include a first arrangement pattern and a second arrangement pattern, and wherein the arrangement patterns of pixel values in the plurality of fourth map data include the first arrangement pattern and the second arrangement pattern.

* * * * *